(12) United States Patent
Minnich et al.

(10) Patent No.: US 11,365,301 B2
(45) Date of Patent: Jun. 21, 2022

(54) POLYMER FOAM ARTICLES AND METHODS OF MAKING POLYMER FOAMS

(71) Applicant: Moxietec, LLC, Grove City, PA (US)

(72) Inventors: Jason L. Minnich, Cochranton, PA (US); Travis J. Biggs, Cochranton, PA (US); Alicyn M. Rhoades, Erie, PA (US); Jeremy Weigand, West Sunbury, PA (US)

(73) Assignee: Moxietec, LLC, Grove City, PA (US)

( * ) Notice: Subject to any disclaimer, the term of this patent is extended or adjusted under 35 U.S.C. 154(b) by 0 days.

(21) Appl. No.: 17/462,359

(22) Filed: Aug. 31, 2021

(65) Prior Publication Data

US 2022/0002511 A1 Jan. 6, 2022

Related U.S. Application Data

(63) Continuation of application No. 17/360,665, filed on Jun. 28, 2021, which is a continuation-in-part of (Continued)

(51) Int. Cl.
*C08J 9/06* (2006.01)

(52) U.S. Cl.
CPC ............. *C08J 9/06* (2013.01); *C08J 2323/06* (2013.01); *C08J 2325/06* (2013.01); (Continued)

(58) Field of Classification Search
CPC ...... C08J 9/06; C08J 2323/06; C08J 2325/06; C08J 2369/00; C08J 2377/00; C08J 2423/12
See application file for complete search history.

(56) References Cited

U.S. PATENT DOCUMENTS

| | | |
|---|---|---|
| 3,185,588 A | 5/1965 | Resnick |
| 3,268,636 A | 8/1966 | Angell, Jr. |
| 3,663,668 A | 5/1972 | Fairbanks |
| 3,801,686 A | 4/1974 | Kyritsis et al. |

(Continued)

FOREIGN PATENT DOCUMENTS

| | | |
|---|---|---|
| DE | 10014156 A1 | 10/2001 |
| EP | 2907647 A1 | 8/2015 |

(Continued)

OTHER PUBLICATIONS

Heck, III, Uniroyal Chemical Company, Inc., Middlebury, Connecticut, A Review of Commercially Foaming Agents for Thermoplastic Foams, Journal of Vinyl & Additive Technology, Jun. 1998, vol. 4, No. 2.

(Continued)

*Primary Examiner* — Kara B Boyle
(74) *Attorney, Agent, or Firm* — Kagan Binder, PLLC

(57) ABSTRACT

Molded polymer foam articles are described as having a novel foam structure. The polymer foam articles include a continuous polymer matrix defining a plurality of pneumatoceles therein which is present throughout the entirety of the article. The surface region is further characterized as having compressed pneumatoceles. The novel foam structure is achieved even when molding polymer foam articles comprising a shape and volume wherein a sphere having a diameter between 2 cm and 1000 cm would fit within the article in at least one location without protruding from a surface of the article, and the article further has a total volume of more than 1000 cm$^3$. Methods of making a stabilized molten polymer foam, and of making a molded polymer foam article using the stabilized molten polymer foam are also described.

15 Claims, 72 Drawing Sheets

Related U.S. Application Data application No. 17/333,254, filed on May 28, 2021, now Pat. No. 11,225,561, which is a continuation of application No. 17/077,686, filed on Oct. 22, 2020, now Pat. No. 11,021,587, which is a continuation of application No. 16/914,993, filed on Jun. 29, 2020, now Pat. No. 10,982,066.

(60) Provisional application No. 62/867,516, filed on Jun. 27, 2019.

(52) U.S. Cl.
CPC ........ *C08J 2369/00* (2013.01); *C08J 2377/00* (2013.01); *C08J 2423/12* (2013.01)

(56) References Cited

U.S. PATENT DOCUMENTS

| | | | |
|---|---|---|---|
| 3,812,225 | A | 5/1974 | Hosoda et al. |
| 4,272,469 | A | 6/1981 | Smith |
| 4,473,665 | A | 9/1984 | Martini-Vvedensky et al. |
| 4,776,356 | A | 10/1988 | Jou et al. |
| 4,806,294 | A | 2/1989 | Lapierre et al. |
| 4,865,120 | A | 9/1989 | Shiroki |
| 4,877,814 | A | 10/1989 | Ito |
| 4,906,672 | A | 3/1990 | Stone et al. |
| 5,049,327 | A | 9/1991 | Hara et al. |
| 5,119,668 | A | 6/1992 | Lehnert et al. |
| 5,174,934 | A | 12/1992 | Saatchi |
| 5,454,428 | A | 10/1995 | Pickard et al. |
| 5,474,723 | A | 12/1995 | Horikoshi |
| 5,514,310 | A | 5/1996 | Sander |
| 5,667,740 | A | 9/1997 | Spydevold |
| 5,866,053 | A | 2/1999 | Park et al. |
| 6,120,714 | A | 9/2000 | Allan et al. |
| 6,169,122 | B1 * | 1/2001 | Blizard .................... B29C 48/13 521/79 |
| 7,008,202 | B2 | 3/2006 | Teraoka et al. |
| 7,013,609 | B2 | 3/2006 | Hydock |
| 7,150,615 | B2 | 12/2006 | Sugihara et al. |
| 7,704,423 | B2 | 4/2010 | Takatori et al. |
| 7,832,159 | B1 | 11/2010 | Kayhart |
| 8,865,037 | B2 | 10/2014 | Marrelli |
| 8,877,331 | B2 | 11/2014 | Nadella et al. |
| 9,080,023 | B2 | 7/2015 | Jeong et al. |
| 9,394,698 | B2 | 7/2016 | Carrubba |
| 9,555,564 | B2 | 1/2017 | Turng et al. |
| 9,630,346 | B2 | 4/2017 | Turng et al. |
| 9,683,756 | B2 | 6/2017 | Barmore |
| 2005/0058824 | A1 | 3/2005 | Fujimoto |
| 2009/0014152 | A1 | 1/2009 | Foo et al. |
| 2011/0293914 | A1 | 12/2011 | Maurer et al. |
| 2012/0181729 | A1 * | 7/2012 | Turng .................... B29C 44/42 264/328.17 |
| 2012/0219651 | A1 | 8/2012 | Weber et al. |
| 2016/0052180 | A1 | 2/2016 | Beard et al. |
| 2018/0117823 | A1 | 5/2018 | Yusa et al. |
| 2018/0298611 | A1 | 10/2018 | Hall et al. |
| 2019/0270227 | A1 | 9/2019 | Dix et al. |
| 2019/0322027 | A1 | 10/2019 | Turng et al. |

FOREIGN PATENT DOCUMENTS

| | | |
|---|---|---|
| GB | 2188636 A | 8/1987 |
| JP | 2004-257574 A | 9/2004 |
| WO | 98/08667 A2 | 3/1998 |
| WO | 2005/068914 A1 | 7/2005 |
| WO | 2020/060982 A1 | 3/2020 |

OTHER PUBLICATIONS

Chen et al., Trexel, Inc., Effects of Shear Stress and Pressure Drop Rate on Microcellular Foaming Process, Journal of Cellular Plastics, vol. 37, Jul. 2001.

Nam et al., Effect of Long-Chain Branches of Polypropylene on Rheological Properties and Foam-Extrusion Performances, Journal of Applied Polymer Science,vol. 96, 1793-1800 (2005).

Zhou et al., Exo-endothermic Blowing Agent and its Foaming Behavior, Journal of Cellular Plastics, vol. 41, May 2005.

Marrazzo et al., Foaming of Synthetic and Natural Biodegradable Polymers, Journal of Cellular Plastics, vol. 43, Mar. 2007.

Sporrer et al., Department of Polymer Engineering, University of Bayreuth, Germany, Controlling Morphology of Injection Molded Structural Foams by Mold Design and Processing Parameters, Journal of Cellular Plastics, vol. 43, 313-330—Jul./Sep. 2007.

Handschke et al., Injection Molding, Physical Foaming Made Very Easy, Thermoplastic Foam Injection Molding, Kunststoffe International Oct. 2012.

Costeux, The Dow Chemical Company, CO2-Blown Nanocellular Foams, J. Appl. Polym. Sci. 2014.

Yetgin et al., Journal of Cellular Plastics, Influence of foam agent content and talc filler on the microcellular and mechanical properties of injection molded polypropylene and talc filled polypropylene composite foams, 2014.

Mohebbi et al., Current Issues and Challenges in Polypropylene Foaming: A Review, Cellular Polymers, vol. 34, No. 6, 2015.

MuCell Processes, Trexel, Inc., A Guide to the Mucell® Microcellular Foam Injection Molding Process—T Series, Fundamentals, Set-Up, Optimization & Troubleshooting, Aug. 2015.

Okolieocha et al., Microcellular to nanocellular polymer foams: Progress (2004-2015) and future directions—A review, European Polymer Journal 73 (2015) 500-519.

Sun et al., A novel method of producing lightweight microcellular injection molded parts with improved ductility and toughness, Polymer 56 (2015) 102-110.

Wang et al., Research on Formation Mechanisms and Control of External and Inner Bubble Morphology in Microcellular Injection Molding, Polymer Engineering and Science—2015.

Chu et al., Estimation of the foaming temperature of mold-opening foam injection molding process, Journal of Cellular Plastics, 2016, vol. 52(6) 619-641.

Uneyama et al., Institute of Science and Engineering, Kanazawa University, Compressive Behavior of Moderately Expanded Low Density Polyethylene (LDPE) Foams, Nihon Reoroji Gakkaishi, vol. 44, No. 1, 29-38, (Journal of the Society of Rheology, Japan), ©2016 The Society of Rheology, Japan.

Banerjee et al., Dynamic rheology and foaming behaviour of styrene-ethylene-butylene-styrene/polystyrene blends, Journal of Cellular Plastics, 2017, vol. 53(4) 389 406.

Chu et al., Department of Mechanical and Industrial Engineering, University of Toronto, Toronto, Ontario, Canada, Cell Nucleation in High-Pressure Foam Injection Molding, SPE ANTEC® Anaheim 2017.

Hossieny et al., Characterization of hard-segment crystalline phase of poly(ether-block-amide) (PEBAX®) thermoplastic elastomers in the presence of supercritical CO2 and its impact on foams, Article in Polymer—Feb. 2017.

REHAU Radiant Heating Systems Design Guide, REHAU Unlimited Polymer Solutions, Sep. 2017.

Shahi et al., An experimental study on foaming of linear low-density polyethylene/ high-density polyethylene blends, Journal of Cellular Plastics, 2017, vol. 53(1) 83-105.

Wang et al., Low-density and structure-tunable microcellular PMMA foams with improved thermal-insulation and compressive mechanical properties, European Polymer Journal 95 (2017) 382-393.

Bahreini et al., Influence of molecular structure on the foam-ability of polypropylene: Linear and extensional rheological fingerprint, Journal of Cellular Plastics, 2018, vol. 54(3) 515-543.

Duborper et al., Design of Biobased Poly(Butylene Succinate) Foams by Single-Screw Extrusion: Identification of Relevant Rheological Parameters Controlling Foam Morphologies, Polymer Engineering and Science—2018.

Dutta et al., Evaluation of polypropylene/clay nanocomposite foamability based on their morphological and rheological aspects, Journal of Cellular Plastics, 2018, vol. 54(5) 829-850.

(56) References Cited

OTHER PUBLICATIONS

Laguna-Gutierrez et al., Microcellular foaming by using subcritical CO2 of crosslinked and non-crosslinked LDPE/clay nanocomposites, Journal of Cellular Plastics, 2018, vol. 54(2) 257-282.

Lohr et al., Process comparison on the microstructure and mechanical properties of fiber-reinforced polyphenylene sulfide using MuCell technology, Journal of Reinforced Plastics and Composites, 2018, vol. 37(15) 1020-1034.

Sadik et al., Dsc studies on the decomposition of chemical blowing agents based on citric acid and sodium bicarbonate, Thermochimica Acta 659 (2018) 75-81.

Wang et al., Lightweight and strong microcellular injection molded PP/talc nanocomposite, Composites Science and Technology 168 (2018) 38-46.

Hopmann et al., Improvement of foamed part surface quality with variothermal temperature control and analysis of the mechanical properties, Journal of Cellular Plastics, 2019, vol. 55(5) 507-522.

Nobe et al., Effects of SCF Content, Injection Speed, and CF Content on the Morphology and Tensile Properties of Microcellular Injection-Molded CF/PP, Composites, Polymer Engineering and Science—2019.

Uneyama et al., Effect of Pore Size Distribution on Compressive Behavior of Moderately Expanded Low-Density Polyethylene Foams, Polymer Engineering and Science—2019.

Ykhlef et al., Development of bio-based poly(butylene succinate) formulations for microcellular injection foaming, International Journal of Material Forming (2019) 12:1009-1022.

Zhao et al., High-expanded foams based on novel long-chain branched poly(aryl ether ketone) via ScCO2 foaming method, Polymer 165 (2019) 124-132.

Zhao et al., Injection Molded Strong Polypropylene Composite Foam Reinforced with Rubber and Talc, Macromolecular Materials and Engineering, @ 2019 WILEY-VCH Verlag GmbH & Co. KGaA, Weinheim.

Zhao et al., Lightweight and strong fibrillary PTFE reinforced polypropylene composite foams fabricated by foam injection molding, European Polymer Journal 119 (2019) 22-31.

Radiant Floor Heating Manifold Panel | Radiant Floor Heating Panels, https://www.hydronicheating.com/heatply-radiant-floor-heating-manifold-panels-p/mrr390 . . . , Aug. 30, 2019.

Adams, Slimming Down, Technology, materials, machinery are keys to making parts lighter, Plastic Machinery Magazine, Apr. 2020.

Ellingham et al., Subcritical gas-assisted processing of ethylene vinyl alcohol + nanoclay composites, Polymer Composites. 2020;41:1584-1594.

Morris Coupling Company, More than the Sum of Our Parts, Foaming is one of the several techniques manufactures use to make lighter-weight, but still strong, parts, like the ball bearing roller, left, and motorcycle seat, Plastic Machinery Magazine, Apr. 2020.

MuCell Processes, Trexel, Inc., Effects of the MuCell® Molding Process, 042220.

Palutkiewicz et al., The influence of blowing agent addition, talc filler content, and injection velocity on selected properties, surface state, and structure of polypropylene injection molded parts, Cellular Polymers, 2020, vol. 39(1) 3-30.

Tony Deligio, New Process & Material Permits Big Weight Savings on Foamed Parts, Retrieved from https://www.ptonline.com/articles/new-process-material-permits-big-weight-savings-on-foamed-parts, Apr. 28, 2017, 3 pages.

International Search Report for International Application No. PCT/US20/40087, dated Sep. 25, 2020, 6 pages.

Written Opinion for International Application No. PCT/US20/40087, dated Sep. 25, 2020, 8 pages.

Ribe et al., Liquid Rope Coiling, Annual Review of Fluid Mechanics, vol. 44, pp. 249-266, published on Oct. 10, 2011, 20 pages.

\* cited by examiner

POLYMER FOAM ARTICLES AND METHODS OF MAKING POLYMER FOAMS

CROSS REFERENCE TO RELATED APPLICATIONS

This application is a Continuation of U.S. patent application Ser. No. 17/360,665 filed Jun. 28, 2021; which is a Continuation-in-Part of U.S. patent application Ser. No. 17/333,254 filed May 28, 2021; which is a Continuation of U.S. patent application Ser. No. 17/077,686 filed Oct. 22, 2020 and issued as U.S. Pat. No. 11,021,587; which is a Continuation of U.S. patent application Ser. No. 16/914,993 filed Jun. 29, 2020 and issued as U.S. Pat. No. 10,982,066; which claims the benefit of U.S. Provisional Patent Application No. 62/867,516 filed Jun. 27, 2019.

BACKGROUND

Foamed polymer articles are widely employed in the industry due to the highly desirable attribute of providing high strength associate with solid polymer articles, while also delivering a reduction of density and therefore in the amount of polymer used to form an article of a selected volume. Additionally, the industry enjoys the benefits provided by the reduction in the weight of a foamed article compared with its solid counterpart, while still obtaining the benefits of strength, toughness, impact resistance, etc. delivered by the polymer itself.

The industry has thus developed several now-conventional methods to entrain gas into thermoplastic polymers to make such foam articles. To mold a foamed thermoplastic polymer article using a gas, commercial guidelines and industrial practice employ a melt mixing apparatus operable to maintain a pressure to limit expansion of a gas in the interior of the apparatus while melt mixing the gas or a source of a gas with the thermoplastic polymer, further at a temperature above a melt temperature of the thermoplastic polymer. Such processes and apparatuses are designed to minimize formation of pneumatoceles, or pockets of gas, that would otherwise form by expansion of the gas in the molten thermoplastic polymer. Thus, while residing within and disposed within the melt mixing apparatus, a thermoplastic polymer may include a source of a gas or the gas itself dissolved or dispersed therein, while including no pneumatoceles or substantially no pneumatoceles. A mixture of molten thermoplastic polymer and a gas that is at or above the temperature at which it would form pneumatoceles at atmospheric pressure, while including no pneumatoceles or substantially no pneumatoceles may be referred to as a molten pneumatic mixture. The temperature at which the gas, or pneumatogen, would form pneumatoceles in the molten pneumatic mixture at atmospheric pressure may be referred to as the critical temperature. Melt mixing apparatuses well known in the art are thus designed and adapted to make and dispense molten pneumatic mixtures. Further, such apparatuses are suitable to make molten pneumatic mixtures by adding a nascent, latent, or potential gas that is released at a characteristic temperature or that forms by exothermic or endothermic chemical reaction at a characteristic temperature. The critical temperature of a nascent, latent, or potential gas is the temperature at which the reaction occurs or a gas is released into the thermoplastic polymer. All such materials and processes are well understood and melt mixing apparatuses of varying design are widely available commercially for this purpose. Melt mixing apparatuses commonly employed are single screw or twin screws extruders modified to have a pressurized chamber at the distal end of the screw to receive a set amount, or "shot" of a molten pneumatic mixture that travels during mixing by operation of the screw to urge the molten pneumatic mixture toward the pressurized chamber.

Upon building up the set amount or shot in the pressurized chamber, the molten pneumatic mixture is dispensed from the melt mixing apparatus and is directed by fluidly connected tubes, pipes, etc. into the cavity of a mold that obtains a desired shape. Dispensing is generally carried out to maximize the amount of foaming (pneumatocele formation) that occurs in the mold cavity by release of the pressure while the thermoplastic polymer is still molten. The expanded foam in the cavity is then cooled to result in a foamed article. Foamed parts molded using this methodology are referred to in the art as injection molded foam parts. The techniques are generally limited in scope to make parts having thicknesses of about 2 cm or less.

Injection molding processes employing pneumatogen sources to induce a foam structure in molded parts can be understood from a recent peer-reviewed journal article by Bociaga et al., "The influence of foaming agent addition, talc filler content, and injection velocity on selected properties, surface state, and structure of polypropylene injection molded parts." *Cellular Polymers* 2020, 39(1) 3-30. In this publication the process conditions typically employed for molding of standard injection molded ISO test bars of 4.1 mm thickness were systematically changed to create 16 different combinations of the process settings and formulation variables (concentration of pneumatogen source, filler content, injection velocity, injection time, hold time, and hold pressure). The authors teach that manipulating the process and formulation produces some changes in the foam structure in the resulting foam parts, but all the variables produced parts having a "skin layer", which is a term of art to describe a highly characteristic region near the surface of an injection molded foam article that is free or substantially free of pneumatoceles.

Inspection of the surface of an injection molded foamed article, and of the area extending about 500 microns beneath the surface in any direction, reveals a solid thermoplastic region—that is, the regions is free of pneumatoceles or substantially free of pneumatoceles. Foam parts arising from injection molding in accordance with conventional injection molding processes include the skin layer feature. Additionally, the skin layer of most such parts is significantly thicker than 500 μm and may be 1 mm, 2 mm, 3 mm, or even thicker depending on the methods, apparatuses, and materials employed.

In order to make large foamed parts (such as pallets or wheelbarrow bodies, for example), the conventional processes above are insufficient because the large mold cavities induce an excess pressure drop as the molten pneumatic mixture flows and expands during filling of the mold, and the pneumatoceles may form but then coalesce or leak from the viscous polymer flow during filling. Thus, in some cases of "structural foam" molding, multiple nozzles are used simultaneously to fill large or thick mold cavities quickly. In other cases significant backpressure may be applied within the mold cavity to prevent pneumatocele formation during filling; release of pressure after filling the mold operates to allow pneumatocele formation substantially within the mold cavity. Both approaches are often used in a single process.

However, the foregoing structural foam molding processes do not solve a problem that has effectively blocked the industry from developing very large parts. As is well understood, areas near the surface of a molten mass will cool more rapidly than the interior thereof, and a cooling gradient of temperature develops within the mass. The cooling rate at points deepest within the mass are the slowest. In terms of large mold cavities filled with a mass of molten polymer or pneumatic mixture, an interior region of the mass may cool so slowly that viscous flow of the thermoplastic allows pneumatocele coalescence, forming large polymer-free pockets and disrupting the intended continuous polymer matrix defining such foams. This effect may be exacerbated by shrinkage of polymer volume as it cools to a temperature below a melt transition thereof. For large foamed parts, this effect can even lead to complete collapse of the foam structure in the interior of the part.

The combined strength and density reduction associated with foamed articles is not realized without a continuous polymer matrix throughout the part. Foamed parts having large polymer-free areas or voids compromise the structural integrity of the part, which makes such parts unfit for its intended use. These severe technical issues have limited the industrial application of polymer foams to many otherwise highly useful and beneficial applications. Accordingly, there is an ongoing need to provide improved methods for making foamed articles, particularly large or thick foamed articles. There is an ongoing need to obtain parts having a continuous foam structure throughout. There is a particular need to obtain parts having a thickness greater than 2 cm and having a continuous foam structure throughout. There is an ongoing need in the industry to address such needs using conventional apparatuses and materials.

SUMMARY OF THE INVENTION

Described herein is a method of making a molten polymer foam. The method includes: adding a thermoplastic polymer and a pneumatogen source to an extruder; heating and mixing the thermoplastic polymer and pneumatogen source in the extruder under a pressure to form a molten pneumatic mixture, wherein the temperature of the molten pneumatic mixture exceeds the critical temperature of the pneumatogen source; collecting an amount of the molten pneumatic mixture in a collection area of the extruder; defining an expansion volume in the collection area to cause a pressure to drop (depressurization) in the collection area; allowing an expansion period of time to elapse after the defining; and dispensing a molten polymer foam from the collection area. In embodiments, the expansion volume is selected to provide between 10% and 300% of the total expected molten foam volume in the collection area, further wherein the rate of depressurization (that is, the rate of defining the pressure drop) is at least 0.01 GPa/s, in embodiments 0.1 GPa/s or greater; and in some embodiments is 1.0 GPa/s or even greater, such as up to 5.0 GPa/s. Depressurization rates of greater than 0.01 GPa/s are referred to herein as "rapid depressurization". In some such embodiments, rapid depressurization is coupled with a high backpressure, wherein backpressure is the amount of pressure required e.g. in the collection area or in one or more additional areas of the apparatus used to carry out the depressurization, such as in a barrel area of an injection molding machine to initiate the depressurization, further wherein "high backpressure" means a backpressure of 500 kPa or greater, such as a backpressure of 500 kPa and as high as 25 MPa, further as limited by the injection molding machine employed to carry out the depressurization.

By using the methods described herein, further employing rapid depressurization of the molten pneumatic mixture in the collection area, in embodiments further employing high backpressure to initiate the rapid depressurization, a stabilized molten polymer foam is obtained that is capable of forming polymer foam articles having a shape and volume sufficient to accommodate a theoretical 20 cm-1000 cm diameter sphere in at least one location in the interior thereof, and are further characterized as having a continuous thermoplastic polymer matrix defining a plurality of pneumatoceles throughout the entirety of the article, and total article volumes of 1000 cm$^3$ and greater, 2000 cm$^3$ or greater, 3000 cm$^3$ or greater, 4000 cm$^3$ or greater, or 5000 cm$^3$ or greater, or 2000 cm$^3$ to 5000 cm$^3$ or even greater. In some such embodiments, a surface region extending 500 microns from the surface of the article comprises compressed pneumatoceles throughout the entirety thereof.

We have further found that by employing rapid depressurization of the collection area, in embodiments further employing high backpressure, an expansion period between 0 seconds 5 seconds may be employed to obtain polymer foam articles characterized as having a continuous thermoplastic polymer matrix defining a plurality of pneumatoceles throughout the entirety of the article. We have further found that by employing rapid depressurization, in embodiments further employing high backpressure, an expansion period of between 600 seconds and 2000 seconds or even longer can be achieved. The molten pneumatic mixture is undisturbed or substantially undisturbed during the expansion period.

In some embodiments, the molten pneumatic mixture is subjected to 1 to 5 cycles of pressurization followed by depressurization (obtaining a pressure drop), prior to dispensing the molten polymer foam from the collection area.

In embodiments the dispensing is dispensing to a forming element; in some embodiments the forming element is a mold. In embodiments there is a fluid connection between the collection area of the extruder and the mold. In embodiments, the dispensing is an unimpeded flow of the molten polymer foam. In some embodiments, the dispensing is dispensing a linear flow of molten polymer foam. In embodiments, the molten polymer foam contacts the mold and partially, substantially, or completely fills the mold cavity.

In embodiments the method further comprises cooling the dispensed molten polymer foam to a temperature below a melt transition of the thermoplastic polymer. In embodiments, one or more additional materials to the extruder, wherein the one or more materials are selected from colorants, stabilizers, brighteners, nucleating agents, fibers, particulates, and fillers. In embodiments the pneumatogen source is a pneumatogen and the addition is a pressurized addition. In other embodiments the pneumatogen source comprises a bicarbonate, a polycarboxylic acid or a salt or ester thereof, or a mixture thereof.

Also disclosed herein is a polymer foam article made in using the methods, materials, and apparatuses described herein. In embodiments, the polymer foam article has a foam structure throughout the entirety thereof characterized as a continuous polymer matrix defining a plurality of pneumatoceles therein. In embodiments, a surface region of a polymer foam article comprises compressed pneumatoceles. In embodiments, the surface region is the region extending 500 microns from the surface of the article.

Also disclosed herein are thermoplastic polymer foam articles, the article having a foam structure throughout the entirety thereof that is a continuous polymer matrix defining a plurality of pneumatoceles therein, further wherein a surface region of the article comprises compressed pneumatoceles. In some embodiments, the surface region is the region of the article extending 500 microns from the surface thereof. In some embodiments, the article comprises compressed pneumatoceles more than 500 microns from the surface thereof.

In embodiments, the polymer foam article comprises a shape and a volume wherein a sphere having a diameter of 2 cm or more would fit within the polymer foam article in at least one location, without protruding from the surface. In some such embodiments, the polymer foam article further includes one or more locations wherein a sphere having a diameter of 2 cm would not fit within the polymer foam article, and would protrude from the surface. In embodiments the polymer foam article has a volume of more than 1000 $cm^3$, 1000 $cm^3$ to 5000 $cm^3$, 2000 $cm^3$ to 5000 $cm^3$ or even more than 5000 $cm^3$. In embodiments, the polymer foam article has a shape and a volume wherein at least one (theoretical) sphere having a diameter between 2 cm and 1000 cm, such as between 20 cm and 1000 cm, would fit within the polymer foam article in at least one location, without protruding from the surface of the article. In embodiments, the polymer foam article comprises a volume of more than 2000 $cm^3$ and a shape and a volume wherein a sphere having a diameter of 2 cm or more would fit within the polymer foam article in at least one location, without protruding from the surface. In embodiments, the polymer foam article comprises a volume between 2000 $cm^3$ and 5000 $cm^3$ and a shape and volume wherein a sphere having a diameter of at least 20 cm would fit within the polymer foam article in at least one location, without protruding from the surface. In embodiments, the polymer foam article further comprises a volume of more than 5000 $cm^3$ and a shape wherein a sphere having a diameter of 20 cm to 1000 cm would fit within the polymer foam article in at least one location, without protruding from the surface. In embodiments, the polymer foam article comprises a shape wherein one sphere having a diameter of 20 cm to 1000 cm would fit within the polymer foam article in at least one location, without protruding from the surface; in other embodiments, the polymer foam article has a shape wherein two spheres having a diameter of 20 cm to 1000 cm would fit within the polymer foam article without protruding from the surface. In still other embodiments, the polymer foam article has a shape wherein three or more spheres having a diameter of 20 cm to 1000 cm would fit within the polymer foam article without protruding from the surface.

In embodiments, materials used to make the polymer foam articles are not particularly limited and include thermoplastic polymers selected from polyolefins, polyamides, polyimides, polyesters, polycarbonates, poly (lactic acid)s, acrylonitrile-butadiene-styrene copolymers, polystyrenes, polyurethanes, polyvinyl chlorides, copolymers of tetrafluoroethylene, polyethersulfones, polyacetals, polyaramids, polyphenylene oxides, polybutylenes, polybutadienes, polyacrylates and methacryates, ionomeric polymers, poly etheramide block copolymers, polyaryletherkeytones, polysulfones, polyphenylene sulfides, polyamide-imide copolymers, poly(butylene succinate)s, cellulosics, polysaccharides, and copolymers, alloys, admixtures, and blends thereof. In some embodiments, the thermoplastic polymer is a mixed plastic waste stream. The continuous polymer matrix optionally further includes one or more additional materials selected from colorants, stabilizers, brighteners, nucleating agents, fibers, particulates, and fillers.

We have found that the polymer foam articles formed using the foregoing processes are 100% recyclable by subsequent melt molding processes. The polymer foam articles made in accordance with the methods described herein, may be recycled using the methods described herein. Thus, in embodiments, a first polymer foam article in accordance with any of the embodiments described herein, and formed in accordance with any of the methods described herein, is also a source of thermoplastic polymer for forming a second polymer foam article in accordance with the methods described herein. In such embodiments, the first polymer foam article is a recycled material feedstock when used to make a second polymer foam article.

Other objects and features will be in part apparent and in part pointed out hereinafter.

BRIEF DESCRIPTION OF THE DRAWINGS

FIG. 2-2 is a line drawing of a photographic image of a part molded according to a molten-foam injection molding (MFIM) process as described in Example 1.

FIG. 2-3 is a line drawing of a photographic image of a piece cut from the part made according to the standard foam molding process as described in Example 1.

FIG. 2-4 is a line drawing of a photographic image of a piece cut from the part made according to the MFIM process as described in Example 1.

FIG. 2-5 is a photographic image of a piece cut from the part made according to the standard foam molding process as described in Example 1.

FIG. 2-6 is a photographic image of a piece cut from the part made according to the MFIM process as described in Example 1.

FIG. 5 is a graph including plots of part density versus decompression volume for various decompression times for Trial B as described in Example 3.

FIG. 6 is a graph including plots of strain versus time for parts made in Trials A, B, and C as described in Example 4.

Corresponding reference characters indicate corresponding parts throughout the drawings.

DETAILED DESCRIPTION

Figure 1A:
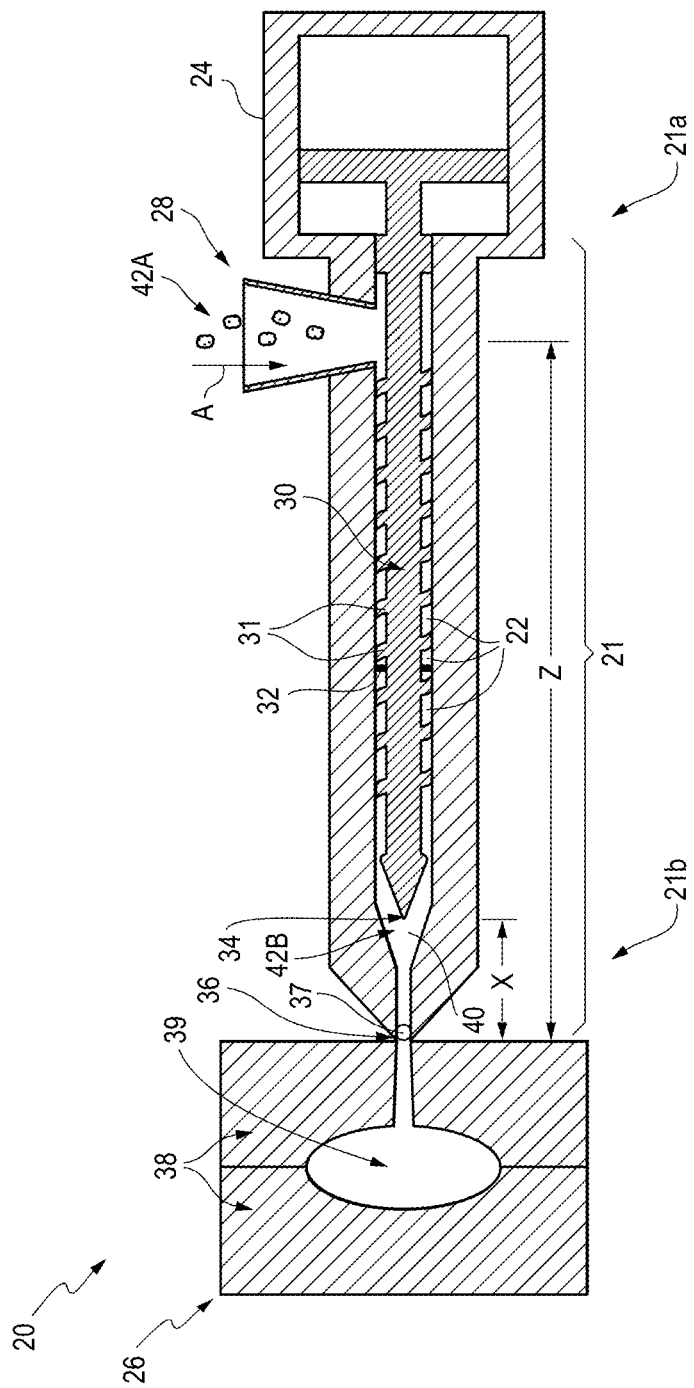
FIGS. 1A-1B illustrate a melt mixing apparatus useful for carrying out the methods described herein.

Although the present disclosure provides references to preferred embodiments, persons skilled in the art will recognize that changes may be made in form and detail without departing from the spirit and scope of the invention. Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

As used herein, "polymer matrix", including "continuous polymer matrix", "thermoplastic polymer matrix", "molten polymer matrix" and like terms refer to a continuous solid or molten thermoplastic polymer phase or an amount of a solid or molten thermoplastic polymer defining a continuous phase.

As used herein, "molten mixture" means a molten thermoplastic polymer or mixture of molten thermoplastic polymers, optionally including one or more additional materials mixed with the molten thermoplastic polymer or mixture thereof.

As used herein, "molten pneumatic mixture" means a mixture of a thermoplastic polymer and a pneumatogen source, wherein the polymer is at a temperature above a melt temperature thereof and the temperature of the mixture exceeds the critical temperature of the pneumatogen source, further wherein the mixture is characterized as having no pneumatoceles or substantially no pneumatoceles. The molten pneumatic mixture is present under a pressure sufficient to prevent pneumatocele formation, or substantially prevent pneumatocele formation, or cause the pneumatogen source to be dissolved or dispersed within the thermoplastic polymer either as a gas or a supercritical liquid. "Substantially prevent pneumatocele formation", "substantially no pneumatoceles" and like terms with respect to a molten pneumatic mixture means that while pressure conditions may be used to prevent pneumatocele formation in a molten mixture, defects, wearing of parts, and the like in processing equipment may cause unintentional pressure loss that does not interfere overall with obtaining and maintaining a pressurized molten mixture.

As used herein, "foam", "polymer foam", thermoplastic polymer foam", "molten foam", "molten polymer foam" and similar terms refer generally to a continuous polymer matrix defining a plurality of pneumatoceles as a discontinuous phase dispersed therein.

As used herein, the term "pneumatocele" means a discrete void defined by and surrounded by a continuous thermoplastic polymer matrix.

As used herein, the term "pneumatogen" means a gaseous compound capable of defining a pneumatocele within a molten thermoplastic polymer matrix.

As used herein, the term "critical temperature" means the temperature at which a pneumatogen source produces a pneumatogen at atmospheric pressure.

As used herein, the term "pneumatogen source" refers to a latent, potential, or nascent pneumatogen, added to or present within a thermoplastic polymer matrix, such as dissolved in the matrix and/or present as a supercritical fluid therein; or in the form of an organic compound that produces a pneumatogen by a chemical reaction; or a combination of these; or wherein the pneumatogen source is a pneumatogen, becomes a pneumatogen, or produces a pneumatogen at a critical temperature characteristic of the pneumatogen source.

As used herein, the term "rapid depressurization" means a pressure drop that occurs at a rate of greater than 0.01 GPa/s, such as 0.01 GPa/s to 5 GPa/s.

As used herein, the term "high backpressure" means a backpressure of 500 kPa or greater, such as a backpressure of 500 kPa to 25 MPa, further wherein backpressure is the threshold amount of pressure required e.g. in the collection area or throughout the barrel of an injection molding machine that initiates depressurization.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. Further, where "about" is employed to describe a range of values, for example "about 1 to 5" the recitation means "1 to 5" and "about 1 to about 5" and "1 to about 5" and "about 1 to 5" unless specifically limited by context.

As used herein, the term "substantially" means "consisting essentially of", as that term is construed in U.S. patent law, and includes "consisting of" as that term is construed in U.S. patent law. For example, a composition that is "substantially free" of a specified compound or material may be free of that compound or material, or may have a minor amount of that compound or material present, such as through unintended contamination, side reactions, or incomplete purification. A "minor amount" may be a trace, an unmeasurable amount, an amount that does not interfere with a value or property, or some other amount as provided in context. A composition that has "substantially only" a provided list of components may consist of only those components, or have a trace amount of some other component present, or have one or more additional components that do not materially affect the properties of the composition. Additionally, "substantially" modifying, for example, the type or quantity of an ingredient in a composition, a property, a measurable quantity, a method, a value, or a range, employed in describing the embodiments of the disclosure, refers to a variation that does not affect the overall recited composition, property, quantity, method, value, or range thereof in a manner that negates an intended composition, property, quantity, method, value, or range. Where modified by the term "substantially" the claims appended hereto include equivalents according to this definition.

As used herein, any recited ranges of values contemplate all values within the range and are to be construed as support for claims reciting any sub-ranges having endpoints which are real number values within the recited range. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

In embodiments disclosed herein, a method of extruding a molten polymer foam comprises, consists essentially of, or consists of adding a thermoplastic polymer and a pneumatogen source to an inlet situated on a first end of an extruder; heating and mixing the thermoplastic polymer and the pneumatogen source in the extruder to form a molten pneumatic mixture, wherein the temperature of the molten pneumatic mixture exceeds the critical temperature of the pneumatogen source; collecting an amount of the molten pneumatic mixture in a barrel region of the extruder located proximal to a second end of the extruder; forming an expansion volume in the barrel region, wherein the forming causes a pressure to drop in the barrel region; allowing a period of time to elapse after the pressure drop; and dispensing a molten polymer foam from the extruder.

In embodiments, the extruder is any machine designed and adapted for melting, mixing, and dispensing thermoplastic polymers and mixtures thereof, optionally with one or more additional materials such as fillers, nucleating agents, diluents, stabilizers, brighteners, and the like; and further wherein the extruder includes a collection area for a collecting a mass of mixed, molten material and further is capable of forming an expansion volume in the collection area that is coupled with a pressure drop. Extruders are well known in the industry and are broadly used for melting, mixing, and manipulating molten thermoplastic polymers. In embodiments, the extruder is adapted and designed for melting, mixing, and dispensing a mixture of a thermoplastic polymer and a pneumatogen source. Such extruders are adapted to obtain molten pneumatic mixtures under a pressure sufficient to prevent or substantially prevent pneumatocele formation in the molten pneumatic mixture.

In embodiments, extruders useful to carry out the present methods include an interior volume, referred to in the art as the "barrel" of the extruder, designed and adapted for receiving a solid thermoplastic polymer, further for carrying out the melting and mixing thereof. In embodiments, the extruder defines an interior volume designed for receiving a solid thermoplastic polymer and a pneumatogen or a pneumatogen source, further for carrying out the melting of at least the polymer and for mixing the pneumatogen or pneumatogen source with the molten polymer to obtain a molten pneumatic mixture. In embodiments the extruder further includes a collection area for a collecting a mass of a molten pneumatic mixture material. In embodiments the extruder further includes means of forming an expansion volume in the collection area that is coupled with a pressure drop.

In embodiments, the extruder is an injection molding machine. In embodiments, the extruder is a SODICK™ molding machine sold by Plustech Inc. of Schaumburg, Ill. In embodiments, the extruder includes either one or two members known in the art as "screws" disposed within the interior volume, known in the art as a "barrel". In embodiments, the screws have a right circular cylindrical shape overall, and further include one or more protruding thread members referred to as "flights". In some embodiments the extruder is a single screw extruder, defined as including one screw movably disposed within the barrel for rotation of the cylinder around the axis thereof, for lateral movement of the cylinder along the axis thereof, or a combined movement comprising both rotation and lateral movement. In other embodiments the extruder is a twin screw extruder, defined as including two screws movably disposed within the barrel in substantially parallel and proximal relationship with respect to each other, further where each screw is movably disposed within the barrel for rotation of the cylinder around the axis thereof, for lateral movement of the cylinder along the axis thereof, or a combined movement comprising both rotation and lateral movement. The screws of a twin screw extruder are further arranged so that the action of the screws when turned in counter-rotating fashion define a designed mixing and transportation pattern of a molten thermoplastic polymer disposed within the barrel.

In embodiments, the extruder is further adapted and designed to receive a solid thermoplastic polymer. In embodiments, the barrel of the extruder is further adapted and designed to receive a solid thermoplastic polymer by including an inlet situated near a first end of the extruder and adapted to add a solid thermoplastic polymer to the barrel. The solid thermoplastic polymer is added to the inlet in any suitable format, for example beads, pellets, powders, ribbons, or blocks, which are all familiar formats to those of skill. In embodiments, the extruder includes second, third, or even fourth or higher numbers of inlets designed and adapted for adding or introducing one or more additional materials comprising one or more solids, liquids, or gases to the interior volume of the extruder, further for mixing the one or more additional materials with the thermoplastic polymer. The interior volume of the extruder is adapted for receiving, containing, and melting a thermoplastic polymer and optionally one or more additional materials; and subjecting the thermoplastic polymer and the optional one or more additional materials to heat, shear and mixing to form a molten mixture, while contemporaneously transporting the molten mixture in a direction generally proceeding from the first end thereof to a second end thereof. In embodiments where the extruder is a single screw extruder or a twin screw extruder, the shear, mixing, and transportation is accomplished by rotating the screw or counter-rotating two screws.

In embodiments the extruder interior volume, or a portion thereof, is surrounded or partly surrounded by one or more heat sources. Heat sources suitably adapted for heating the interior volume of an extruder include, in various embodiments, heated water jackets, heated oil jackets, electrical resistance heaters, open or jacketed flames, or another heat source. The heat source is operable to raise a temperature in the interior volume of the extruder. The temperature is suitably selected by the operator for melting a thermoplastic polymer and/or maintaining a desired temperature within a portion of the interior volume of the extruder. In embodiments, an extruder is adapted to include more than one heat source, wherein the heat sources are independently operable to enable one of skill to provide a range of temperature "zones" within the interior volume. Additional temperature zones may be included in some extruders in association with adding one or more materials to an inlet thereof or dispensing one more materials from an outlet thereof. In embodiments, temperatures within the one or more temperature zones are set by the operator for increased control and optimization of melting, mixing, shearing, and transportation of the thermoplastic polymer and optionally one or more additional materials.

The extruder is conventionally designed and adapted to apply and maintain a pressure within the interior volume thereof during the heating, mixing and transportation of a molten mixture. In embodiments, the extruder is designed and adapted to apply and maintain a first pressure within the interior volume or barrel during the heating, mixing and transportation of a molten mixture. In embodiments, the pressure inside the barrel during the heating, mixing and transportation of a molten pneumatic mixture is sufficient to prevent or substantially prevent leakage of molten pneumatic mixture from the barrel. In embodiments, the pressure within the barrel is sufficient to prevent a molten pneumatic mixture from developing pneumatoceles when a temperature within the barrel exceeds the critical temperature of the pneumatogen source. In embodiments, the pressure within the barrel is substantially sufficient to prevent a molten pneumatic mixture from developing pneumatoceles when a temperature within the barrel exceeds the critical temperature of the pneumatogen source. In such embodiments described in this paragraph, "substantially" refers to inadvertent leaking of material or inadvertent loss of pressure from the barrel due to manufacture, age, or manner of use of the extruder and/or the screw as is familiar to one of skill. Further in such embodiments "substantially" in the context of "sufficient to prevent a molten pneumatic mixture from developing pneumatoceles", means that a small percentage, such as up to 10% of the pneumatogen may inadvertently form pneumatoceles while the pressure is maintained on a molten pneumatic mixture; but that it is the goal of the operator to maintain sufficient pressure to prevent pneumatoceles from forming.

In embodiments, the barrel of the extruder includes a collection area for collecting an amount of a molten mixture in preparation for dispensing the molten mixture from the extruder. The mass of the molten mixture is selected by the user. In embodiments, the molten mixture is a molten pneumatic mixture. In such embodiments, the term of art used to describe the collecting of a mass of a molten pneumatic mixture in a collection area of the barrel of the extruder is referred to as "building a shot". As will be understood by one skilled in the art of injection molding, to build a shot, a mass of a molten pneumatic mixture is collected by transporting the molten pneumatic mixture from the first end toward the second end of the extruder—that is, toward and into the collection area—by the rotation of the screw or screws (or another mixing element) and by further allowing the molten pneumatic mixture to accumulate in the collection area until the entirety of the desired mass of molten pneumatic mixture is collected and is disposed in the collection area of the barrel. The collection area is situated between the screw or screws and the second end of the extruder. In some embodiments the collection area is in pressurized communication with the remainder of the barrel, while in other embodiments the collection area is pressurably isolated relative to the remainder of the barrel, for example by providing an o-ring, check ring, or other sealing mechanism annularly disposed around the screw or screws to seal or pressurably isolate the collection area from the extruder barrel.

In conventional injection molding to form thermoplastic polymer foams, a mass of molten pneumatic mixture, or "shot", is collected or "built" in the collection area by transporting the molten pneumatic mixture toward and into the collection area by the rotation of the screw or screws (or another mixing element). A shot is said to be built when the entire selected mass of molten pneumatic mixture is disposed within the collection area. One of skill will appreciate that the foregoing description of melt mixing apparatuses, such as the mechanical elements and features of an extruder or other melt mixing apparatus, and further the foregoing description of methods of making and collecting molten pneumatic mixtures in a shot, is in accord with conventional apparatuses and methods of using such apparatuses to make molten pneumatic mixtures and to build shots thereof.

In accord with these known methods and apparatuses, a shot of molten pneumatic mixture is conventionally prevented or substantially prevented from developing pneumatoceles while present in the barrel, including during the mixing, heating, transporting, and collecting and further while disposed within the collection area. Conventionally, when a desired shot is collected in the collection area, a nozzle, gate, door, or other movable barrier situated between the collection area and an outlet situated on the second end of the extruder (in some embodiments a shut-off nozzle, as will be recognized by one of skill in the art of injection molding) is opened, providing fluid connection from the barrel to the outlet to dispense the shot from the extruder. In some embodiments when the gate or door is opened, a mechanical plunger is applied to urge the molten pneumatic mixture from the barrel and through the outlet. In embodiments the extruder screw or screws are suitably employed in a lateral plunging movement in a direction toward the second end of the extruder, which in turn urges the molten pneumatic mixture from the collection area of the barrel and through the outlet.

We have found that after building a shot of a molten pneumatic mixture in the collection area of an extruder, it is advantageous to form, provide, or define an expansion volume in the collection area of the extruder, wherein the defining is accompanied by a pressure drop in the collection area; allowing a period of time to pass after the defining, referred to herein as the expansion period; and dispensing the shot from the extruder after the expansion period. The shot in such embodiments is dispensed in the form of a molten polymer foam. In embodiments, the expansion volume is defined proximal to the shot disposed within the collection area of the extruder. In embodiments, the shot is not mixed or subjected to applied shear or extension while the expansion volume is in the process of being defined. In embodiments, the shot is not transported during the expansion period. In embodiments, the shot is allowed to stand, or reside, undisturbed or substantially undisturbed in the collection area during the expansion period. In any of the foregoing embodiments, the shot may be heated during the expansion period; however, in some embodiments, no heat is added to the shot during the expansion period.

After the expansion period has elapsed or passed, a molten polymer foam may be dispensed from the second end of the extruder. The molten polymer foam includes a plurality of pneumatoceles. Without being limited by theory, we believe that the pneumatoceles form when the molten pneumatic mixture is subjected to the expanded volume and accompanying pressure drop (second pressure). In accord with known principles of physics, the formation of the pneumatoceles is likely caused by the defining of the expanded volume and concomitant pressure drop in the collection area of the barrel, together with the expansion period in which the pneumatoceles form by action of the pneumatogen. In some embodiments, defining the expansion volume after building the shot results in superior properties attributable to the molten polymer foam that is dispensed. Stated differently, we have found that forming a molten pneumatic mixture under pressure, followed by lowering the pressure and concomitantly forming a defined volume prior to dispensing the mixture (such as into a mold cavity), results in a molten polymer foam that upon cooling provides solidified polymer foam articles having unexpected and highly beneficial physical properties.

We have discovered that molten polymer foams dispensed from the extruder in accord with the foregoing methods obtain significant technical benefits. These benefits are observed in the solidified polymer foams that result from cooling the molten polymer foam to a temperature below a melt transition temperature of the thermoplastic polymer. The structure of articles made using the molten polymer foam dispensed from an extruder after the expansion period is different both macroscopically and microscopically from polymer foams made by conventional methods; and exhibit superior properties suitable for structural members, for example. The polymer foam articles made using the methods, apparatuses, and materials described herein that are characterized as having a continuous thermoplastic matrix throughout the entirety thereof, and a plurality of pneumatoceles distributed throughout the entirety of the polymer foam article. This characterization is true for articles having a shape and a volume wherein a sphere having a diameter of 2 cm would fit within the polymer foam article in at least one location, without protruding from the surface. This characterization is true for articles having a shape and a volume wherein a sphere having a diameter of 2 cm would fit within the polymer foam article in at least one location, without protruding from the surface; further wherein the article has a total volume greater than 1000 $cm^3$, greater than 2000 $cm^3$, between 2000 $cm^3$ and 5000 $cm^3$, or even more than 5000 $cm^3$.

In embodiments, the defining of the expansion volume in a single screw extruder is suitably achieved by moving the screw laterally toward a first end of the extruder and away from the collection area of the extruder where the shot is collected. In embodiments, the defining of the expansion volume in a twin screw extruder is achieved by moving both screws laterally toward a first end of the extruder and away from the region of the extruder where the shot is collected. The lateral moving is optionally accompanied by rotation of the screw or screws. That is, the one or two screws may be rotated during the lateral moving or the rotation may be stopped during the lateral moving. It will be appreciated that the defining of the expansion volume by lateral movement of the one or two screws is advantageously selected by the operator of an extruder to provide a selected expansion volume. That is, the distance of the lateral movement of the screw or screws is suitably selected by the operator to define the selected expansion volume.

Accordingly, in embodiments, the expansion volume is targeted by the operator to add sufficient volume to the collection area to accommodate the total expected molten polymer foam volume; or some percentage thereof. The total theoretical molten polymer foam volume of a shot may be calculated based on the amount of thermoplastic polymer and pneumatogen source plus any additional materials added to build the shot, further assuming all of the pneumatogen source will contribute to formation of pneumatoceles in the molten polymer foam to be obtained. The total expected molten polymer foam volume is the theoretical molten polymer foam volume, minus the expected amount of pneumatogen source dissolved in the polymer at the selected pressure (and therefore not contributing to pneumatoceles). Those of skill will understand that industrially obtained pneumatogen sources are supplied with information suitable to calculate the total expected molten polymer foam volume based on the amount of pneumatogen source added to make the shot, and other processing conditions. Solubility of the pneumatogen in the polymer should be taken into account, as well as the applied pressure during processing. In embodiments, the expansion volume is the difference between the shot volume and the expected molten polymer foam volume. In embodiments, the expansion volume is targeted to provide between 10% and 300% of the total expected molten polymer foam volume in the collection area, for example between 15% and 300%, or between 20% and 300%, or between 25% and 300%, or between 30% and 300%, or between 35% and 300%, or between 40% and 300%, or between 45% and 300%, or between 50% and 300%, or between 55% and 300%, or between 60% and 300%, or between 65% and 300%, or between 70% and 300%, or between 75% and 300%, or between 80% and 300%, or between 85% and 300%, or between 90% and 300%, or between 100% and 300%, or between 100% and 200%, or between 200% and 300%, or 100% to 105% or 100% to 110% or 100% to 115% or 100% to 120% or 105% to 110% or 110% to 115% or 115% to 120% or 120% to 125% or 120% to 150% or 150% to 200% or 200% to 250% or 250% to 300%, or between 10% and 95%, or between 10% and 90%, or between 10% and 85%, or between 10% and 80%, or between 10% and 75%, or between 10% and 70%, or between 10% and 65%, or between 10% and 60%, or between 10% and 55%, or between 10% and 50%, or between 10% and 45%, or between 10% and 40%, or between 10% and 35%, or between 10% and 30%, or between 10% and 25%, or between 10% and 20%, or between 10% and 15%, or between 15% and 20%, or between 20% and 25%, or between 25% and 30%, or between 30% and 35%, or between 35% and 40%, or between 40% and 45%, or between 45% and 50%, or between 50% and 55%, or between 55% and 60%, or between 60% and 65%, or between 65% and 70%, or between 70% and 75%, or between 75% and 80%, or between 80% and 85%, or between 85% and 90%, or between 90% and 95%, or between 95% and 100% of the difference between the shot volume and the expected molten polymer foam volume.

In other embodiments, the expansion volume is targeted to provide between 0.1% and 10% of the total expected molten polymer foam volume in the collection area, for example between 0.2% and 10%, or between 0.5% and 10%, or between 1.0% and 10%, or between 1.5% and 10%, or between 2% and 10%, or between 2.5% and 10%, or between 3% and 10%, or between 3.5% and 100%, or between 4% and 10%, or between 4.5% and 10%, or between 5% and 10%, or between 6% and 10%, or between 7% and 100%, or between 8% and 10%, or between 9% and 10%, or between 1% and 9%, or between 1% and 8%, or between 1% and 7%, or between 1% and 6%, or between 1% and 5%, or between 1% and 4.5%, or between 1% and 4%, or between 1% and 3.5%, or between 1% and 3%, or between 1% and 2.5%, or between 1% and 2%, or between 1% and 1.5%, or between 1.5% and 2%, or between 2% and 2.5%, or between 2.5% and 3%, or between 3% and 3.5%, or between 3.5% and 4%, or between 4% and 4.5%, or between 4.5% and 5%, or between 5% and 6%, or between 6% and 7%, or between 7% and 8%, or between 8% and 9%, or between 9% and 10% of the difference between the shot volume and the expected molten polymer foam volume.

After the expansion volume is defined, in some embodiments a period of time is allowed to pass, or elapse, prior to dispensing the molten polymer foam from the extruder. In embodiments the period of time is referred to as the expansion period. In some embodiments, during the expansion period no mixing, transporting, shearing, or other physical manipulation or additional volume changes are carried out within the collection area during the expansion period. Instead, in such embodiments the shot is allowed to stand within collection area during the expansion period. At the end of the expansion period, a molten polymer foam is dispensed from the extruder outlet. In embodiments, the molten polymer foam is dispensed into a mold cavity, and the molten polymer foam is cooled to a temperature below a melt transition of the thermoplastic polymer to obtain a solidified polymer foam article.

In embodiments, the expansion period is selected by the operator to be about 5 seconds to 600 seconds, depending on the mass of the sample, pneumatogen source and amount, and any additional materials present in the shot. In embodiments, the expansion period is 5 seconds to 600 seconds, or 5 seconds to 500 seconds, or 5 seconds to 400 seconds, or 5 seconds to 300 seconds, or 20 seconds to 600 seconds, or 20 seconds to 500 seconds, or 20 seconds to 400 seconds, or 20 seconds to 300 seconds, or 10 seconds to 200 seconds, or 20 seconds to 200 seconds, or 30 seconds to 200 seconds, or 40 seconds to 200 seconds, or 50 seconds to 200 seconds, or 5 seconds to 190 seconds, or 5 seconds to 180 seconds, or 5 seconds to 170 seconds, or 5 seconds to 160 seconds, or 5 seconds to 150 seconds, or 5 seconds to 140 seconds, or 5 seconds to 130 seconds, or 5 seconds to 120 seconds, or 5 seconds to 110 seconds, or 5 seconds to 100 seconds, or 5 seconds to 90 seconds, or 5 seconds to 80 seconds, or 5 seconds to 70 seconds, or 5 seconds to 60 seconds, or 5 seconds to 50 seconds, or 5 seconds to 40 seconds, or 5 seconds to 30 seconds, or 5 seconds to 20 seconds, or 5 seconds to 10 seconds, or 10 seconds to 15 seconds, or 15 seconds to 20 seconds, or 20 seconds to 25 seconds, or 25 seconds to 30 seconds, or 30 seconds to 35 seconds, or 35 seconds to 40 seconds, or 40 seconds to 45 seconds, or 45 seconds to 50 seconds, or 50 seconds to 55 seconds, or 55 seconds to 60 seconds, or 60 seconds to 70 seconds, or 70 seconds to 80 seconds, or 80 seconds to 90 seconds, or 90 seconds to 100 seconds, or 100 seconds to 110 seconds, or 110 seconds to 120 seconds, or 120 seconds to 130 seconds, or 130 seconds to 140 seconds, or 140 seconds to 150 seconds, or 150 seconds to 160 seconds, or 160 seconds to 170 seconds, or 170 seconds to 180 seconds, or 180 seconds to 190 seconds, or 190 seconds to 200 seconds, or 200 seconds to 250 seconds, 250 seconds to 300 seconds, or 300 seconds to 350 seconds, or 350 seconds to 400 seconds, or 400 seconds to 450 seconds, or 450 seconds to 500 seconds, or 500 seconds to 550 seconds, or 550 seconds to 600 seconds.

Additionally, we have found that expansion periods such as 600 seconds to 2000 seconds or even longer, may be suitably selected by the operator depending on the mass of the sample, pneumatogen source and amount, and any additional materials present in the shot. That is, even a very long residence time in the collection area—30 minutes or even longer—does not result in any deleterious effects to the molten pneumatic mixture or to the solidified polymer foams that result after dispensing and cooling the polymer foam. This result is unexpected, since the molten polymer foam has been allowed an expansion volume, and thus pneumatoceles have formed and are dispersed within the molten, flowable polymer. One of skill would not expect the molten polymer foam to remain molten and undisturbed under reduced pressure for up to 30 minutes or even longer, without significant migration of pneumatoceles from the molten material, and concomitant loss of the continuous polymer matrix defining a plurality of pneumatoceles dispersed throughout the entirety of the resulting polymer foam articles.

Figure 56:
FIG. 56 is a photograph of a cross section of Part 2 made with a decompression time of 0.5 seconds, as described in Example 17.

In embodiments, by using the methods described herein, and employing rapid depressurization of the molten pneumatic mixture in the collection area, and in embodiments further employing high backpressure to initiate the rapid depressurization, a molten polymer foam is obtained that requires no expansion period (expansion period of 0 seconds) or requires only an expansion period of 0.1 second to 5 seconds, such as 0-1 second, 1-2 seconds, 2-3 seconds, 3-4 seconds, or 4-5 seconds to provide a molten polymer foam capable of forming the polymer foam articles described herein. In an injection molding machine, this means that depressurization may be immediately followed by dispensing the molten polymer foam. Thus, when using rapid depressurization, the expansion period is selected by the operator to be about 5 seconds to 0 seconds, depending on the mass of the sample, pneumatogen source and amount, and any additional materials present in the shot. In embodiments, the expansion period is 5 seconds to 0.2 seconds, or 5 seconds to 0.3 seconds, or 5 seconds to 0.4 seconds, or 5 seconds to 0.5 seconds, or 5 seconds to 0.6 seconds, or 5 seconds to 0.7 seconds, or 5 seconds to 0.8 seconds, or 5 seconds to 0.9 seconds, or 5 seconds to 1 seconds, or 5 seconds to 2 seconds, or 5 seconds to 3 seconds, or 5 seconds to 4 seconds, or 0.1 seconds to 4 seconds, or 0.1 seconds to 3 seconds, or 0.1 seconds to 2 seconds, or 0.1 seconds to 1 second, or 1 second to 2 seconds, or 2 seconds to 3 seconds, or 3 seconds to 4 seconds, or 4 seconds to 5 seconds. Example 17 demonstrates an exemplary but nonlimiting expansion period of 0.5 seconds. This expansion period is sufficient to result in a polymer foam article having a continuous polymer matrix defining a plurality of pneumatoceles dispersed throughout the entirety of the article, as shown in FIG. 56.

Collectively, the depressurization at the selected depressurization rate to provide a pressure drop, followed by maintaining the reduced pressure for a selected period, may be referred to as a "depressurization step". Unexpectedly, we have found that the rate of depressurization is inversely related to the expansion period required to obtain a molten polymer foam that in turn provides a polymer foam article when applied to a forming element as described in any of the embodiments herein. Specifically, we have found that by applying rapid depressurization, an expansion time of 0 seconds to 5 seconds may be suitably selected. That is, by depressurizing the molten pneumatic mixture in the collection area at a rate of 0.01 GPa/s to 5.0 GPa/s or higher, in some embodiments no expansion period is required in order to form a molten polymer foam that is dispensed to a forming element to provide a polymer foam article having a shape and volume sufficient to accommodate a theoretical 20 cm-1000 cm diameter sphere in at least one location in the interior thereof, without protruding from the surface. In some such embodiments, rapid depressurization is coupled with a high backpressure required to initiate the depressurization, such as a backpressure of greater than 500 kPa, such as a backpressure of 500 kPa to 25 MPa or even higher, to obtain a very large volume polymer foam article. The polymer foam articles having a shape and volume sufficient to accommodate a theoretical 20 cm-1000 cm diameter sphere in at least one location in the interior thereof are further characterized as having a continuous thermoplastic polymer matrix defining a plurality of pneumatoceles throughout the entirety of the article. In some such embodiments, a surface region extending 500 microns from the surface of the article comprises compressed pneumatoceles throughout the entirety thereof.

In some embodiments, a depressurization step is followed by one or more additional pressurization/depressurization steps, for example 1 to 5 cycles of pressurization followed by depressurization. A pressurization step is carried out by reducing the volume in the collection area proximal to the molten pneumatic mixture, wherein the reduced volume results in a pressure increase (pressurization). The pressure increase is then maintained for a pressurization period of less than one second prior to carrying out a second depressurization step. Additionally, the rate of pressurization in a pressurization step is selected to be 0.0059 GPa/s or more. That is, in embodiments, the rate of the defining of a reduced volume in the collection area, causing a pressure increase in the collection area, is 0.0059 GPa/s or more.

Thus, in embodiments, one or more pressurization/depressurization cycles are suitably carried out prior to dispensing a molten polymer foam from the collection area. For example, collecting a shot in the collection area under a pressure is a first pressurization step, and the first pressurization step is followed by a first depressurization step to complete a first pressurization/depressurization cycle. In some embodiments, a molten polymer foam is dispensed from the collection area after a first pressurization cycle. In other embodiments, a second pressurization step is carried out followed by a second depressurization step, to complete a second pressurization/depressurization cycle. Third, fourth, or fifth pressurization/depressurization cycles may be further carried out before dispensing a molten polymer foam from the collection area. In Example 19, a single pressurization/depressurization cycle is compared to 3 and 5 pressurization/depressurization cycles and resulting polymer foam articles are described.

In each of the 1 to 5 pressurization/depressurization cycles, each pressurization cycle includes an individually selected reduced volume (or applied pressure) in the collection area as well as pressurization rate and pressurization time, in accordance with the foregoing parameters for pressurization. Additionally, in each of the 1 to 5 pressurization/depressurization cycles, each depressurization cycle includes an individually selected expanded volume (or reduced pressure), expansion (depressurization) rate, and expansion period in accordance with the foregoing parameters for depressurization. In this manner, a customized pressurization/depressurization profile may be suitably determined by the operator to achieve optimal results for forming a polymer foam article as described below. Thus, in some embodiments, a molten pneumatic mixture is subjected to 1 to 5 cycles of pressurization/depressurization, prior to dispensing the molten polymer foam from the collection area, further wherein each step in each cycle may be individually customized for pressure change, rate of pressure change, and period of maintaining the pressure change, in order to provide an optimized volume/time or pressure/time profile within the collection area.

Using any of the foregoing methods results in formation of a molten polymer foam that obtains several significant technical benefits, described in sections below, when the molten polymer foam is cooled to a temperature below a melt temperature of the thermoplastic polymer to yield a solidified polymer foam. The polymer foam articles are generally characterized as monolithic articles having a continuous polymer matrix defining a plurality of pneumatoceles dispersed throughout the entirety of the article. In embodiments the polymer foam articles are particularly characterized as having a continuous polymer matrix defining a plurality of pneumatoceles dispersed in a surface region of the article, wherein the surface region is defined as the area of the article between the article surface (the polymer foam-air interface) and a distance 500 microns interior from the surface.

A representative embodiment of an apparatus usefully employed to carry out the foregoing methods is shown in FIG. 1A. FIG. 1A is a schematic diagram of an exemplary single screw injection molding apparatus 20 in accordance with disclosed embodiments herein, that is useful to perform the methods described herein to make molten polymer foams and polymer foam articles also disclosed herein. As shown in FIG. 1A, injection molding system 20 includes barrel 21, attached to motor or drive section 24 and mold section 26. Barrel 21 includes first end 21a, second end 21b, and defines hollow interior barrel portion 22. Barrel portion 22 further defines nozzle 36 proximal to barrel second end 21b. Screw 30 is disposed within barrel portion 22 and comprises screw tip portion 34. Screw 30 is operably coupled to the motor section 24 for rotation of screw 30 around the central axis thereof; or for lateral movement indicated by arrow Z. Lateral movement of screw 30 may be in a direction generally from barrel first end 21a toward barrel second end 21b; or in a direction from barrel second end 21b toward barrel first end 21a. Lateral movement of screw 30 in either direction is optionally further coupled with rotational movement. Screw 30 further includes one or more flights 31 which are mixing elements for mixing and transporting materials present within barrel portion 22 generally from barrel first end 21a toward barrel second end 21b. Screw 30 is disposed within barrel portion 22 in pressurably sealed relationship therein, to enable pressures in excess of atmospheric pressure to be maintained within barrel portion 22, by screw flights 31 within the barrel 21 and further by situation of check valve 32. Shutoff valve 37 is connected to barrel 21 near second end 20b, and is operable to control a fluid connection, a pressurized connection, or both between nozzle 36 and mold section 26. Check valve 32 disposed within barrel portion 22 and surrounding screw 30 is operable to prevent backpressure from urging materials residing in barrel portion 22 toward barrel first end 21a and thus provides a pressurably sealed, fluidly sealed, or pressurably fluidly sealed relationship between shutoff valve 37 and check valve 32.

Further with regard to FIG. 1A, mold section 26 includes two mold sections 38 as shown. Mold sections 38 are removably joined together to define cavity 39. In some embodiments, one or more of the mold sections 38 are movable to allow for ejection of a solidified polymer foam article therefrom. In some embodiments, the mold sections 38 are situated in touching relation to each other; in other embodiments mold sections 28 are spaced apart by a gap.

Figure 1B:
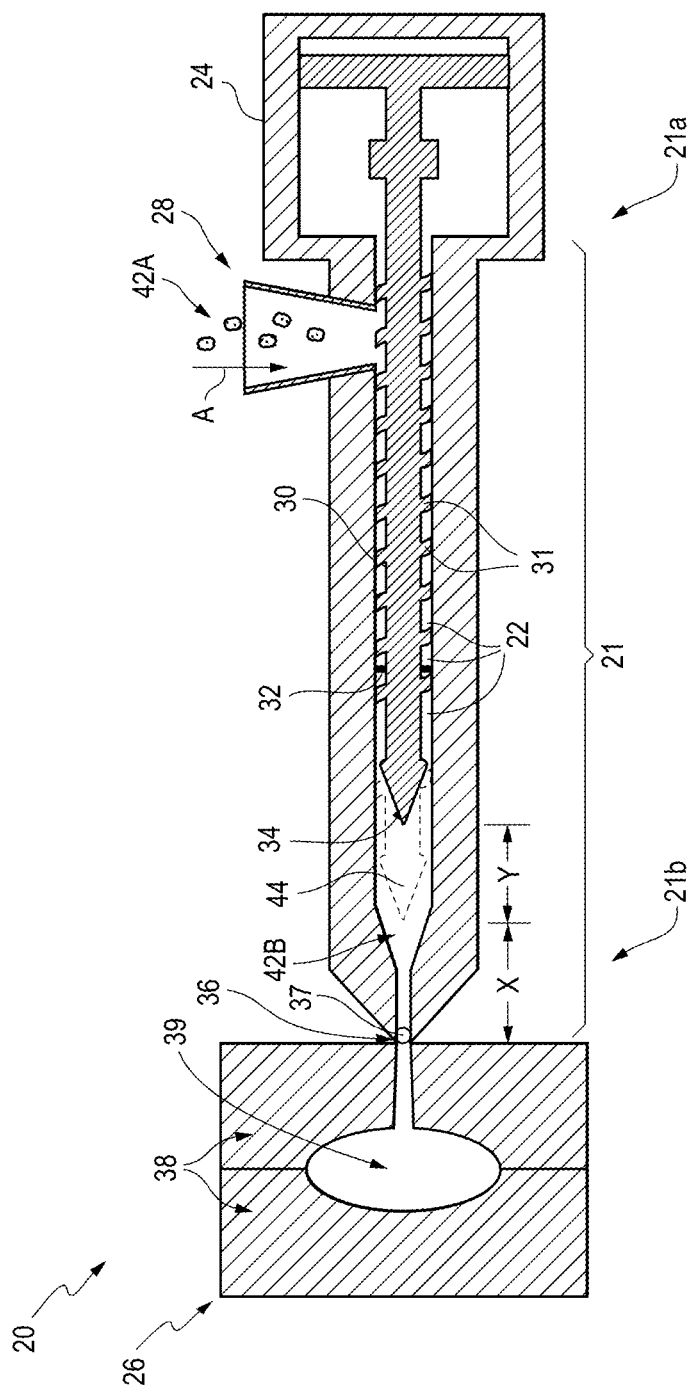

In embodiments, the methods disclosed herein are suitably carried out using an apparatus such as system 20 shown in FIGS. 1A-1B. In FIG. 1A, a selected mass of mixture 42A comprising a selected amount of thermoplastic polymer, pneumatogen source, and optionally one or more additional materials is added to barrel section 22 through inlet 28, as indicated by arrow A. In some embodiments, the pneumatogen source is a pneumatogen and inlet 28 or another inlet (not shown) is a gas inlet in pressurized connection with barrel section 22; and the pneumatogen is added to the gas inlet at a selected pressure, while non-gaseous materials are added to inlet 28. During addition of mixture 42A to barrel portion 22 through inlet 28, motor 24 is operable to rotate screw 30. The rotation of screw 30 transports and mixes the mixture 42A to the screw tip 34. A heat source (not shown) is suitably employed to add heat to mixture 42A within the barrel portion 22. Motor 24 rotates screw 30 to transport mixture 42A present in barrel portion 22 in a direction generally proceeding from first end 21a of barrel 21 towards second end 21b, until reaching screw tip 34. Additionally, the rotation of screw 30 provides mixing of mixture 42A during the transportation. As mixture 42A is transported and mixed by rotation of screw 30, heating elements or heating bands (not shown) proximal to barrel portion 22 operate to heat mixture 42A. Multiple heating zones may be present proximal to barrel portion 22 to vary the temperature inside barrel portion 22 between first end 21a and second end 21b of barrel 21. During transportation, screw 30 rotating within barrel portion 22 is operable to mix mixture 42A; and heat is added to the mixture as it is transported, thereby raising the temperature of the mixture above a melting point of the thermoplastic polymer to transform mixture 42A into molten pneumatic mixture 42B at least by reaching second end 21b of barrel 21. Additionally, disposition of screw 30 within barrel portion 22, further wherein flights 31 are in contact with barrel 21 during rotation of screw 30; combined with check valve 32, shutoff valve 37 in a closed position, or both provides a pressurably sealed relationship within barrel portion 22 whereby the molten pneumatic mixture 42B is present in barrel portion 22 under a pressure in excess of atmospheric pressure. The pressure within barrel portion 22 is sufficient to prevent or substantially prevent pneumatocele formation, even if the pneumatogen source is above its critical temperature.

Further, rotation of screw 30 operates to transport the pressurized molten pneumatic mixture toward screw tip 34, transporting or building up a selected mass of pressurized molten pneumatic mixture 42B within a collection area 40 of barrel portion 22. Collection area 40 is defined as the region within the volume of barrel portion 22 extending between check valve 32 and shutoff valve 37 in FIG. 1A, further as a region of barrel portion 22 situated along X distance of barrel 21. A selected mass or "shot" of pressurized molten pneumatic mixture 42B is collected, or built up, in collection area 40 of barrel portion 22. Pressure within the collection area 40 is sufficient to prevent or substantially prevent pneumatocele formation in the molten pneumatic mixture. In embodiments, the shot substantially fills collection area 40.

Building the shot of molten pneumatic mixture 42B is achieved using conventional methods familiar to those of skill. Conventional and known variations in methods and materials employed to build a shot for injection molding are encompassed by the methods described herein. Once a shot is built, it may be subjected to the methods disclosed herein to obtain all the technical benefits disclosed herein with respect to forming polymer foams and polymer foam articles. For example, to form a shot, methods such the MUCELL® high-pressure process employed by Trexel Inc. of Wilmington, Mass. are suitably employed, wherein addition of pneumatogen source as a gas directly to an extruder with pressurized mixing to prevent or substantially prevent pneumatocele formation is followed by shot collection. Various patent art and trade publications further describe specialized melt mixing and conveying designs for obtaining molten pneumatic mixtures and forming a shot, such as specialized screw designs for mixing and backflow patterns and the like; any of these may be usefully employed in conjunction with the foregoing shot formation methods and apparatuses to form a shot as described herein and collect the shot under a pressure within a collection area of a melt mixing apparatus.

Once a shot is formed and collected in a collection area, an expansion volume is defined therein, further wherein the expansion is accompanied by a drop in a pressure in the collection area and proximal to the shot. In embodiments, the pressure drop is accomplished at a rate of 0.01 GPa/s or more. Accordingly, FIG. 1A depicts a molten pneumatic mixture apparatus 20 wherein screw 30 is positioned to collect a shot of in collection area 40. The shot includes the selected mass of molten pneumatic mixture 42B and is disposed under a pressure within collection area 40. At this stage of the process, further relative to FIG. 1A, FIG. 1B depicts apparatus 20 wherein screw 30 is positioned to define an expansion volume 44 within collection area 40. In somewhat more detail, FIG. 1B shows screw 30 in a position resulting from lateral movement of screw 30 toward barrel first end 21a; that is, screw 30 is retracted in FIG. 1B relative to FIG. 1A. Retraction and the resulting partial displacement of screw 30 from collection area 40 defines an expansion volume 44 within collection area 40 and further causes a pressure to drop within collection area 40. In some embodiments, screw 30 is retracted from collection area 40 at a rate that causes a rapid depressurization within collection area 40, such as 0.01 GPa/sec or greater. In some embodiments, rotation of screw 30 is halted before the retracting. In some embodiments, rotation of screw 30 is halted during the retracting, or after the retracting is completed. The retraction distance of screw 30, that is, the distance of lateral movement of screw 30 toward barrel first end 21a is selected by the operator to provide a suitable expansion volume 44.

In some embodiments represented in FIG. 1B, expansion volume 44 is selected by the operator to provide collection area 40 having a total volume that matches the total expected molten polymer foam volume of the shot; in such embodiments, the total volume in collection area 40 after adding expansion volume 44 is the total expected molten polymer foam volume of the molten pneumatic mixture 42B of FIG. 1B. In other embodiments, expansion volume 44 is selected by the operator to provide collection area 40 having a total volume that is a percentage of the total expected molten polymer foam volume of a molten pneumatic mixture or shot residing in collection area 40; that is, the total volume in collection area 40 after adding expansion volume 44 equals about 50% to 120% of the total expected molten polymer foam volume. In some embodiments, expansion volume is set to provide a total volume in the collection area to accommodate 100% of the total expected molten polymer foam volume.

After retracting screw 30 to define expansion volume 44 as shown in FIG. 1B, a period of time, referred to as the "expansion period" is allowed to elapse or pass while the shot is held within collection area 40 as shown in FIG. 1B, specifically wherein collection area 40 includes expansion volume 44. The expansion period is selected by an operator to be between 0 seconds and 2000 seconds. In embodiments, during the expansion period the shot is allowed to stand undisturbed or substantially undisturbed within collection area 40. In embodiments, "undisturbed" means that the shot is not subjected to any processes causing mixing, shearing, or transporting (flow) of the shot during the expansion period. In embodiments, "substantially undisturbed" means that the shot is not purposefully perturbed by mixing, shearing, or transporting processes carried out during the expansion period but e.g. heat differentials, leakage, and other manufacturing issues may lead to inadvertent stress or strain to the shot residing in the collection area during the expansion period.

We have found that by retracting the screw 30 at a rapid rate, a rapid rate of depressurization rate can be achieved, for example at least 0.01 GPa/s, such as 0.1 GPa/s to 5 GPa/s, or higher than 5 GPa/s depending on the apparatus employed and variables such as mass of molten polymer in the collection area 40, amount of pneumatogen or pneumatogen source mixed with or dissolved in the molten polymer, and the like. In embodiments, rapid depressurization is coupled with a high backpressure required to initiate the depressurization, such as a backpressure of greater than 500 kPa, such as a backpressure of 500 kPa to 25 MPa or even higher. After rapid depressurization, the molten polymer foam is dispensed to a forming element, such as a mold, and cooled; or it is repressurized/depressurized for one or more additional cycles prior to dispensing to a forming element and cooled; and the resulting polymer foam articles are further characterized as having a continuous thermoplastic polymer matrix defining a plurality of pneumatoceles throughout the entirety of the article. In some such embodiments, a surface region extending 500 microns from the surface of the article comprises compressed pneumatoceles throughout the entirety thereof.

When further employed in conjunction with the methods described herein for forming a molten polymer foam, rapid pressure drop (depressurization), optionally coupled with high backpressure in an injection molding machine, provides several unexpected advantages.

First, rapid depressurization, optionally coupled with high backpressure in an injection molding machine, enables formation of very large volume polymer foam articles of nearly unlimited size and volume to be formed. Thus, polymer foam articles having a shape and volume sufficient to accommodate a theoretical 20 cm-1000 cm diameter sphere in at least one location in the interior thereof, without protruding from the surface; or even larger articles are suitably formed using rapid depressurization and optionally high backpressure. The volume and dimensions achievable using rapid depressurization are limited only by the amount of molten polymer that can be collected and machine limitations in introducing the pressure drop. The polymer foam articles having a shape and volume sufficient to accommodate a theoretical 20 cm-1000 cm diameter sphere in at least one location in the interior thereof are further characterized as having a continuous thermoplastic polymer matrix defining a plurality of pneumatoceles throughout the entirety of the article. In some such embodiments, a surface region extending 500 microns from the surface of the article comprises compressed pneumatoceles throughout the entirety thereof.

Second, rapid depressurization, optionally coupled with high backpressure in an injection molding machine, allows an expansion period of 0 seconds to 5 seconds to be selected, while still enabling formation of polymer foam articles having a shape and volume sufficient to accommodate a theoretical sphere having a diameter of at least 2 cm and as much as 1000 cm or more, in at least one location in the interior thereof, without protruding from the surface. The selection of an expansion period of 0 seconds to 5 seconds is based on the type of thermoplastic polymer type used, amount of pneumatogen or pneumatogen source, and other specific and individual considerations of the operator in forming a polymer foam article in accord with the methods disclosed herein. Rapid depressurization, particularly when used concomitant with high backpressure, provides a stabilized molten polymer foam that does not require an expansion period, or requires only a very short expansion period, to obtain a molded polymer foam article further characterized as having a continuous thermoplastic polymer matrix defining a plurality of pneumatoceles throughout the entirety of the article. In some such embodiments, a surface region extending 500 microns from the surface of the article comprises compressed pneumatoceles throughout the entirety thereof.

Third, rapid depressurization, optionally coupled with high backpressure in an injection molding machine, allows an expansion period of 600 seconds to 2000 seconds to be selected, while still enabling formation of polymer foam articles having a shape and volume sufficient to accommodate a theoretical sphere having a diameter of at least 2 cm and as much as 1000 cm or more, in at least one location in the interior thereof, without protruding from the surface. Rapid depressurization, particularly when used concomitant with high backpressure, provides a stabilized molten polymer foam that can withstand 30 minutes or more of residence time inside an injection molding machine and still be dispensed to a forming element to obtain a molded polymer foam article further characterized as having a continuous thermoplastic polymer matrix defining a plurality of pneumatoceles throughout the entirety of the article. In some such embodiments, a surface region extending 500 microns from the surface of the article comprises compressed pneumatoceles throughout the entirety thereof.

Thus, a stabilized molten polymer foam is formed by using the methods described herein, specifically where rapid depressurization is employed. The stability of the molten polymer foam is increased further, when employing an injection molding apparatus or machine such as the apparatus shown in FIGS. 1A-1B, by coupling rapid depressurization with high backpressure to initiate the depressurization. The stability of the molten polymer foam is evidenced by the surprising results that very large articles can be formed in a forming element; that the expansion period may be shortened or excluded; and also that a very long expansion period does not cause the stabilized molten polymer foam to collapse during the subsequent dispensing, molding, and cooling.

After the expansion period has elapsed, nozzle shutoff valve 37 as shown in FIG. 1B is opened and a molten polymer foam is dispensed from barrel 22. In embodiments as shown in FIGS. 1A-1B, the molten polymer foam flows into cavity 39. The dispensing may be pressurized dispensing by mechanical means such as plunging using lateral movement of the screw, or by applying a pressurized gas to the collection area, but applying pressure is not necessary to dispense the molten polymer foam in some embodiments. In embodiments, pressure at nozzle 36 as shown in FIGS. 1A-1B during dispensing of the molten polymer foam is 1 psi (about 7 kPa) to 20 psi (about 138 kPa) in excess of gravity, such as, without adding external sources of pressure such as by plunging the molten polymer foam using additional lateral movement of the screw 30 toward barrel second end 21b in FIGS. 1A-1B. In embodiments, the dispensing is accomplished by maintaining fluid connection between nozzle 36 and cavity 39. In some such embodiments the fluid connection is further a pressurized connection. In embodiments, pressure at nozzle 36 as shown in FIGS. 1A-1B during dispensing of the molten polymer foam, also referred to as injection pressure, is about 500 kPa to 500 MPa, such as 1 MPa to 400 MPa, or 2 MPa to 300 MPa, or 3 MPa to 200 MPa, or 500 kPa to 1 MPa, 1 MPa to 10 MPa, 10 MPa to 50 MPa, 50 MPa to 100 MPa, 100 MPa to 200 MPa, or 200 MPa to 500 MPa, for example by laterally urging screw 30 toward barrel second end 21b in FIGS. 1A-1B or by applying another source of pressure, such as an applied gas pressure.

Alternatively, after retracting screw 30 as shown in FIG. 1B, and maintaining the position of screw 30 for an expansion period, screw 30 is urged back towards barrel second end 21b; that is, screw 30 is returned partially or completely to the position shown in FIG. 1A in a pressurization step, which reduces the volume in collection area 40 and pressurizes the molten pneumatic mixture. The reduced volume within collection area 40 causes a pressure to increase within collection area 40. In some embodiments, rotation of screw 30 is halted before the pressurization. In some embodiments, rotation of screw 30 is halted during the pressurization, or after the pressurization is completed. The pressurization distance of screw 30, that is, the distance of lateral movement of screw 30 toward barrel second end 21b is selected by the operator to provide a suitable volume and pressure. After a selected pressurization period, the operator may select dispensing of the molten pneumatic mixture, or may select one or more additional pressurization/depressurization cycles prior to the dispensing.

In embodiments such as the foregoing where 1 to 5 pressurization/depressurization cycles are employed, the operator may select the rates of pressurization and depressurization in addition to volume/pressure and the time of maintaining the pressurization or depressurization. Additionally, the operator may suitably select rapid depressurization, high backpressure, or both for each one or more of the depressurization steps of the one or more cycles.

Once disposed within cavity 39 defined by mold portions 38 shown in FIGS. 1A-1B, the molten polymer foam is cooled or allowed to cool until it reaches a temperature below a melt transition of the thermoplastic polymer, such as the temperature present in ambient conditions of the surrounding environment. In some embodiments where an expansion volume is set to provide a total volume in the collection area that is less than 100% of the total expected molten polymer foam volume, pneumatoceles may continue to nucleate and/or develop (grow in size) after the molten polymer foam is dispensed and before the temperature cools sufficiently to reach a melt transition temperature of the thermoplastic polymer. Cooling of the molten polymer foam is accomplished using conventional methods for cooling of injection molded articles and includes immersing the mold in a liquid coolant having a set temperature, or spraying the mold with a liquid coolant, such as liquid water; impinging an air stream onto the mold; ambient air cooling; and the like without limitation.

In an alternate embodiment of the foregoing methods, apparatus 20 configured as shown in FIG. 1B is employed to form a molten polymer foam. FIG. 1B shows screw 30 in a position resulting from lateral movement of screw 30 toward barrel first end 21a; that is, screw 30 is retracted in FIG. 1B relative to FIG. 1A. Retraction and the resulting partial displacement of screw 30 from collection area 40 defines an expansion volume 44 within collection area 40 and further causes a pressure to drop within collection area 40. Apparatus 20 configuration as shown in FIG. 1B is employed to mix, heat, and transport molten pneumatic mixture 42B toward second end 21*b* of barrel 21 in substantially the same way as described above. Additionally, disposition of screw 30 within barrel portion 22, further wherein flights 31 are in contact with barrel 21 during rotation of screw 30; combined with check valve 32, shutoff valve 37 in a closed position, or both provides a pressurably sealed relationship within barrel portion 22 whereby the molten pneumatic mixture 42B is present in barrel portion 22 under a pressure in excess of atmospheric pressure. The pressure within barrel portion 22 is sufficient to prevent or substantially prevent pneumatocele formation, even if the pneumatogen source is above its critical temperature. However, in this alternative embodiment the molten pneumatic mixture is transported through check valve 32 and into collection area 40 further appended by the expansion volume 44.

Further in the alternate embodiment above, apparatus 20 in the configuration shown in FIG. 1B is employed to mix, heat, and transport molten pneumatic mixture 42B toward second end 21*b* of barrel 21; and then screw 30 is urged toward first end 21*a* of barrel 21 to pressurize the molten pneumatic mixture residing in collection area 40. Pressurization is following by rapid depressurization, optionally employed with a high backpressure, to obtain a stabilized polymer foam as described above It is an advantage of the presently disclosed methods that conventional materials and apparatuses for extrusion and injection molding are useful for carrying out the methods. No specialized equipment or material requirements are needed to carry out the disclosed methods. Thus, any thermoplastic polymer or mixture thereof that is useful for injection molding and/or for forming polymer foams, is usefully combined with any industrially useful pneumatogen source using conventional technology such as a standard injection molding apparatus, optionally together with one or more additional materials as selected by the operator of the apparatus.

In embodiments, thermoplastic polymers useful in conjunction with the methods, apparatuses, and articles described herein include any thermoplastics or mixtures thereof that are known in the industry to be useful for injection molding, or injection molding of polymer foam articles; and mixtures of such polymers. Useful polymers are characterized as having a melt flow viscosity suitable for use in injection molding, such as in shot formation. As such, the thermoplastic polymers may include a degree of crosslinking that is thermoreversible or that does not otherwise prevent a sufficient viscous melt flow for injection molding processes.

In embodiments, thermoplastic polymers useful in conjunction with the methods, apparatuses, and articles described herein include olefinic polymers such as polyethylene, polypropylene, poly α-olefins and various copolymers and branched/crosslinked variations thereof including but not limited to low density polyethylene (LDPE), high density polyethylene (HDPE), linear low density polyethylene (LLDPE), thermoplastic polyolefin elastomer (TPE), ultra-high molecular weight polyethylene (UHMWPE), and the like; polyamides (PA), polyimides (PI), polyesters such as polyester terepthalate (PET) and polybutyene terepthalate (PBT), polyhydroxyalkanoates (PHA) such as polyhydroxybutyrate (PHB), polycarbonates (PC), poly (lactic acid)s (PLA), acrylonitrile-butadiene-styrene copolymers (ABS), polystyrenes, polyurethanes including thermoplastic polyurethane elastomers (PU, TPU), polycaprolactones, polyvinyl chlorides (PVC), copolymers of tetrafluoroethylene, polyethersulfones (PES), polyacetals, polyaramids, polyphenylene oxides (PPO), polybutylenes, polybutadienes, polyacrylates and methacryates (acrylics), ionomeric polymers (SURLYN® and similar ionically functionalized olefin copolymers), poly ether-amide block copolymers (PEBAX®), polyaryletherkeytones (PAEK), polysulfones, polyphenylene sulfides (PPS), polyamide-imide copolymers, poly(butylene succinate)s, cellulosics, polysaccharides, and copolymers, alloys, admixtures, and blends thereof are usefully employed in conjunction with the methods described herein, without limitation.

Regarding unlimited use of polymer blends and mixtures, we have found mixed stream recycled plastics are useful in embodiments as the thermoplastic polymer. Thus in embodiments ocean waste plastics are mixed streams of polymeric waste harvested from oceans and beaches, and having exemplary content of 10%-90% polyolefin content, 10%-90% PET content, 1%-25% polystyrene content, and 1% to 50% unknown polymer content. Such mixed plastic streams and waste plastic streams, not limited to those collected from oceans and beaches, are similarly usefully to form molten polymer foams and polymer foam articles using the methods and apparatuses described herein. Example 11 shows the use of a mixed stream ocean waste plastic source having 20% recycled content.

Further, we have found that the polymer foam articles made in accordance with the methods described herein may be recycled using the methods described herein. That is, in embodiments, a first polymer foam article in accordance with any of the embodiments described herein, and formed in accordance with any of the methods described herein, is also a source of thermoplastic polymer for forming a second polymer foam article in accordance with the methods described herein. In embodiments, the polymer foam articles described herein are suitably recycled employing any of the methods described herein for making a polymer foam article. Thus, a polymer foam article may be recycled, for example, by simply grinding a first polymer foam article made in accordance with the methods described herein, or otherwise dividing it into pieces of suitable size for direct use in a melt mixing apparatus; and applying the divided first polymer foam article to a melt mixing apparatus. The melt mixing apparatus may be an injection molding machine or an extruder. Where the melt mixing apparatus is an injection molding machine, a second polymer foam article may be formed by carrying out any of the methods described herein for forming a polymer foam article, employing the divided first polymer foam article as the feedstock or source of polymer. In this manner, mixed feedstocks may also be used, such as mixed sources of divided polymer foam articles (different thermoplastics, additives, and the like); or mixtures of divided polymer foam articles with other plastic materials such as virgin or used plastic sources.

The foregoing recyclability of the polymer foam articles is observed over a range of polymeric materials including but not limited to low-density polyethylene (LDPE), high-density polyethylene (HDPE), polypropylene (PP), high-impact polystyrene (HIPS), polyethylene terephthalate (PET), polybutylene terephthalate (PBT), polyamide (PA), thermoplastic polyurethane (TPU), and thermoplastic olefin (TPO). The recyclability is observed for single component polymer foams, blends of polymers with additives including any of the additives listed herein, and mixtures and blends of two or more polymers. Example 16 exemplifies this surprising and unexpected outcome. Due to the difficulty of using 100% recycled thermoplastic materials for processes such as extrusion and injection molding, the plastics industry typically supplies mixed plastic waste streams for industrial recycling use, and thus recycled plastic articles often include only a fraction of recycled materials mixed with virgin plastics, such as between 10% and 50% recycled plastic by weight or by volume. However, using the methods described herein, 100% recycled plastic material may be used to make the polymer foam articles described herein. Further, 100% virgin thermoplastics may be used to make the polymer foam articles described herein, as well as mixtures of recycled and virgin material feedstocks. and the polymer foam articles formed from these feedstocks are 100% recyclable in a subsequent injection molding or extrusion process.

Pneumatogen sources are widely available in the industry and conditions useful to deploy pneumatogens during melt mixing are well understood and broadly reported. Accordingly, any pneumatogen source useful for injection molding, reaction injection molding, or other methods of making of polymer foams, is useful herein to form the molten polymer foams and solidified polymer foam articles in accordance with the methods, apparatuses, and polymer foam articles described herein. Pneumatogens useful in connection with the methods and apparatuses described herein include air, $CO_2$, and $N_2$, either as encapsulated within a thermoplastic in the form of beads, pellets, and the like or in latent form, wherein a chemical reaction generates $CO_2$ or $N_2$ when heated within the melt mixing apparatus. Such chemical reactions are suitably exothermic or endothermic without limitation regarding their use in conjunction with the methods and apparatuses disclosed herein. Suitable pneumatogen sources include sodium bicarbonate, compounds based on a polycarboxylic acid such as citric acid, or a salt or ester thereof such as sodium citrate or the trimethyl ester of sodium citrate; mixtures of sodium bicarbonate with a polycarboxylic acid such as citric acid; sulfonyl hydrazides including p-toluene sulfonyl hydrazide (p-TSH) and 4,4'-oxybis-(benzenesulfonyl hydrazide) (OBSH), pure and modified azodicarbonamides, semicarbazides, tetrazoles, and diazinones. In any of the foregoing, the pneumatogen source is optionally further encapsulated in a carrier resin designed to melt during the heating, mixing, and collection of a shot.

In embodiments, useful pneumatogen sources include commercially available compositions such as HYDROCEROL® BIH 70, HYDROCEROL® BIH CF-40-T, or HYDROCEROL® XH-901, all available from Clariant AG of Switzerland; FCX 7301, available from RTP Company of Winona, Minn.; FCX 27314, available from RTP Company of Winona, Minn.; CELOGEN® 780, available from CelChem LLC of Naples, Fla.; ACTAFOAM® 780, available from Galata Chemicals of Southbury, Conn.; ACTAFOAM® AZ available from Galata Chemicals of Southbury, Conn.; ORGATER MB.BA.20, available from ADEKA Polymer Additives Europe of Mulhouse, France; ENDEX 1750™, available from Endex International of Rockford, Ill.; and FOAMAZOL™ 57, available from Bergen International of East Rutherford, N.J.

In some embodiments, the pneumatogen source is a pneumatogen, wherein the pneumatogen is applied as a gas to a melt mixing apparatus, such as an apparatus similar to the extruder shown in FIGS. 1A-1B. In such embodiments the gas is caused to dissolve within the thermoplastic polymer by direct pressurized addition to and mixing within the melt mixing apparatus. In some embodiments the gas becomes a supercritical fluid by pressurization, either prior to or contemporaneously with dissolution into the molten thermoplastic polymer. Applying a pneumatogen directly to an injection molding apparatus is referred to industrially as the MUCELL® process, as employed by Trexel Inc. of Wilmington, Del. Specialized equipment is required for this process, such as a regulated, pressurized fluid connection from a gas reservoir (tank, cylinder etc.) to the inlet of an extruder apparatus to form a pressurized relationship with the barrel as the thermoplastic polymer is also added to the barrel and melted. Where such specialized equipment is available, a pneumatogen is usefully employed as the pneumatogen source in conjunction with the methods described herein by direct application of the pneumatogen to the thermoplastic polymer and one or more additional materials to form a molten pneumatic mixture.

The pneumatogen source is added to the thermoplastic polymer, and any optionally one or more additional materials, in an amount that targets a selected density reduction of the thermoplastic polymer, in accordance with conventional art associated with desirable polymer foam density and operation of pneumatogens and pneumatogen sources to form thermoplastic polymer foams. The amount of the pneumatogen source added to the thermoplastic polymer is not particularly limited; accordingly, we have found that up to 85% density reduction is achieved without the use of polymer or glass bubbles or the like, to provide a polymer foam article having the unique and surprising characteristics reported below and further having a targeted density reduction of up to 85%. As used herein, "density reduction" means a percent mass reduction in a polymer foam article compared to the same article without adding a pneumatogen (source) to make the article (that is, a polymer article excluding or substantially excluding pneumatoceles). Thus, in embodiments the molten polymer foams and the polymer foam articles described herein suitably exclude glass or polymer bubbles, while providing a selected density reduction of up to 85%, for example 30% to 85%, such as 35% to 85%, 40% to 85%, 45% to 85%, 50% to 85%, 55% to 85%, 60% to 85%, 65% to 85%, 70% to 85%, 75% to 85%, 30% to 35%, 35% to 40%, 40% to 50%, 50% to 55%, 55% to 60%, 60% to 65%, 65% to 70%, 70% to 75%, 75%, to 80%, or 80% to 85%. Including glass or polymer bubbles further extends the available density reduction of a polymer foam article made in accord with the methods herein. In some embodiments greater than 85% density reduction may be achieved.

The polymer foam articles benefitting from the density reduction nonetheless are characterized as having a continuous polymer matrix throughout with pneumatoceles dispersed therein, including molded articles having a shape and a volume wherein a theoretical sphere, such as a glass or metal ball or marble, having a diameter of 2 cm would fit within the polymer foam article in at least one location, without protruding from the surface. In embodiments, the polymer foam articles have a shape and a volume wherein a sphere having a diameter of 2 cm-1000 cm or more would fit within the polymer foam article in at least one location, without protruding from the surface. In embodiments, the polymer foam articles have a shape and a volume wherein a sphere having a diameter of 2 cm-1000 cm would fit within the polymer foam article in at least one location, without protruding from the surface and further have a total article volume greater than 1000 $cm^3$, a volume of at least 2000 $cm^3$, a volume between 1000 $cm^3$ to 5000 $cm^3$, a volume between 2000 $cm^3$ to 5000 $cm^3$, or a volume of more than 5000 $cm^3$. The shape of the polymer foam article is not limited and may generally be cuboid, spheroid, toroid, or any other shape desired.

As mentioned above, the amount of the pneumatogen source added to the thermoplastic polymer is not particularly limited; accordingly, we have found that up 85% of the total volume of a polymer foam article comprises pneumatoceles. The total volume of the pneumatoceles as a percent of the total volume of the polymer foam article is referred to as the "void fraction" of the article; thus, void fraction of up to about 85% is achieved without including polymer or glass bubbles or the like, to provide a polymer foam article having the unique and surprising characteristics reported below and further having a targeted void fraction of up to 85% of the volume of the polymer foam article. Thus, in embodiments the molten polymer foams and the polymer foam articles described herein suitably exclude glass or polymer bubbles, while providing a void fraction of up to 85%, for example 5% to 85%, such as 10% to 85%, 15% to 85%, 20% to 85%, 25% to 85%, 30% to 85%, 35% to 85%, 40% to 85%, 45% to 85%, 50% to 85%, 55% to 85%, 60% to 85%, 65% to 85%, 70% to 85%, 75% to 80%, 80% to 85%, 5% to 10%, 10% to 15%, 15% to 20%, 20% to 25%, 25% to 30%, 30% to 35%, 35% to 40%, 40% to 50%, 50% to 55%, 55% to 60%, 60% to 65%, 65% to 70%, 70% to 75%, 75% to 80%, or 80% to 85%. Including glass or polymer bubbles further extends the available void fraction of a polymer foam article made in accord with the methods herein. In some embodiments greater than 85% void fraction may be achieved. The polymer foam articles having 85% void fraction are nonetheless are characterized as having a continuous polymer matrix throughout with pneumatoceles dispersed therein, including molded articles having a shape and a volume wherein a sphere having a diameter of 2 cm-1000 cm would fit within the polymer foam article in at least one location, without protruding from the surface and further have a total article volume greater than 1000 cm$^3$, a volume of 2000 cm$^3$ or more, a volume between 1000 cm$^3$ to 5000 cm$^3$, a volume between 1000 cm$^3$ and 5000 cm$^3$, or between 12000 cm$^3$ and 5000 cm$^3$, or a volume greater than 5000 cm$^3$.

In some embodiments, the thermoplastic polymer and a pneumatogen source are admixed prior to applying the admixture to a melt mixing apparatus for heating and mixing. In other embodiments, the thermoplastic polymer and a pneumatogen source are added separately to a melt mixing apparatus, such as by two different inlets or ports available for adding materials to the melt mixing apparatus. In still other embodiments, a solid mixture including both a thermoplastic polymer and a pneumatogen source are added as a single input to a melt mixing apparatus for heating and mixing.

In embodiments, one or more additional materials are included or added to a melt mixing apparatus along with the thermoplastic polymer and pneumatogen source; such additional materials are suitably mixed or admixed with the thermoplastic polymer, the pneumatogen source, or both; or the one or more additional materials are added separately, such as by in individual port or inlet to a melt mixing apparatus. Examples of suitable additional materials include colorants (dyes and pigments), stabilizers, brighteners, nucleating agents, fibers, particulates, and fillers. Specific examples of some suitable materials include talc, titanium dioxide, glass bubbles or beads, thermoplastic polymer particles, fibers, beads, or bubbles, and thermoset polymer particles, fibers, beads, or bubbles. Additional examples of suitable materials include fibers such as glass fibers, carbon fibers, cellulose fibers and fibers including cellulose, natural fibers such as cotton or wool fibers, and synthetic fibers such as polyester, polyamide, or aramid fibers; and including microfibers, nanofibers, crimped fibers, shredded or chopped fibers, phase-separated mixed fibers such as bicomponent fibers including any of the foregoing mentioned polymers, and thermosets formed from any of the foregoing polymers. Further examples of suitable additional materials are waste materials, further shredded or chopped as appropriate and including woven or nonwoven fabrics, cloth, or paper; sand, gravel, crushed stone, slag, recycled concrete and geosynthetic aggregates; and other biological, organic, and mineral waste streams and mixed streams thereof. Further examples of suitable additional materials are minerals such as calcium carbonate and dolomite, clays such as montmorillonite, sepiolite, and bentonite, micas, wollastonite, hydromagnesite/huntite mixtures, synthetic minerals, silica agglomerates or colloids, aluminum hydroxide, alumina-silica composite colloids and particulates, Halloysite nanotubes, magnesium hydroxide, basic magnesium carbonate, precipitated calcium carbonate, and antimony oxide. Further examples of suitable additional materials include carbonaceous fillers such as graphite, graphene, graphene quantum dots, carbon nanotubes, and $C_{60}$ buckeyballs. Further examples of suitable additional materials include thermally conductive fillers such as boronitride (BN) and surface-treated BN.

In embodiments, one or more additional materials are included or added to a melt mixing apparatus along with the thermoplastic polymer and pneumatogen source in an amount of about 0.1% to 50% of the mass of the thermoplastic polymer, for example 0.1% to 45%, 0.1% to 40%, 0.1% to 35%, 0.1% to 30%, 0.1% to 25%, 0.1% to 20%, 0.1% to 15%, 0.1% to 10%, 0.1% to 9%, 0.1% to 8%, 0.1% to 7%, 0.1% to 6%, 0.1% to 5%, 0.1% to 4%, 0.1% to 3%, 0.1% to 2%, 0.1% to 1%, 1% to 50%, 2% to 50%, 3% to 50%, 4% to 50%, 5% to 50%, 6% to 50%, 7% to 50%, 8% to 50%, 9% to 50%, 10% to 50%, 11% to 50%, 12% to 50%, 13% to 50%, 14% to 50%, 15% to 50%, 20% to 50%, 25% to 50%, 30% to 50%, 35% to 50%, 40% to 50%, 45% to 50%, 0.1% to 2%, 2% to 5%, 5% to 10%, 10% to 15%, 15% to 20%, 20% to 25%, 25% to 30%, 30% to 35%, 35% to 40%, 40% to 45%, or 45% to 50% of the mass of thermoplastic polymer added to the melt mixing apparatus to form a shot.

Accordingly, in melt mixing apparatuses that are not extruders, it will be understood by one of skill that the following method will result in a molten polymer foam possessing the significant technical benefits described in sections below. A method of forming and collecting a molten polymer foam includes the following: heating and mixing a thermoplastic polymer and a pneumatogen source to form a molten pneumatic mixture, wherein the temperature of the molten pneumatic mixture exceeds the critical temperature of the pneumatogen source and a pressure applied to molten pneumatic mixture is sufficient to substantially prevent formation of pneumatoceles; collecting a selected amount of the molten pneumatic mixture in a collection area; defining an expansion volume in the collection area proximal to the molten pneumatic mixture that results in a pressure drop; maintaining the expansion volume for an expansion period of time; and collecting a molten polymer foam from the collection area. In embodiments, the molten pneumatic mixture is undisturbed or substantially undisturbed during the expansion period. In embodiments, defining the expansion volume is accomplished at a rapid rate of depressurization (that is, the rate of defining the pressure drop) which is at least 0.01 GPa/s, in embodiments 0.1 GPa/s or greater; and in some embodiments is 1.0 GPa/s or even greater, such as up to 5.0 GPa/s; or 0.01 GPa/s to 5.0 GPa/s, or 0.1 GPa/s to 5.0 GPa/s, or 1 GPa/s to 5.0 GPa/s, or 0.01 GPa/s to 0.0 GPa/s, or 0.01 GPa/s to 3.0 GPa/s, or 0.01 GPa/s to 2.0 GPa/s, or 0.01 GPa/s to 1.0 GPa/s, or 0.01 GPa/s to 0.1 GPa/s, or 0.1 GPa/s to 1.0 GPa/s, or 1.0 GPa/s to 2.0 GPa/s, or 2.0 GPa/s to 3.0 GPa/s, or 3.0 GPa/s to 4.0 GPa/s, or 4.0 GPa/s to 5.0 GPa/s. In some such embodiments, rapid depressurization is coupled with a high backpressure, that is, a backpressure of 500 kPa or greater, such as a backpressure of 500 kPa to 25 MPa, or 1 MPa to 25 MPa, or 2 MPa to 25 MPa, or 3 MPa to 25 MPa, or 4 MPa to 25 MPa, or 5 MPa to 25 MPa, or 6 MPa to 25 MPa, or 7 MPa to 25 MPa, or 8 MPa to 25 MPa, or 9 MPa to 2 MPa, or 10 MPa to 25 MPa, or 500 kPa to 20 MPa, or 500 kPa to 15 MPa, or 500 kPa to 12 MPa, or 500 kPa to 10 MPa, or 500 kPa to 9 MPa, or 500 kPa to 8 MPa, or 500 kPa to 7 MPa, or 500 kPa to 6 MPa, or 500 kPa to 5 MPa, or 500 kPa to 4 MPa, or 500 kPa to 3 MPa, or 500 kPa to 2 MPa, or 500 kPa to 1 MPa, or 1 MPa to 5 MPa, or 5 MPa to 10 MPa.

In embodiments, by using the methods described herein, and employing rapid depressurization of the molten pneumatic mixture in the collection area, and in embodiments further employing high backpressure to initiate the rapid depressurization, a stabilized molten polymer foam is obtained that requires no expansion period or requires a shortened expansion period of 0 to 5 seconds such as 0-1 second, 1-2 seconds, 2-3 seconds, 3-4 seconds, or 4-5 seconds to provide a molten polymer foam capable of forming the polymer foam articles described herein, including articles having a shape and a volume wherein a sphere having a diameter of 2 cm-1000 cm, that is, including 20 cm and above, would fit within the polymer foam article in at least one location, without protruding from the surface; and further have a total article volume greater than 1000 cm$^3$, a volume of 2000 cm$^3$ or more, or a volume between 1000 cm$^3$ and 5000 cm$^3$, between 2000 cm$^3$ and 5000 cm$^3$, or a volume greater than 5000 cm$^3$.

In some embodiments, collecting the molten polymer foam includes applying the molten polymer foam to a cavity defined by a mold; and cooling the molten polymer foam below a melt temperature of the thermoplastic polymer to obtain a polymer foam article. In embodiments where the molten polymer foam is applied to the cavity of a mold, the cooled polymer foam article obtains the shape and dimensions of the mold, further wherein polymer foam is characterized as a continuous polymer matrix having pneumatoceles distributed throughout the entirety of the article. In embodiments, the molten polymer foam is applied to a mold cavity by allowing the molten polymer foam to flow and enter a mold cavity by gravitational force; in some such embodiments the flow is unimpeded and is allowed to fall into an open cavity. In other embodiments, the molten polymer foam is applied under pressurized flow to a forming element. In embodiments the molten polymer foam is delivered to a mold cavity by fluid connection thereto from a nozzle or other means of delivery of molten polymer foam from a collection area of a melt mixing apparatus.

For example, in embodiments, an extruder is adapted and designed to dispense a molten mixture from an outlet into a forming element, which is a mold defining a cavity therein, and designed and adapted to receive a molten polymer mixture, such as a molten pneumatic mixture. In embodiments the forming element is a mold configured and adapted to receive a molten thermoplastic polymer dispensed from an outlet, further wherein a mold is characterized as generally defining a void or cavity having the selected shape and dimensions of a desired article.

In embodiments, dispensing from an extruder is accomplished by mechanical plunging, by applying a gaseous pressure from within the barrel of the extruder, or a combination thereof. In other embodiments, an outlet, valve, gate, nozzle, or door to the collection area is simply opened after the expansion period has passed, and the molten polymer foam is allowed to flow unimpeded through the outlet; the molten flow is then directed to a cooling or other processing apparatus, or the molten flow is allowed to pour into a forming element. In other embodiments, the forming element is fluidly connected to the outlet and is further designed and adapted to be filled with a molten mixture so that the molten mixture obtains a selected shape when cooled and solidified. In some embodiments, the forming element is fluidly connected to the extruder outlet such that a pressure is maintained between the collection area, the outlet, and the forming element or mold. Any conventional thermoplastic molding or forming process associated with injection molding of polymer articles, such as polymer foam articles, is suitably employed to mold the molten polymer foams described herein.

In some embodiments, the molten polymer foam is allowed to flow unimpeded through the outlet, or is plunged under a pressure from the outlet without further impedance of flow, the molten flow eventually impinges on a surface, such as a surface generally perpendicular to the direction of the molten flow. We have observed that the flow under such circumstances then obtains a generally cylindrical (coiling) and planar (folding) pattern during continued molten flow, such as reported by Batty and Bridson, "Accurate Viscous Free Surfaces for Buckling, Coiling, and Rotating Liquids" *Symposium on Computer Animation*, Dublin, July 2008.

In embodiments, the molten polymer foam is dispensed into a mold cavity, followed by cooling the molten polymer foam to a temperature below a melt transition of the thermoplastic polymer, to obtain a solidified polymer foam article. In embodiments, the molten polymer foam is allowed to flow, or is "poured" unimpeded from the outlet of a melt mixing apparatus and into a mold that is configured as an open container. In embodiments the open container mold is completely filled with molten polymer foam; in other embodiments the open container mold is partially filled with molten polymer foam. In other embodiments, the molten polymer foam is dispensed by plunging, or urging the screw of the extruder laterally in a direction toward the nozzle.

During the dispensing of the molten polymer foam into a mold cavity, the molten polymer foam flows into the mold cavity and contacts the cavity surface, and then proceeds to fill the mold cavity. In embodiments, the dispensing includes partially filling the mold cavity with molten polymer foam, wherein 50% or less of the mold cavity volume is occupied by the molten polymer foam, such as 1% to 50%, or 5% to 50%, or 10% to 50%, or 20% to 50%, or 30% to 50%, or 40% to 50%, or 1% to 40%, or 1% to 30%, or 1% to 20%, or 1% to 10%, or 1% to 5% of the mold cavity volume is occupied by the molten polymer foam after the dispensing. In other embodiments the dispensing includes substantially filling the mold cavity with molten polymer foam, wherein 50% to 99.9% of the mold cavity volume is occupied by the molten polymer foam, such as 50% to 99.5%, or 50% to 99%, or 50% to 98%, or 50% to 97%, or 50% to 96%, or 50% to 95%, or 95% to 99.9%, or 96% to 99.9%, or 97% to 99.9%, or 98% to 99.9%, or 99% to 99.9%, or 99.5% to 99.9% of the mold cavity volume is filled with the molten polymer foam after the dispensing. In still other embodiments, the dispensing includes completely filling the mold cavity with molten polymer foam, wherein 100% of the mold cavity is occupied by the molten polymer foam after the dispensing.

Figure 41:
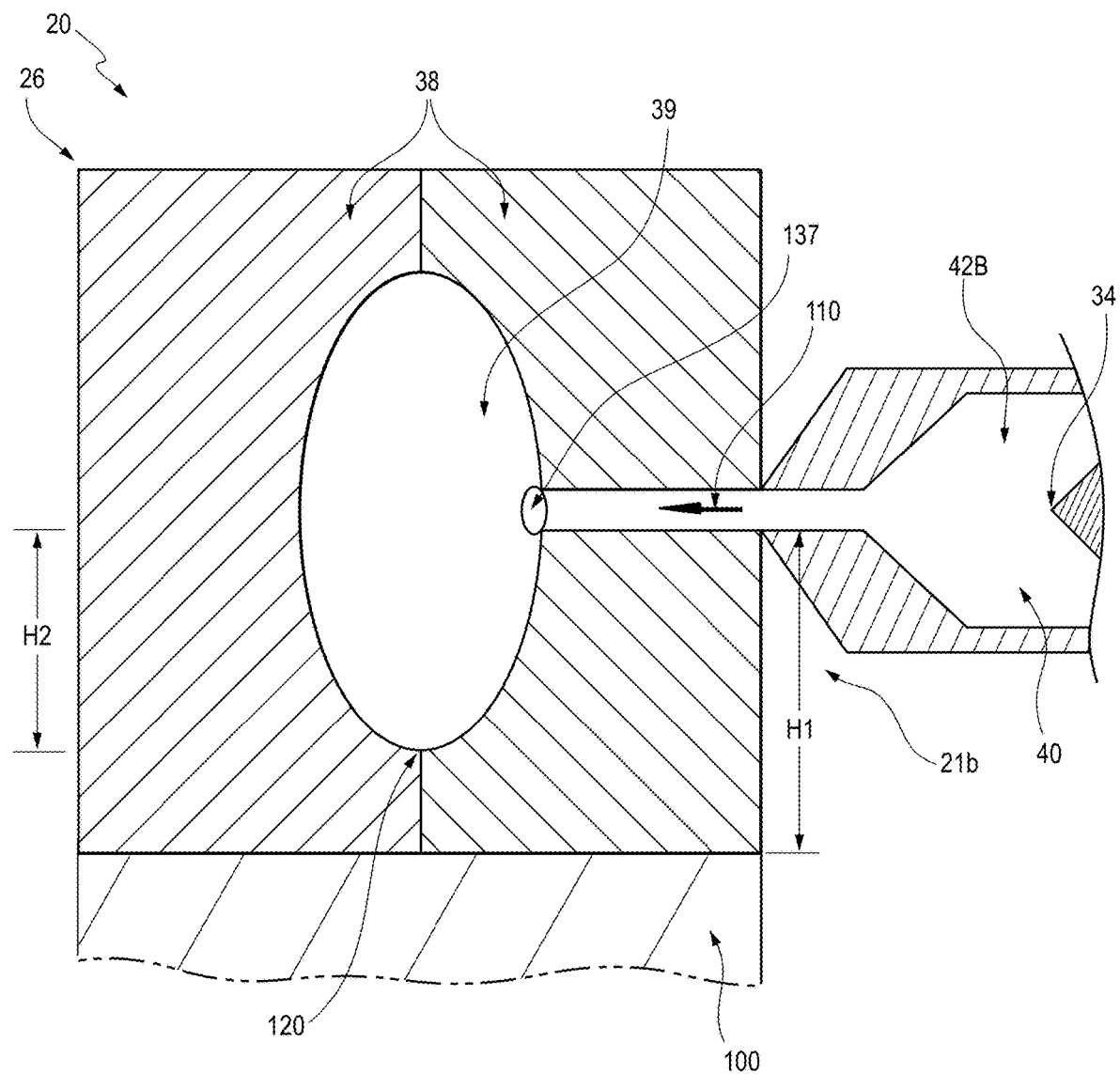
FIG. 41 illustrates a mold configuration useful for carrying out the methods described herein.

In some embodiments related to the molten flow described above, a coiled molten flow substantially free of shear, or a substantially linear molten flow is provided by fluid connection between the outlet of the extruder and into a mold cavity. In some such embodiments, the molten flow may obtain a coiled molten flow, either by impinging on a perpendicular surface thereof or by flowing down a substantially vertical wall or side of a mold cavity and collecting at the bottom of the mold cavity. A schematic representation of one such an embodiment is shown in FIG. 41, which shows a variation of the extruder of FIGS. 1A-1B wherein mold 26 of apparatus 20 is situated on a substantially horizontal surface 100. In reference to elements as shown in FIGS. 1A-1B, there is no shutoff valve 37 at distal end 21b of barrel 21; instead, in FIG. 41, collection area 40 extends to a mold valve 137 situated proximal to mold cavity 39 defined within mold 26. Thus, mold valve 137 is operable to define collection area 40, or to provide an outlet for dispensing a molten polymer foam to mold cavity 39 via a substantially linear horizontal flow 110. Mold valve 137 is situated a height H above horizontal surface 100, and a height H2 above the floor or bottom 120 of mold 26 as situated on horizontal surface 100. In reference to FIG. 41, mold valve 137 is selectively opened to provide fluid connection between collection area 40 and mold cavity 39. Thus, mold valve 137 is selectively opened to provide a substantially linear horizontal flow 110 of molten polymer foam entering mold cavity 39. Upon entering mold cavity 39, the linear flow flows downward over the distance H2, and in some embodiments obtains a coiled molten flow as it proceeds to fill mold cavity 39. Other related variations of the methods and apparatuses are contemplated to provide a coiled molten flow as described herein.

In embodiments, upon cooling and removing a polymer foam article from an open container or a mold situated such as shown in FIG. 41, the coiling and folding flow pattern is visible at the surface of the article. An example of such a visible flow pattern may be seen in e.g. FIGS. 2-2 and 2-4. Upon cryogenic fracturing and microscopic inspection of the interior of polymer foam articles formed using the coiled and folding flow, the interior of the article is free of or substantially free of flow patterns, interfaces, or other evidence of coils and folds. For example, cryogenic fracturing of such polymer foam articles does not result in fracturing at any discernible interface between coils and folds; and both macroscopic and microscopic inspection of the interior of such polymer foam articles obtains a homogeneous appearance with respect to flow patterns. The physical properties of such polymer foam articles are consistent with the physical properties obtained by subjecting the molten polymer foam to a directed fluid flow, via fluid connection between an outlet of a melt mixing apparatus and a mold, or subjecting the molten polymer foam to pressurized directed fluid flow.

In some embodiments, the methods herein include partially, substantially, or completely filling a mold with the molten polymer foam formed in accordance with the foregoing described methods, then cooling the molten polymer foam to form a solidified polymer foam; and in embodiments further removing the solidified polymer foam article from the mold. In embodiments, the molten polymer foam is a stabilized molten polymer foam. In embodiments, the cooling is cooling to a temperature below a melt transition of the thermoplastic polymer. In embodiments, the cooling is cooling to a temperature in equilibrium with the ambient temperature of the surrounding environment. In some embodiments the mold further includes one or more vents for pressure equalization in the mold during filling thereof with molten polymer foam, but in other embodiments no vents are present. After cooling, a polymer foam article may be removed from the mold for further modification or use.

In some embodiments, after the cooling of the molten polymer foam to form a solidified polymer foam article, and removal of the polymer foam article from the mold, the polymer foam continues to expand after removal of the polymer foam article from the mold. That is, the polymer foam article expands after removal of the article from the mold, and the density of the article decreases as a result of the post-mold expansion.

In accord with any of the foregoing description, Table 1 provides useful but non-limiting examples of processing conditions employed to make a molten polymer foam using a conventional single screw extruder type reaction injection molding apparatus, further by employing one or more representative thermoplastic polymers and a citric acid-based pneumatogen source as indicated.

TABLE 1

Representative thermoplastic polymers and conditions useful for making and molding molten polymer foams.

| Variable | Polymer Samples | | | | | | | |
|---|---|---|---|---|---|---|---|---|
| | High Impact Polystyrene | PBT | PC/ABS | Polyamide 6/ 15% Talc | Thermoplastic Elastomer | Surlyn Ionomer | 30% LDPE/ 70% PP | PMMA |
| Blowing Agent % Hydrocerol BIH 70 (endothermic) OR Hydrocerol XH-901 (exothermic) | 2 (Endo) | 3 (Endo) | 3 (Endo) | 2 (Endo) | 2 (Endo) | 2 (Endo) | 2 (Endo) | 3% (Endo) + 0.5% (Exothermic) |
| Mold cavity dimension (in) | 4 × 4 × 2 | 4 × 4 × 2 | 4 × 4 × 2 | 6" sphere | 4 × 4 × 2 | 4 × 4 × 2 | 3" sphere | 4 × 4 × 2 |
| Shot volume (cc) | 545 | 545 | 545 | 1856 | 545 | 545 | 252 | 545 |
| Shot size (cm$^3$) | 4026.3 | 4294.7 | 295.0 | 983.2 | 327.7 | 278.6 | 98.3 | 180.3 |
| Decompression volume (cm$^3$) | 131.1 | 409.7 | 1065.2 | 819.4 | 163.9 | 49.2 | 49.2 | 163.9 |
| Melt temperature (° C.) | 213 | 227 | 221 | 265 | 221 | 150 | 360 | 226 |
| Clamp tonnage | 10 | 10 | 15 | 20 | 10 | 17 | 14 | 10 |
| Cooling time (s) | 120 | 120 | 90 | 160 | 320 | 500 | 120 | 160 |
| Decomp time (s) | 60 | 80 | 60 | 100 | 60 | 50 | 56 | 100 |
| Hold pressure (MPa) | 0 | 0 | 0 | 0 | 0 | 0 | 0 | 0 |
| Hold time (s) | 0 | 0 | 0 | 0 | 0 | 0 | 0 | 0 |
| Injection speed (cm$^3$/s) | 0.066 | 0.098 | 0.041 | 0.066 | 0.057 | 0.066 | 0.082 | 0.049 |
| Mold temperature (° C.) | 10 | 43 | 29 | 44 | 30 | 10 | 20 | 35 |
| Screw speed (m/s) | 0.15 | 0.11 | 0.21 | 0.15 | 0.15 | 0.15 | 0.12 | 0.09 |
| Specific backpressure (MPa) | 6.90 | 12.41 | 7.59 | 10.34 | 8.97 | 8.97 | 6.90 | 5.17 |

TABLE 1-continued

Representative thermoplastic polymers and conditions useful for making and molding molten polymer foams.

| | Polymer Samples | | | | | | | |
|---|---|---|---|---|---|---|---|---|
| Variable | High Impact Polystyrene | PBT | PC/ABS | Polyamide 6/ 15% Talc | Thermoplastic Elastomer | Surlyn Ionomer | 30% LDPE/ 70% PP | PMMA |
| Injection pressure (MPa) | 31.03 | 37.93 | 41.38 | 34.48 | 48.28 | 129.66 | 13.79 | 14.48 |
| Final part density (g/cc) | 0.456 | 0.571 | 0.597 | 0.454 | 0.594 | 0.476 | 0.327 | 0.482 |

In embodiments, the dimensions of molds usefully employed to form the polymer foam articles made using the methods, and materials disclosed herein include molds that define cavities that may be filled by a single shot of molten polymer foam, or a series of cavities that may be filled by a single shot of molten polymer foam. As such, the size of the mold cavity is limited only by the size of the shot that can be built in the melt mixing apparatus employed by the user. Representative mold cavities having volumes of up to $1 \times 10^5$ cm$^3$ are useful for making large parts such as automobile cabin or exterior parts, I-beam construction parts, and other large plastic items suitably employing a polymer foam. Further, the shape of the mold cavities are not particularly limited and may be complicated in terms of overall shape and even surface patterns and features, for example shapes recognizable as dumbbells, tableware, ornamental globes with raised geographical features, human or animal or insect shapes, framework or encasement shapes for framing or encasing e.g. electronic articles, appliances, automobiles, and the like, shapes for later disposing and fitting screws, bolts, and other non-thermoplastic items into or through the polymer foam article; and the like are all suitable mold shapes for molding a polymer foam article as described herein. In some embodiments the cavity includes a thickness gradient of up to 300% as to one or more regions of the cavity.

In accord with any of the foregoing description, Table 2 provides useful but non-limiting examples of mold cavity volumes and dimensions of molds useful to mold the molten polymer foams, either by pressurized flow or by unimpeded flow of the molten polymer foam into the mold. Additionally, larger mold volumes, such as up to 100,000 cm$^3$ or larger are useful where shot mass is suitably increased.

TABLE 2

Representative mold cavity volumes and dimensions useful to mold the molten polymer foams.

| Part | Cavity Volume (cc) |
|---|---|
| 3" diameter sphere | 231.00 |
| 6" diameter sphere | 1,856.66 |
| 9" diameter sphere | 6,243.47 |
| 18" diameter sphere | 50,038.52 |
| Duck Body | 4,771.10 |
| Duck Head | 812.80 |
| 12" × 12" × 1" Plate | 2,359.74 |
| 4" × 4" × 2" Brick | 545.69 |
| 4" × 4" × 4" Block | 1,091.38 |
| 12" × 12" × 12" Block | 28,316.84 |
| 17" × 4" × 1" Plate | 1,114.32 |
| 11" × 4" × 2" Plate | 1,442.06 |
| 2" × 2" × 0.5" Plate | 32.77 |
| 2" × 2" × 2" Block | 131.10 |
| 2.625" × 5.625" × 1" Plate | 241.97 |
| 1" × 1" × 2" Plate | 32.77 |

Any the methods, processes, uses, machines, apparatuses, or individual features thereof described above are freely combinable with each other to form polymer foams and polymer foam articles having unique and surprising characteristics. Thus, in embodiments, a polymer foam article is formed using the foregoing described methods, materials, and apparatuses. The polymer foam article is a discrete, monolithic object made by forming or molding a molten polymer foam in accordance with any of the methods and materials disclosed above as well as variations thereof which are combinable in any part and in any manner to form a molten polymer foam as described above.

Accordingly, terminology used to refer to the methods, materials, and apparatuses in the foregoing discussion are used below to refer to articles made using one or more methods, materials, and apparatuses encompassed in the foregoing discussion.

In embodiments, any combination of the foregoing methods results in formation of a polymer foam article comprising, consisting essentially of, or consisting of a continuous thermoplastic polymer matrix defining a plurality of pneumatoceles. The continuous thermoplastic polymer matrix comprises, consists of, or consists essentially of a solid thermoplastic polymer, that is, the thermoplastic polymer is present at a temperature below a melt transition thereof. In embodiments, the continuous thermoplastic polymer matrix further includes one or more additional materials dispersed in the solid thermoplastic polymer.

The polymer foam articles obtain density reductions, based on the density of the thermoplastic polymer and any other materials added to form the polymer foam, of a selected percent based on the amount of pneumatogen source added to the shot. In embodiments, a density reduction of 30%, 40%, 50%, 60%, 70% and even up to 80% to 85% density reduction, as selected by the user. In embodiments, up to 85% density reduction is achieved solely by the presence of pneumatoceles distributed discontinuously in the polymer matrix. In embodiments, the polymer foam articles exclude hollow particulates such as polymer or glass bubbles added to the shot prior to forming the polymer foam article using the methods and apparatuses described herein.

Further in conjunction with reduced density, as mentioned above the polymer foam articles herein are characterized as having a continuous thermoplastic polymer matrix throughout the entirety thereof or substantially throughout the entirety thereof. We have found that very large polymer foam articles may be suitably formed from the molten polymer foams disclosed herein to include a continuous polymer matrix defining a plurality of pneumatoceles. "Large polymer foam articles" are those having a shape and a volume wherein a sphere having a diameter of 20 cm would fit within the article in at least one location, without protruding from the surface. In some embodiments, a "large polymer foam article" has a shape and a volume wherein a sphere having a diameter of 20 cm would fit within the polymer foam article in at least one location, without protruding from the surface, and further has a total volume of 1000 cm³ or more, for example 2000 cm³ or more, 3000 cm³ or more, 4000 cm³ or more, or 5000 cm³ or more, or any volume between 1000 cm³ and 5000 cm³; or between 2000 cm³ and 5000 cm³ and including volumes up to 10,000 cm³, up to 20,000 cm³, up to 50,000 cm³, or even up to 100,000 cm³ or greater.

Large polymer foam articles may be suitably formed from stabilized molten polymer foam to include a continuous polymer matrix defining a plurality of pneumatoceles throughout the entirety thereof. The volume of the article is limited only by the size of the mold cavity and the size of the shot that can be collected in the melt mixing apparatus. In embodiments, a large article is formed from a single shot dispensed from a single outlet of a melt mixing apparatus, that is, without splitting of the molten polymer foam flow to multiple simultaneous distribution pipes, nozzles, or other methods of directing multiple molten streams simultaneously into a single mold cavity.

Additionally, we have found that thick polymer foam articles may be suitably formed to include a continuous polymer matrix defining a plurality of pneumatoceles. Thickness as used herein refers to straight line distance through the interior of a polymer foam article between any two points on the surface thereof "Thick" articles are defined as having a thickness of 2 cm or more, such as 3 cm, 4 cm, 5 cm, 6 cm, 7 cm, 8 cm, 9 cm, 10 cm, 15 cm, 20 cm, 25 cm, 30 cm, 35 cm, 40 cm, 45 cm, or even 50 cm or more. In some embodiments, a polymer foam article is formed using the methods and materials described herein that is characterized as being both large and thick, further wherein the large, thick polymer foam article is nonetheless characterized as having a continuous polymer matrix defining a plurality of pneumatoceles throughout the article. In embodiments, a large, thick article is formed from a single shot dispensed from a single outlet of a melt mixing apparatus, that is, without splitting of the molten polymer foam flow to multiple simultaneous distribution pipes, nozzles, or other methods of directing multiple molten streams simultaneously into a single mold cavity.

In embodiments, the polymer foam articles formed using the methods described herein have a shape and a volume wherein a (theoretical) sphere having a diameter of 2 cm would fit within the polymer foam article in at least one location, without protruding from the surface of the article. In some embodiments, the polymer foam articles include a shape and a volume wherein a (theoretical) sphere having a diameter of greater than 2 cm would fit within the polymer foam article in at least one location, without protruding from the surface of the article. In embodiments, the polymer foam articles have a shape and a volume wherein a (theoretical) sphere having a diameter of 2 cm to 1000 cm would fit within the polymer foam article in at least one location, without protruding from the surface of the article; for example, in one or more embodiments, a (theoretical) sphere having a diameter of 3 cm, 4 cm, 5 cm, 6 cm, 7 cm, 8 cm, 9 cm, 10 cm, 11 cm, 12 cm, 13 cm, 14 cm, 15 cm, 16 cm, 17 cm, 18 cm, 19 cm, 20 cm, 25 cm, 30 cm, 35 cm, 40 cm, 45 cm, 50 cm, 60 cm, 70 cm, 80 cm, 90 cm, 100 cm, 200 cm, 300 cm, 400 cm, 500 cm, 600 cm, 700 cm, 800 cm, 900, 1000 cm, 3 cm-4 cm, 5 cm-6 cm, 7 cm-8 cm, 9 cm-10 cm, 11 cm-12 cm, 13 cm-14 cm, 15 cm-16 cm, 17 cm-18 cm, 19 cm-20 cm, 20 cm-25 cm, 25 cm-30 cm, 30 cm-35 cm, 35 cm-40 cm, 40 cm-45 cm, 45 cm-50 cm, 50 cm-60 cm, 60 cm-70 cm, 70 cm-80 cm, 80 cm-90 cm, 90 cm-100 cm, 100 cm-200 cm, 200 cm-300 cm, 300 cm-400 cm, 400 cm-500 cm, 500 cm-600 cm, 600 cm-700 cm, 700 cm-800 cm, 800 cm-900, or even 900 cm-1000 cm would fit within the polymer foam article in at least one location, without protruding from the surface of the article. In embodiments, the polymer foam articles formed using the methods described herein have a shape and a volume wherein two or more (theoretical) spheres having a diameter of 2 cm would fit within the polymer foam article without overlapping, and without any of the spheres protruding from the surface of the article. For example, 2, 3, 4, 5, 6, 7, 8, 9, 10, 10-15, 15-20, 20-25, 25-30, 30-35, 35-40, 40-45, 45-50, 50-55, 55-60, 60-65, 65-70, 70-75, 75-80, 80-85, 85-90. 90-95, 95-100, 100-200, 200-300, 300-400, 400-500, 500-1000, 1000-1500, 1500-2000, or even more than 2000, 2 cm spheres would fit within the polymer foam article without overlapping, and without protruding from the surface of the article.

Figures 1, 2:
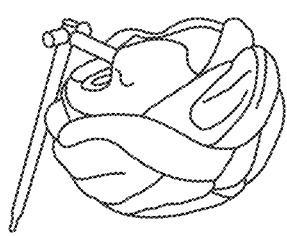
FIG. 2-1 is a line drawing of a photographic image of a part molded according to the standard foam molding process as described in Example 1.
Figure 2:
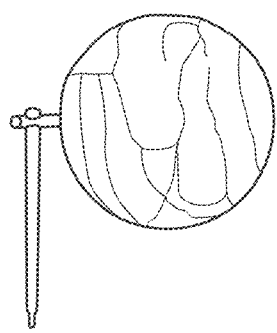
Figure 32:
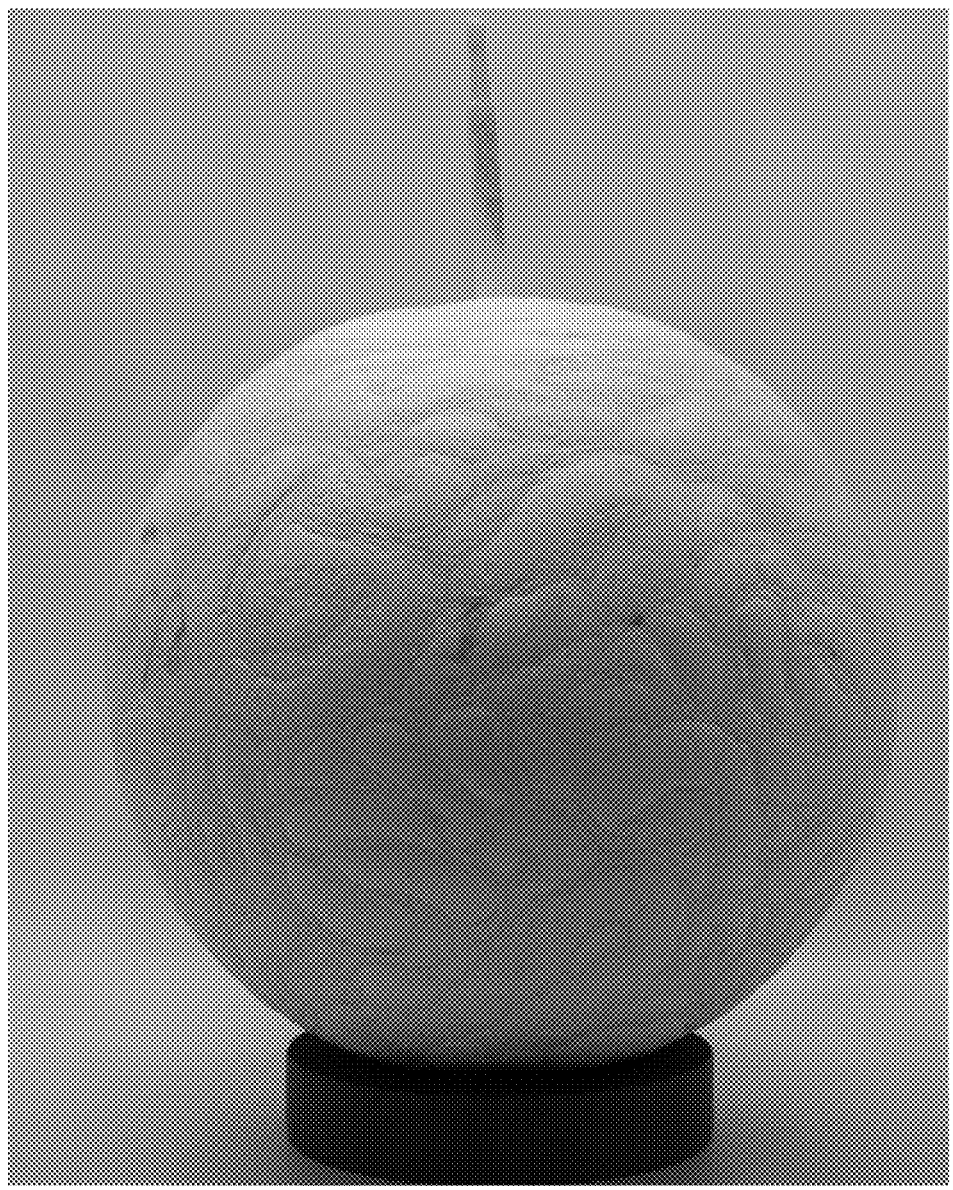
FIG. 32 is a photograph of Sample 20 made according to a reverse MFIM process, as described in Example 12.
Figure 33:
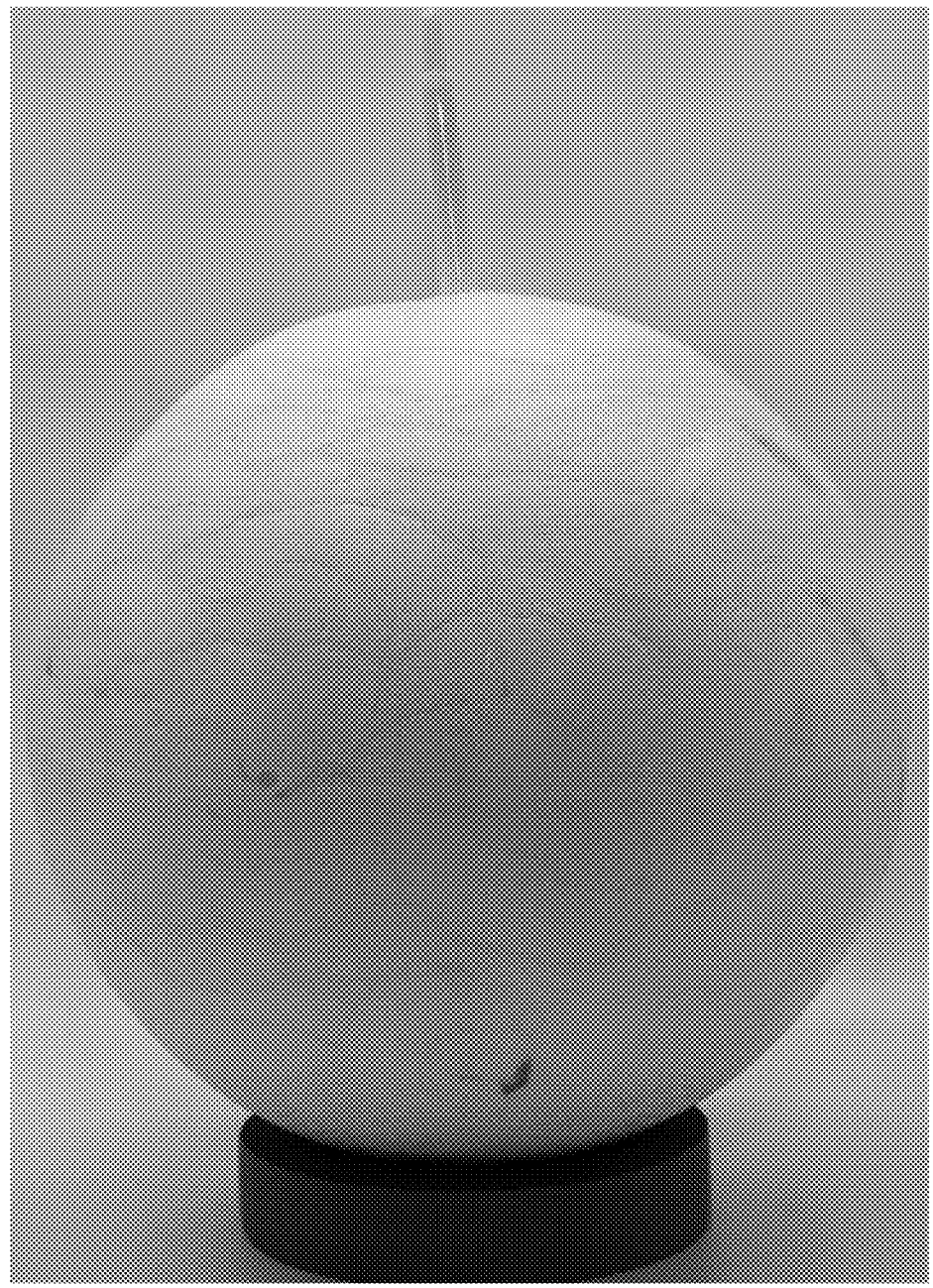
FIG. 33 is a photograph of Sample 10 made according to an MFIM process, as described in Example 12.

In some embodiments where the polymer foam articles have a shape and a volume wherein a (theoretical) sphere having a diameter of 2 cm would fit within the polymer foam article in at least one location without protruding from the surface of the article, the polymer foam article further includes one or more locations wherein a (theoretical) sphere having a diameter of 2 cm would not fit, such that the theoretical sphere placed in such a location would protrude from the surface of the article. Such articles are shown in FIGS. 2-2, 32, and 33. FIG. 2-2 shows a polymer foam article made in accord with Example 1: a molded 6 inch (15.2 cm) diameter sphere having a cylindrical feature attached, wherein the diameter of the cylindrical feature varies between 6.25 mm and 10.40 mm, depending on where the cylinder is measured. The cylindrical feature integrally connected with the sphere in FIG. 2-2 has a diameter smaller than 2 cm, and accordingly would not accommodate a 2 cm diameter theoretical sphere therein, without the sphere protruding from the cylinder surface. Likewise FIGS. 32 and 33 show a polymer foam article made in accord with Example 12: a molded 9 inch (22.9 cm) diameter sphere having a cylindrical feature attached, wherein the diameter of the cylindrical feature varies between 5.64 mm and 8.99 mm, depending on where the cylinder is measured. The cylindrical features integrally connected to the spheres in FIGS. 32 and 33 have a diameter smaller than 2 cm, and accordingly would not accommodate a theoretical 2 cm diameter sphere without the sphere protruding from the cylinder surface.

In particular, we have found that obtaining a rapid depressurization rate, that is, depressurization rate of at least 0.01 GPa/s to 5 GPa/s, further in conjunction with the methods described herein for forming a molten polymer foam, provide the unexpected advantage of enabling very large volume polymer foam articles to be formed, that is, polymer foam articles having a shape and volume sufficient to accommodate a theoretical 20 cm-1000 cm diameter sphere in at least one location in the interior thereof, without protruding from the surface. In some such embodiments, rapid depressurization is coupled with a high backpressure required to initiate the depressurization, such as a backpressure of greater than 500 kPa, such as a backpressure of 500 kPa to 500 MPa or even higher, to obtain a very large volume polymer foam article. The polymer foam articles having a shape and volume sufficient to accommodate a theoretical 20 cm-1000 cm diameter sphere in at least one location in the interior thereof are further characterized as having a continuous thermoplastic polymer matrix defining a plurality of pneumatoceles throughout the entirety of the article. In some such embodiments, a surface region extending 500 microns from the surface of the article comprises compressed pneumatoceles throughout the entirety thereof.

Figure 73:
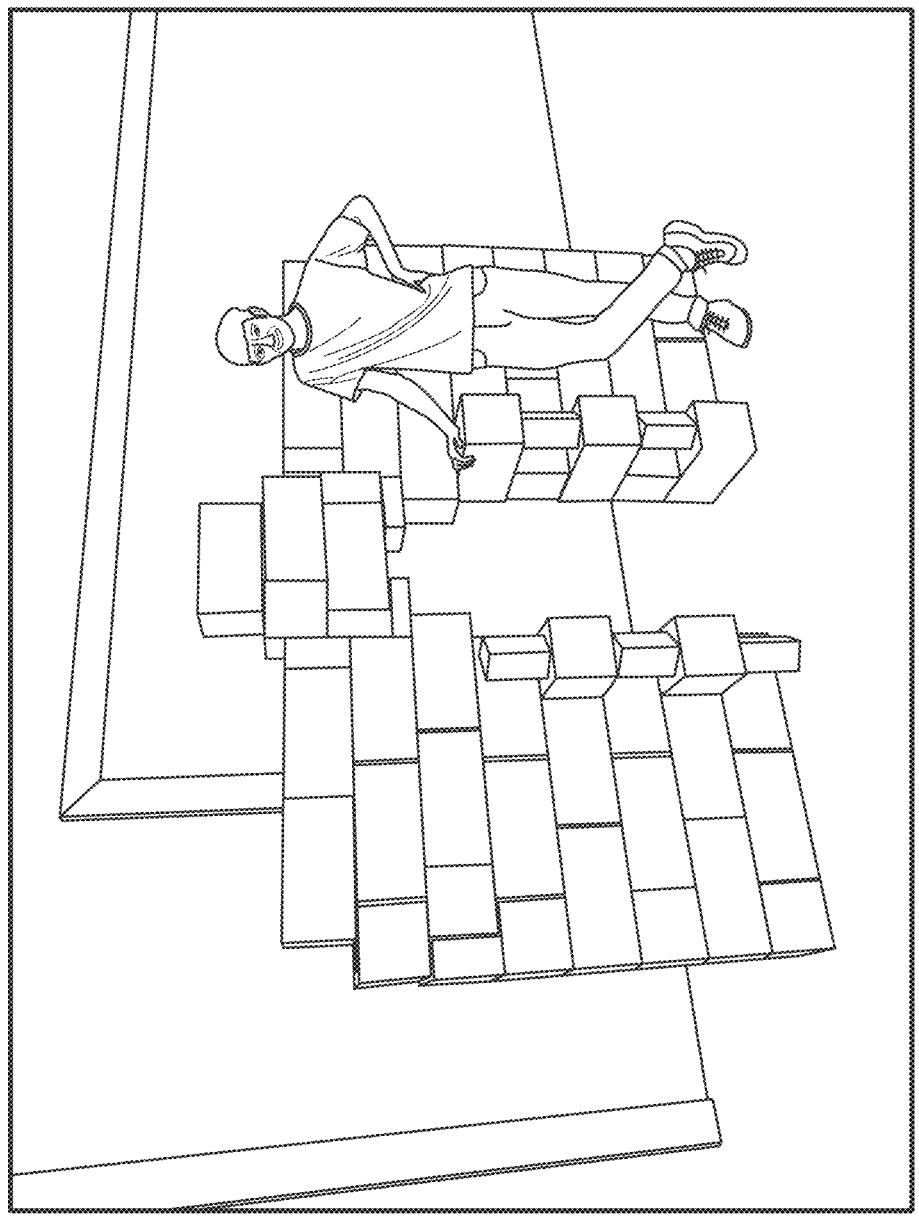
FIG. 73 is a line drawing of a photograph of a fort built with bricks made as described in Example 22.

An exemplary but non-limiting very large polymer foam article is demonstrated in Example 22 and shown in FIG. 73, wherein a solid rectangular cuboid polymer foam article having a volume of about 17,000 cm$^3$ is formed, further wherein the article would fit two theoretical 20 cm diameter spheres in the interior thereof without either of the spheres protruding from the surface of the article.

The manufacture of large, thick, or large and thick polymer foam articles is problematic in the industry due to the cooling gradient of the molten foam after it is dispensed into a cavity having such dimensions. The interior of such articles tends to cool very slowly, and some of the thermoplastic polymer disposed in the mold cavity may remain above a melt temperature thereof, allowing significant coalescence of pneumatoceles to occur before the thermoplastic solidifies (reaches a temperature below a melt transition thereof). In sharp contrast, we have found that large articles, thick articles, and large, thick articles are suitably formed using the methods, materials, and apparatuses disclosed herein, further wherein the formed polymer foam article is characterized by a continuous polymer matrix having pneumatoceles distributed throughout the article. The slower-cooling interior of larger articles show minimal or no evidence of pneumatocele coalescence during cooling. The pneumatoceles remain intact or substantially intact during cooling of the molten polymer foam and do not coalesce during cooling, resulting in a continuous polymer matrix regardless of size, thickness, or volume of the polymer foam article formed.

This feature of the polymer foam articles described herein is surprising and unexpected: the methods of the prior art result in foams that tend to undergo pneumatocele coalescence during cooling. Accordingly, a molten polymer foam of the conventional art, situated in the interior volume of a mold, may cool so slowly that pneumatoceles are able to completely coalesce, and consequently the interior of a large or thick article formed using conventional polymer foaming methods may obtain very large gaps or even a completely collapsed structure in the interior thereof. In sharp contrast, the molten polymer foams formed according to the present methods do not undergo substantial pneumatocele coalescence or collapse of the continuous polymer matrix during cooling of molten polymer foam. Accordingly, large and thick polymer foam articles with a continuous polymer matrix throughout are achieved using the methods, materials, and apparatuses described herein.

The continuous polymer matrix, as a structural feature of the polymer foamed articles in accord with the foregoing methods, apparatuses, and materials is characterized as present throughout the entirety of the polymer foamed article, including the surface region thereof. The surface region may be suitably characterized as the interior area of a polymer foam article that is 500 microns or less from the surface. The surface region as defined herein is a portion of the area of a foamed article conventionally referred to the "skin layer", which is a region free or pneumatoceles or substantially free of pneumatoceles in polymer foam articles made using conventional methods. Conventionally formed foam articles include a skin layer that is at least as thick as the surface region, that is, 500 microns thick; but often the skin layer is much thicker and may proceed as far as 1 mm, 1.5 mm, 2 mm, 2.5 mm, even 3 mm from the surface of the article. However, the polymer foam articles formed using the presently disclosed methods obtain a true foam structure from the surface thereof and throughout the entire thickness and volume thereof. In embodiments, microscopic inspection reveals evidence of pneumatoceles on the surface of the polymer foam articles formed using the conditions, processes, and materials disclosed herein Accordingly, the methods disclosed herein obtain unexpected results in terms of the continuous nature of the polymer matrix structure throughout the entirety of the polymer foam article, in any direction, and in every region thereof including within the interior of very large and/or thick polymer foam articles and also at the surface and in the surface region of the article.

The Examples below include analyses of the surface region of multiple polymer foam articles made using the methods disclosed herein and that exhibit this continuous foam structure. Macroscopically, a polymer foam article made using the methods disclosed herein may appear to have a skin layer: that is, the surface region of the article can appear to be different from the interior region of the article. However, we have found that in sharp contrast to a skin layer characterized by the absence of pneumatoceles, the surface regions of polymer foam articles made by the present methods include a plurality of compressed pneumatoceles. Macroscopically the compressed pneumatoceles create an appearance suggesting a skin layer; however, microscopic inspection reveals that the visually apparent difference arises from a "flattened" or compressed disposition of the continuous polymer matrix near the surface of the article.

Figures 17, 18:
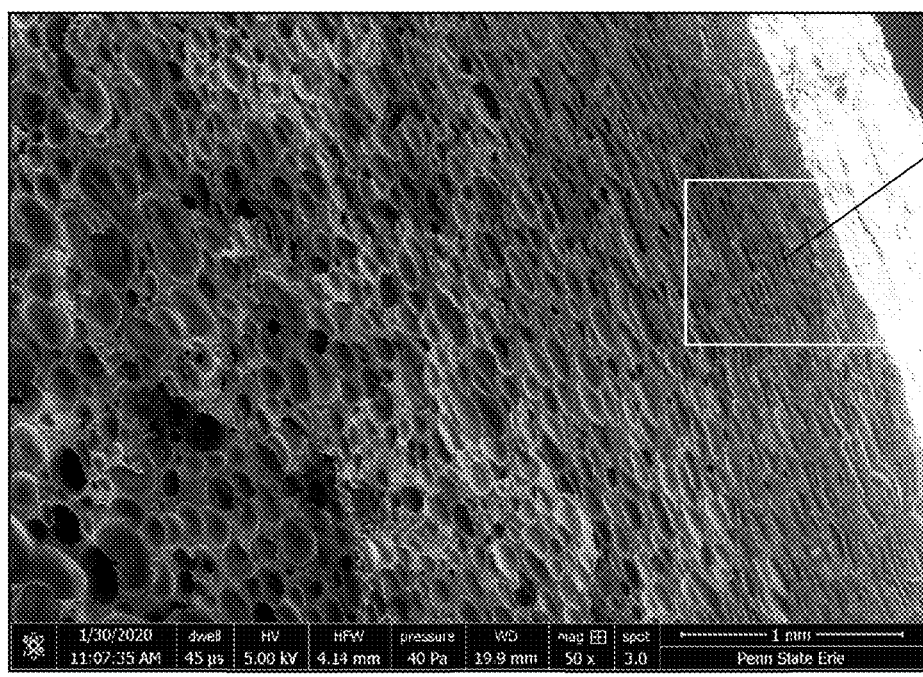
FIG. 17 is an image a micrograph of a fracture surface of a fractured three-inch diameter composite sphere made according to an MFIM process, as described in Example 7.
FIG. 18 is an image a micrograph of a fracture surface of a fractured three-inch diameter composite sphere made according to an MFIM process, as described in Example 7.
Figure 18:
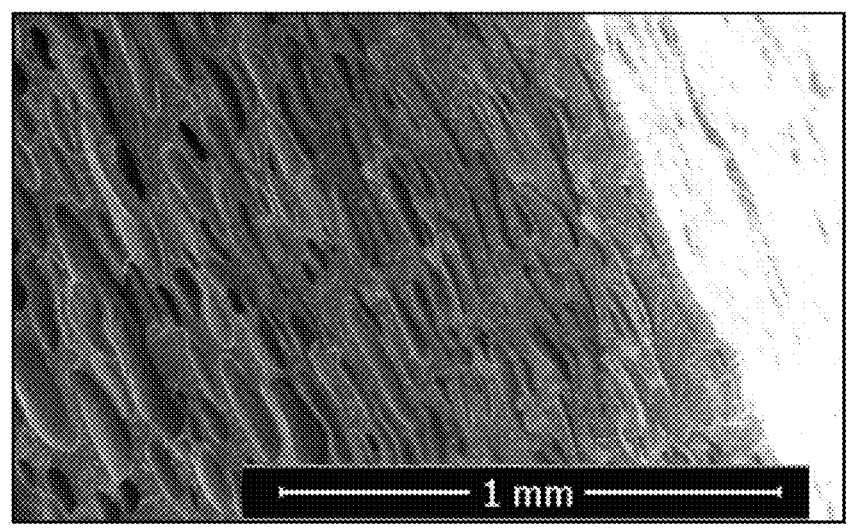

Thus, for example as seen in FIG. 17 and FIG. 18, there is a gradual transition from spherical to compressed pneumatoceles moving towards the surface of polymer foam article formed by employing the conditions, processes, and materials disclosed herein. Thus, in embodiments, a surface region of a polymer foamed article made using the methods disclosed herein includes a plurality of compressed pneumatoceles. In embodiments, the compressed pneumatoceles are present in the surface region of a polymer foam article made using the methods disclosed herein. In some such embodiments, compressed pneumatoceles are present within an interior area of a polymer foam article that is 500 microns or less from the surface. In some such embodiments, compressed pneumatoceles are present within an interior area of a polymer foam article that is as far as 2 cm from the surface. Compressed pneumatoceles are defined as pneumatoceles having a circularity of less than 1, wherein a circularity value of zero represents a completely non-spherical pneumatocele, and a value of 1 represents a perfectly spherical pneumatocele. In embodiments, pneumatoceles having circularity of less than 0.9 are observed in the surface region of foamed polymer articles, further wherein 10% to 90%, or 10% to 80%, or 10% to 70%, or 10% to 60%, or 10% to 50%, or 10% to 40%, or 10% to 30%, or 10% to 20%, or 20% to 80%, or 20% to 70%, or 20% to 60%, or 20% to 50%, or 20% to 40%, or 20% to 30%, or 30% to 70%, or 30% to 60%, or 30% to 50%, or 30% to 40% of the pneumatoceles in the surface region have a circularity of 0.9 or less. In embodiments, an average circularity in the surface region of the foamed polymer articles is 0.70 to 0.95, such as 0.75 to 0.95, or 0.80 to 0.95, or 0.85 to 0.95, or 0.90 to 0.95, or 0.70 to 0.90, or 0.70 to 0.85, or 0.70 to 0.80, or 0.70 to 0.75, or 0.70 to 0.75, or 0.75 to 0.80, or 0.80 to 0.85, or 0.85 to 0.90, or 0.90 to 0.95.

In embodiments, compressed pneumatoceles are present in a polymer foam article more than 500 microns from the surface thereof. For example, in embodiments, compressed pneumatoceles are present up to 1 mm from the surface of a polymer foam article, or up to 2 mm, 3 mm, 4 mm, 5 mm, 6 mm, 7 mm, 8 mm, 1 cm, or more from the surface thereof. In some embodiments the region of compressed pneumatoceles in the polymer foam article corresponds to 0.01% to 70% of the total volume of the article, for example 0.1% to 70%, or 0.5% to 70%, or 1% to 70%, or 2% to 70%, or 3% to 70%, or 4% to 70%, or 5% to 70%, or 6% to 70%, or 7% to 70%, or 8% to 70%, or 9% to 70%, or 10% to 70%, or 15% to 70%, or 20% to 70%, or 30% to 70%, or 40% to 70%, or 50% to 70%, or 60% to 70%, or 0.01% to 60%, or 0.01% to 60%, or 0.01% to 50%, or 0.01% to 40%, or 0.01% to 30%, or 0.01% to 20%, or 0.01% to 10%, or 0.01% to 9%, or 0.01% to 8%, or 0.01% to 7%, or 0.01% to 6%, or 0.01% to 5%, or 0.01% to 4%, or 0.01% to 3%, or 0.01% to 2%, or 0.01% to 1%, or 0.01% to 0.1% of the total volume of the article.

Figure 12:
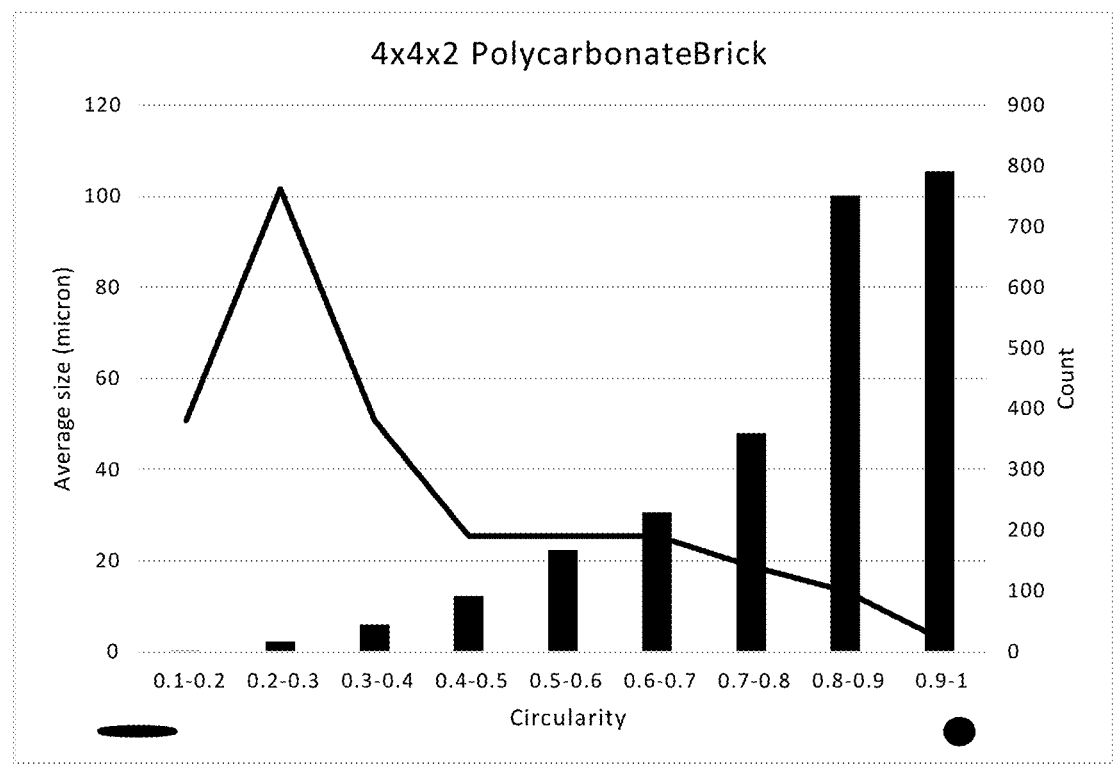
FIG. 12 is a graph including plots of average cell size and cell count against cell circularity for the first part made as described in Example 6.
Figure 14:
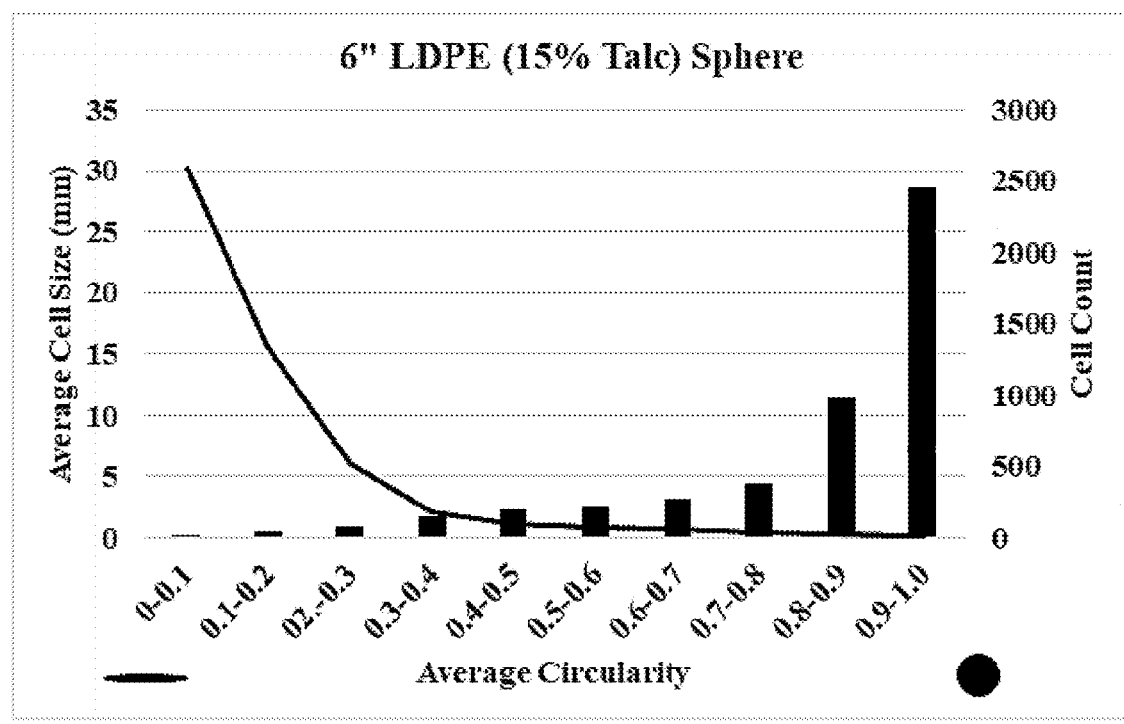
FIG. 14 is a graph including plots of average cell size and cell count against cell circularity for the second (spherical) part made as described in Example 6.

FIGS. 12 and 14 shows a plot of average pneumatocele size and average pneumatocele count versus average pneumatocele circularity for two polymer foam articles made using the presently disclosed methods. Quantitative analysis of pneumatocele size and distribution reveals an inverse relationship between the average pneumatocele size and pneumatocele circularity, and an inverse relationship between the average pneumatocele size and the number of pneumatoceles.

FIG. 18 additionally shows visual evidence that pneumatoceles are present to the surface of the polymer foam articles formed using the methods, materials, and apparatuses as described herein. FIG. 18 additionally shows visual evidence that a plurality of compressed pneumatoceles are present substantially 500 microns from the surface of the polymer foam articles formed using the methods, materials, and apparatuses as described herein. In this sense, the polymer foam articles presently disclosed obtain a significant difference from foam articles of the prior art. While the "skin layer", or first 500 microns of thickness of a foam article made by conventional processes include no pneumatoceles or substantially no pneumatoceles, it is a feature of the prior art foam articles generally that the pneumatoceles are spherical wherever they are located. Thus, at the thickness in a conventional foam article where pneumatoceles are observed, they are generally spherical, having circularity near or about 1. Compressed pneumatoceles are not formed using conventional methodology to make foamed articles, and therefore no distribution of pneumatocele circularity is observed in such conventional foam articles. Further, pneumatoceles are not even formed in the first 500 microns thickness of a foam article made by conventional processes, so no comparisons regarding pneumatoceles can be drawn as to the surface region of the foamed polymer articles as described herein and the foamed articles made using conventional injection molding methods.

Figures 2, 3:
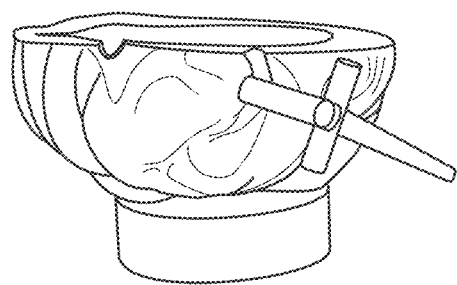
Figures 2, 3, 4:
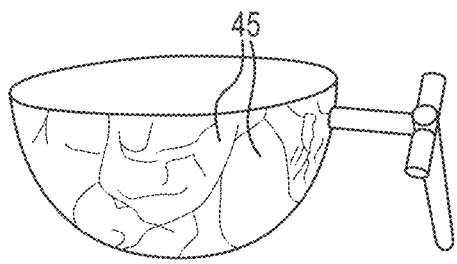
Figures 2, 3, 4, 5:
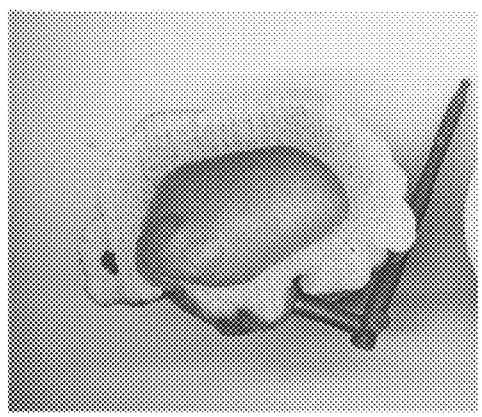

Further, conditions, processes, and materials disclosed herein are suitably optimized to form polymer foam articles having different physical properties depending on the targeted end use or application. For example, the density of a polymer foam article is suitably varied as a function of expansion volume. By lowering the expansion volume, the density of the resulting polymer foam article is decreased in a generally linear fashion, for example as shown in FIG. 5. Also as can be seen from FIG. 5, increasing the expansion period of time causes a denser polymer foam article to form. Such conditions and other variables, all within the scope of the conditions, methods, and materials disclosed herein are suitably used to vary the physical properties of the polymer foam articles that result.

In one variation of conditions, processes, and materials disclosed herein, a molten polymer foam is suitably dispensed by splitting the flow of molten polymer foam into 2, 3, 4, or more pathways heading to multiple molds or mold sections to form multiple polymer foam articles from a single shot. In another variation of conditions, processes, and materials disclosed herein, two shots are used to fill a single mold, wherein the first shot is different from the second shot in terms of the thermoplastic polymer content or ratio of mixed polymers, the pneumatogen source, the one or more additional materials optionally included, density, void fraction, depth of the region of compressed pneumatoceles, or some other material or physical property difference.

In another variation of conditions, processes, and materials disclosed herein, a polymer foam article made using the methods disclosed herein was subjected to fastener pull out testing according to ASTM D6117. The polymer foam articles obtain superior pull out strength over foam articles made using conventional foaming methods. Further, the polymer foam articles formed using the materials, methods, and apparatuses disclosed herein require no pre-drilling, tapping or engineering of the fastener location.

In yet another variation of conditions, processes, and materials disclosed herein, a polymer foam article made using the methods disclosed herein was subjected to ballistic testing. Using the guidance of National Institute of Justice (NIJ) "Ballistic Resistance of Body Armor NIJ Standard-0101.06", a series of 3 inch thick polymer foam articles were formed from poly ether-amide block copolymers (PEBAX®), linear low density polyethylene (LLDPE), and polypropylene using a citric acid based pneumatogen source. Polymer foam articles made using all three of these thermoplastic polymers were found to stop 0.22 LR handgun bullets, passing NIJ Level I; and were found to stop 9 mm LUGER® handgun bullet, passing NIJ Levels II and IIA.

Experimental Section

The following examples are intended to further illustrate this invention and are not intended to limit the scope of the invention in any manner. Examples 1 and 11 were conducted on an Engel Duo 550 Ton injection molding machine (available from Engel Machinery Inc. of York, Pa., USA). Examples 2-4 were conducted on a Van Dorn 300 injection molding machine (available from Van Dorn Demag of Strongsville, Ohio, USA). Unless otherwise indicated, the remaining examples were conducted on an Engel Victory 340 Ton injection molding machine (available from Engel Machinery Inc. of York, Pa., USA).

In the Examples herein, "cc" means "cubic centimeter" or "cubic centimeters" ($cm^3$), "sec" means "second" or "seconds".

Standard Foam Molding and MFIM

In the Examples herein, two direct injection expanded foam molding techniques were employed termed herein "standard foam molding" and "molten foam injection-molding" ("MFIM").

In standard foam molding, the following general procedure was used: A) A mixture was prepared by blending a polymer (which may be in the form of pellets, powder, beads, granules and the like) with a foaming agent (blowing agent) and any other additives such as a filler. The mixture was introduced to the injection unit, and the rotating injection unit screw moved the mixture forward in the injection unit barrel, thus forming a heated fluid material in accordance with normal injection molding processes. B) A set volume of the material was dosed to the front of the barrel of the injection unit by rotation of the screw, thus moving the set volume from the feed zone to the front of the screw. During this feed step, the screw was rotated to translate the melted mixture forward into the space in the barrel between the screw and the nozzle, thereby providing the set volume.

C) The melted mixture was injected into the mold cavity by forward translation of the screw and/or rotation of the screw.

In the molten foam injection-molding (MFIM) process, the following general procedure was used: A) A mixture was prepared by blending a polymer (which may be in the form of nurdles, pellets, powder, beads, granules and the like) with a chemical foaming agent, and any other additives such as a filler. The mixture was introduced to the injection unit, and the rotating injection unit screw moved the material forward in the injection unit barrel, thus forming a heated fluid material in accordance with normal injection molding processes. B) A set volume of the material was dosed to the front of the barrel of the injection unit by rotation of the screw, thus moving the set volume from the feed zone to the front of the screw. During this feed step, the screw was rotated to move the material between the screw and the nozzle, thereby providing the set volume. C) Once the material had been moved to the front of the screw, in a step termed herein "decompression", the screw was moved backwards away from the nozzle without or substantially without rotation so as to avoid moving more of the material to the front of the screw. Unless otherwise noted, the decompression rate, that is, the rate of depressurization, is 0.006 GPa or less.

A space free of the mixture between the screw and the nozzle was created within the barrel, the intentional space having a volume termed herein "decompression volume". D) The material sat in the barrel between the screw and the nozzle for a period of time, termed herein the "decompression time". During the decompression time, the material foamed due to a pressure drop created by the space added in step (C). E) The molten foam was injected into the mold cavity by forward translation of the screw and/or rotation of the screw.

Example 1

Two parts were foam molded using a blend of low-density polyethylene blended with 2% by weight Hydrocerol® BIH 70 foaming agent available from Clariant AG of Muttenz, Switzerland. Molding was conducted using an Engel Duo 550 Ton injection molding machine (available from Engel Machinery Inc. of York, Pa., USA). The mold cavity was (approximately) spherical in shape of diameter six inches (15.24 cm). A first part was molded using a standard foam molding process, and a second part was molded using an MFIM process. An aluminum mold having a cold sprue and runner system feeding a 6-inch diameter sphere cavity was employed for both parts. The melt delivery system for each part was the same, as were most of the processing conditions. The process settings for the MFIM process and standard foam molding processes used as a control are detailed in TABLE 3. From each process, parts were made of approximately equivalent mass.

TABLE 3

Settings for Example 1; Equivalent mass study

| | Standard Foam Molding Process | MFIM |
|---|---|---|
| Barrel temperatures (° C.) | 182/182/182/174/163/154/161/121/49 | |
| Mold temperature (° C.) | 10 | |
| Injection speed (cc/s) | 655.5 | |
| Back pressure (kPa) | 17237 | |
| Decompression (cc) | — | 164 |
| Screw speed (cm/sec) | 15.24 | |

TABLE 3-continued

Settings for Example 1; Equivalent mass study

| | Standard Foam Molding Process | MFIM |
|---|---|---|
| Cooling time (sec) | 160 | |
| Hold time (sec) | 30 | — |
| Hold pressure (kPa) | 8963 | — |
| Shot weight (g) | 328.9 | 331.9 |

The first and second parts were photographed. FIG. 2-1 is a line drawing of a photographic image of the first part, molded using the standard foam molding process. As seen in the image, the standard foam process did not yield a part that filled the mold cavity, and the part did not match the shape of the spherical cavity of the mold.

FIG. 2-2 is a line drawing of a photographic image of the second part, molded using the MFIM process. As seen in the image, the MFIM process yielded a part that entirely or substantially filled the spherical mold cavity and the part matched or substantially matched the shape of the spherical cavity of the mold.

The first part molded using the standard foam molding process was cut into two pieces. FIG. 2-3 is a line drawing of a photographic image and FIG. 2-5 is a photographic image of one of the pieces of the part made according to the standard foam molding process. As seen in the images, the first part contained a large hollow cavity.

The second part molded according to the MFIM process was cut into two pieces. FIG. 2-4 is a line drawing of a photographic image and FIG. 2-6 is a photographic image of one of the pieces of the second part. As seen in the images, the second part lacked the large hollow cavity of the standard foam process part. The MFIM part had a cell structure throughout.

Example 2

Two parts were formed by foam injection molding, a Part A in accordance with a standard foam molding process, and a Part B in accordance with an MFIM process. In both processes, LDPE/talc pellets were dry-blended with foaming agent and mixed during loading into the molding machine.

For Part B, a mixture of low-density polyethylene (LDPE), talc, and Hydrocerol® BIH 70 was formed and fed into a Van Dom 300 injection molding machine to provide a polymer shot inside the barrel. After the shot accumulated in the front of the screw, the screw was translated backwards away from the injection nozzle without rotation in accordance with the MFIM method to create a space between the screw and the nozzle, the space having a decompression volume. Then, the mixture foamed into the space prior to injection into the mold.

The same procedure was used for Part A except that after the shot accumulated in front of the screw, the screw was not backed away from the nozzle, i.e. decompression volume was zero. The shot was metered to fill the mold cavity under standard foam molding conditions with a target of 10% weight reduction relative to solid part.

TABLES 4-7 below show the polymer, mold, machine, and processing settings used in Example 2.

TABLE 4

Material Composition

| | | Weight % |
|---|---|---|
| Polymer: | LDPE | 82% |
| Filler: | Talc | 15% |
| Foaming agent: | Hydrocerol ® BIH 70 | 3% |

TABLE 5

Baseline Mold Parameters

| Block Mold (2 × 4 × 4 inch) (5.08 × 10.16 × 10.16 cm) | ASTM Mold |
|---|---|
| Mold cavity volume (cc) | 524.39 |
| Sprue Volume (cc) | 17.39 |
| Total Volume (cc) | 541.78 |

TABLE 6

Common Settings for Producing "Zero Decompression" and MFIM Parts

| Barrel Temperatures (° C.) | 154│185│177│166 |
|---|---|
| Mold Temperature (° C.) | 20 |
| Back pressure (kPa) | 0 |
| Screw Speed (rpm) | 165 |
| Screw Rotate Delay time (sec) | 100 |
| Hold time (sec) | 10 |
| Injection Velocity (cc/sec) | 394 |

TABLE 7

Independent Settings

| Shot Details | Part A | Part B |
|---|---|---|
| Polymer mass (g) | 456.2 | 189.4 |
| Polymer volume in barrel (cc) | 486.3 | 162.12 |
| Decompression volume (cc) | 0 | 231.57 |
| Total molten shot size (cc) | 486.297 | 393.69 |
| Cooling time (sec) | 800 | 160 |

Figure 3A:
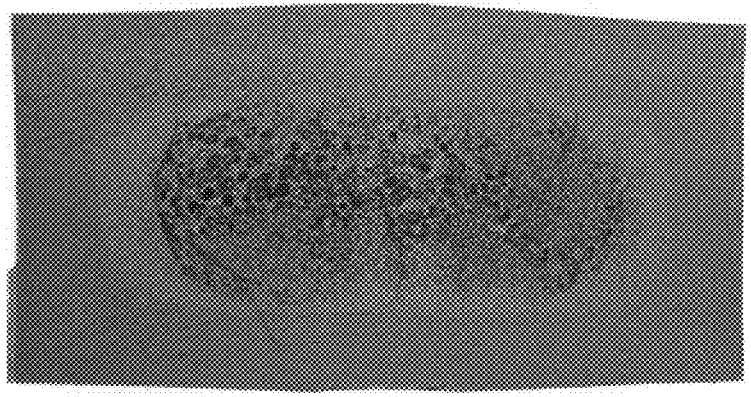
FIG. 3A is a photographic image of a cross section of Part A made according to a standard foam molding process and cut into two pieces to reveal a cross section, as described in Example 2.
Figure 3B:
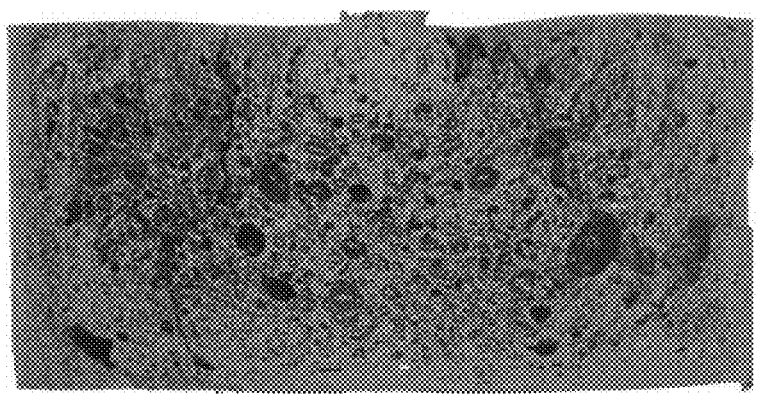
FIG. 3B is a photographic image of a cross section of Part B made according to an MFIM process and cut into two pieces to reveal a cross section, as described in Example 2.

Each of Parts A and B was cut in half to reveal a cross section. FIG. 3A and FIG. 3B show the resulting cross sections of Part A and Part B respectively. As shown in FIG. 3A, Part A had a thick outer region extending nearly 0.8 inches (20.3 mm) from the surface, indicating that more than 50% of the molded part was completely solid. The density of Part A was 0.84 g/cc.

FIG. 3B shows a cross section of Part B molded according to the MFIM process using the settings shown in TABLE 4 and TABLE 5. As seen in FIG. 3B, Part B had a foam structure that includes a distribution of cell sizes and shapes. A solid, unfoamed outer region is nearly absent from Part B. The density of Part B was 0.35 g/cc.

Figure 4A:
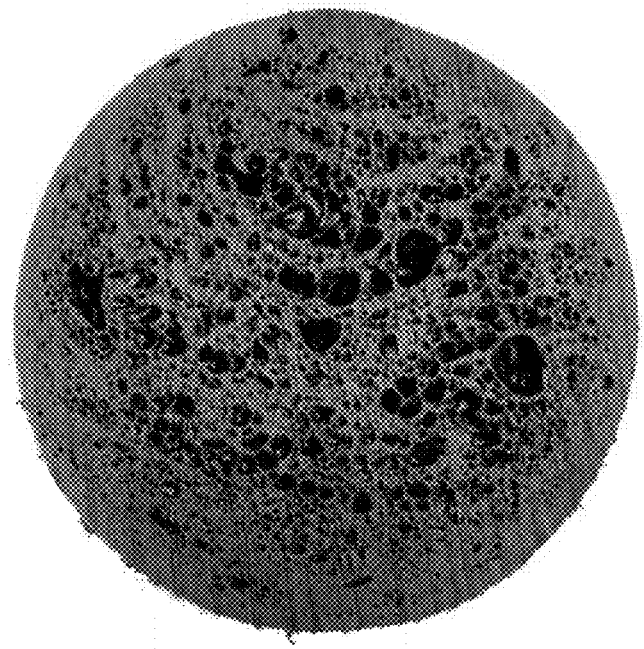
FIG. 4A is a photographic image of a cross section of Part C made according to an MFIM process and cut into two pieces to reveal a cross section, as described in Example 2.
Figure 4B:
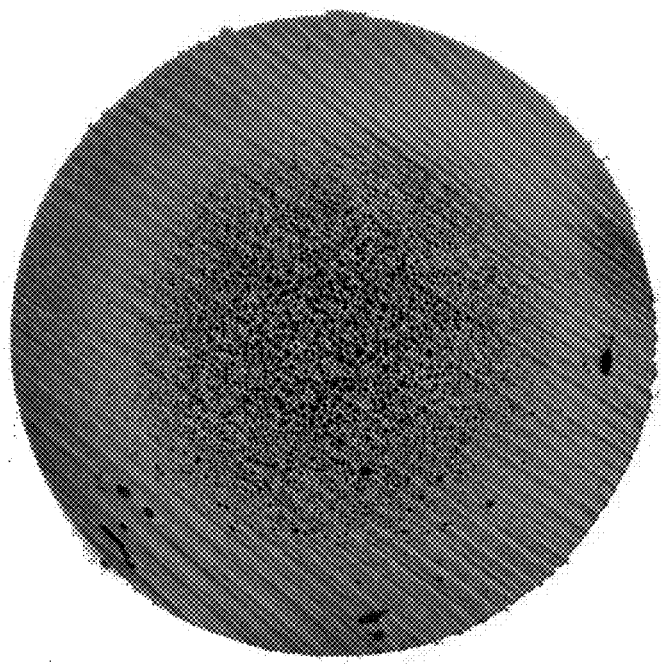
FIG. 4B is a photographic image of a cross section of Part D made according to a standard foam molding process and cut into two pieces to reveal a cross section, as described in Example 2.
Figure 5:
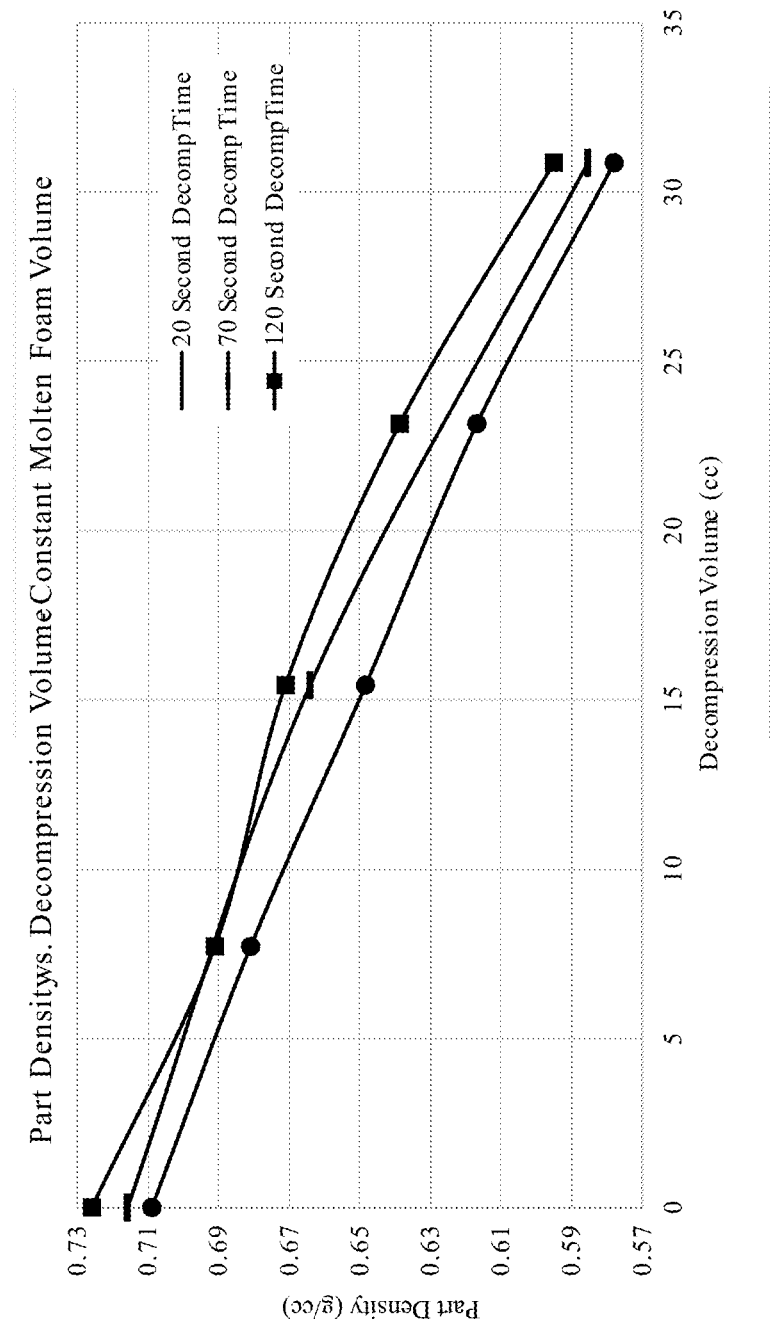
Figure 6:
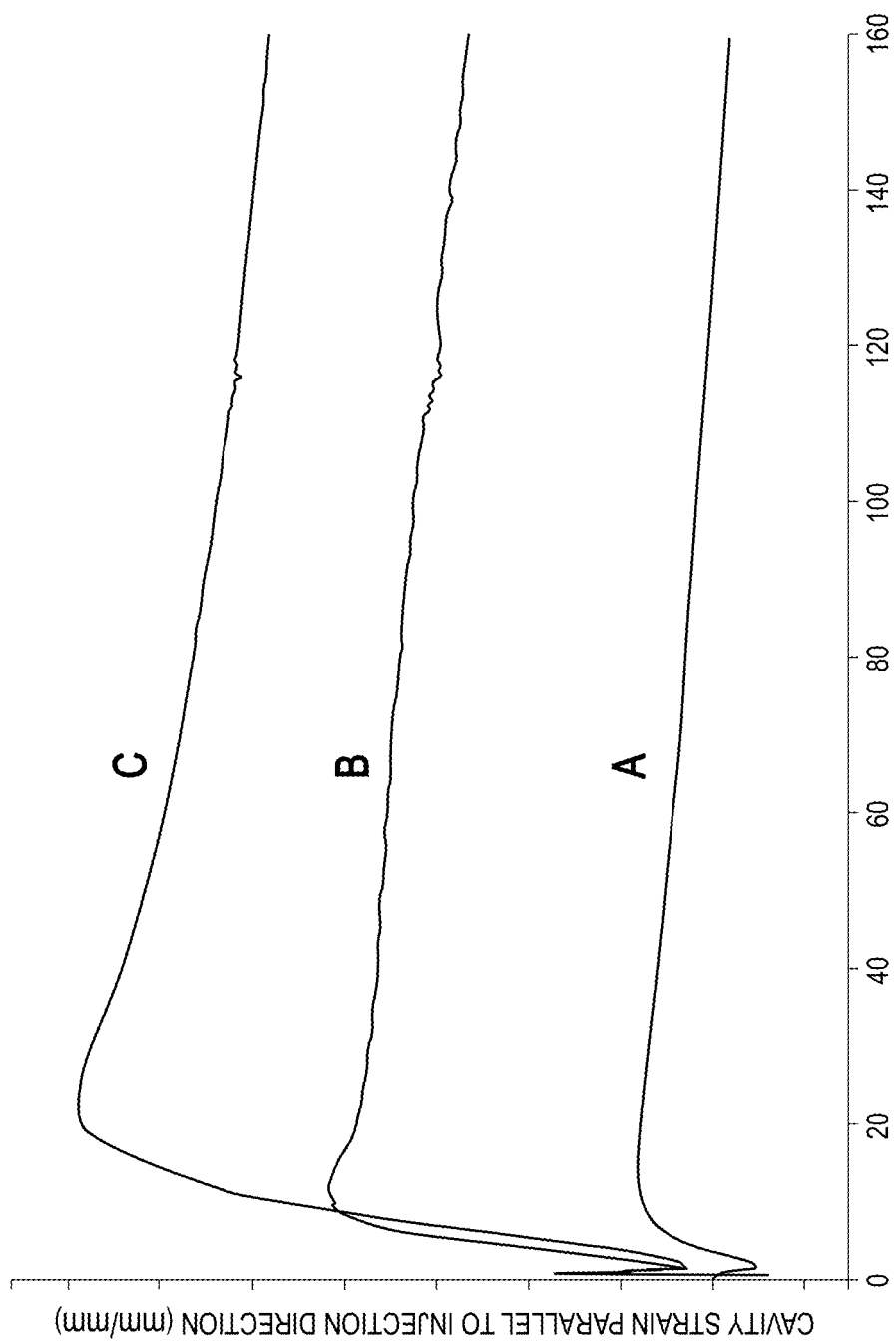

A sphere cavity mold was used to form a further two parts, Part C and Part D, by foam injection molding. The same mixture composition of LDPE, talc, Hydrocerol® BIH 70 was used to form Parts C and D. Part C was made by the MFIM process, Part D by the standard foam molding process. Both processes produced a spherical or approximately spherical part having a six inch (15.24 cm) diameter. Parts C and D were cut through the middle (widest part) into two pieces to expose a cross section of the part. FIG. 4A is a photographic image of a cross section of Part C made by the MFIM process (471 g, required cooling time 160 seconds). FIG. 4B is a photographic image of the cross section of Part D molded using standard foaming process targets (1360 g, required cooling time 800 seconds).

Similar results were obtained as with the block mold. Part C made according to the MFIM process showed cells throughout the part, whereas Part D made according to the standard foam molding process showed a region adjacent to the outer surface of the part that was free or substantially free of cells ("solid"). Part C was less dense than Part D.

Example 3

In Example 3, block parts were molded using the MFIM process at various decompression volumes (Trial A) and various decompression volumes and decompression times (Trial B).

TABLES 8-10 show the material composition, mold geometry information, and processing settings used for Trials A and B.

TABLE 8

Material Composition

| | | Weight % |
|---|---|---|
| Polymer: | LDPE | 82% |
| Filler: | Talc | 15% |
| Foaming agent: | Hydrocerol ® BIH 70 | 3% |

TABLE 9

Baseline Mold Parameters

| Block Mold (2 × 2 × 2 inch) (5.08 × 5.08 × 5.08 cm) | ASTM Mold |
|---|---|
| Mold Cavity Volume (cc) | 132.74 |
| Sprue Volume (cc) | 17.39 |
| Total Volume (cc) | 150.13 |

Composite LDPE/talc pellets were mixed with foaming agent just prior to molding.

Trial A

In Trial A, all variables were held constant except the volume ratio of polymer to decompression volume (empty space) in the barrel prior to injection. The settings for each sample run of Trial A are shown in TABLE 10:

TABLE 10

Settings for Trial A

| | Sample 1 | Sample 2 | Sample 3 | Sample 4 | Sample 5 |
|---|---|---|---|---|---|
| Barrel Temperatures (° C.) | 171│185│177│166 | 171│185│177│166 | 171│185│177│166 | 171│185│177│166 | 171│185│177│166 |
| Mold Temperature (° C.) | 21 | 21 | 21 | 21 | 21 |
| Injection Pressure (kPa) | 4137 | 4137 | 4137 | 4137 | 4137 |
| Back pressure (kPa) | 0 | 0 | 0 | 0 | 0 |
| Decompression volume (cc) | 0 | 7.7 | 15.4 | 23.2 | 30.1 |
| Screw Speed (rpm) | 165 | 165 | 165 | 165 | 165 |
| Overall cycle time (sec) | 76.5 | 76.5 | 76.5 | 76.5 | 76.5 |
| Shot Size (cc) | 92.62 | 84.91 | 77.19 | 69.47 | 61.75 |
| Decompression time (sec) | 20 | 20 | 20 | 20 | 20 |

The volume of molten foam injected into the polymer cavity was constant, but the density of the molten foam was a function of the polymer shot/decompression volume ratio. The polymer shot/decompression volumes were varied giving parts with weight and density as shown in TABLE 11:

TABLE 11

Trial A Part Weights and Densities

| Sample | Polymer Volume in Barrel (cc) | Decompression Volume in Barrel (cc) | Total Molten Foam Shot Volume (cc) | Polymer Shot as a Percentage of Total Volume (Polymer + Decompression Volume) | Decompression time (sec) | Part Weight (g) | Part Density (g/cc) |
|---|---|---|---|---|---|---|---|
| 1 | 92 | 0 | 92 | 100% | 20 | 94.1 | 0.71 |
| 2 | 85 | 7 | 92 | 92% | 20 | 90.4 | 0.68 |
| 3 | 77 | 15 | 92 | 83% | 20 | 86.0 | 0.65 |
| 4 | 69 | 23 | 92 | 75% | 20 | 81.8 | 0.62 |
| 5 | 62 | 30 | 92 | 67% | 20 | 76.1 | 0.58 |

The results in TABLE 11 indicate that by decreasing the mass and volume of polymer in the molten foam shot with a commensurate increases in decompression volume, the density of the resultant part can be varied.

Trial B

In Trial B, five moldings under the same conditions as Trial A were conducted three times; once with a decompression time 20 seconds (same as Trial A), once with a decompression time of 70 seconds, and once a decompression time of 120 seconds. The 15 resultant foam-molded parts were weighed and the density calculated using the volume of the mold cavity. The part density was plotted as a function of decompression volume for each of the three decompression times. The plots are shown in FIG. 5. As seen in FIG. 5, part density varied as a function of decompression volume. Further, as shown in FIG. 5, the greater the decompression time, the denser the part.

Example 4

In Example 4, two series of trials were run using the MFIM process, Series I and Series II. In Series I, a constant injection speed was used but mold close height was varied. In Series II, mold close height was increased with increasing injection speed. In Series II, all conditions were kept constant except injection speed (cc/sec) and mold close height. In the trials, LDPE/talc pellets were dry blended with the foaming agent and mixed during loading into the molding machine.

TABLES 12-13 below show the material composition of the injected blend and the base mold configuration used for the trials.

TABLE 12

Material Composition

| | | Weight % |
|---|---|---|
| Polymer: | LDPE | 82% |
| Filler: | Talc | 15% |
| Foaming agent: | Hydrocerol ® BIH 70 | 3% |

TABLE 13

Baseline Mold Parameters

| Block Mold (2 × 4 × 4 inch) (5.08 × 10.16 × 10.16 cm) | ASTM Mold |
|---|---|
| Mold cavity volume (cc) | 524.39 |
| Sprue Volume (cc) | 17.39 |
| Total Volume (cc) | 541.78 |

Series I

In Series I, an injection velocity of 394 cubic centimeters per second was used, and three trials were run, Trial A with a mold close height of 1.02 mm producing Part A; Trial B with a mold close height of 0.76 mm producing Part B, and Trial C with a mold close height of 0.51 mm producing Part C. The settings for the Series I trials are shown in TABLE 14:

TABLE 14

| Settings | |
|---|---|
| Barrel Temperatures (° C.) | 154\|185\|177\|166 |
| Mold Temperature (° C.) | 20 |
| Injection Speed (cc/sec) | 394 |
| Back pressure (kPa) | 0 |
| Screw Speed (rpm) | 165 |
| Screw Rotate Delay Time (sec) | 100 |
| Hold Pressure (kPa) | 0 |
| Hold Time (sec) | 10 |
| Fill Time (sec) | 1.78 |
| Mold Close Height (mm) | 1.02, 0.76, 0.51 |

Figures 2, 3, 4, 5, 6:
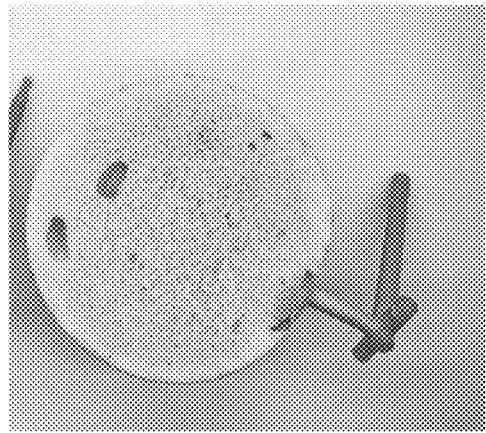

During each molding cycle (each of Trial A, Trial B, and Trial C), a strain gauge (Kistler Surface Strain Sensor Type 9232A, available from Kistler Holding AG, Winterthur, Switzerland) was mounted just above or inside the molding cavity. The strain sensor contained two piezoelectric sensors that measured the strain of the aluminum cavity as a function of time during the molding cycle. The strain measurement was used as an indirect measure of the force acting on the surface of the mold cavity resulting from the injection of molten foam and any subsequent additional foaming that occurred within the mold cavity. The cavity strain measurements are shown in FIG. 6 for Trial A, 1.02 mm gap height (line A); Trial B, 0.76 mm mold close height (line B); and Trial C, 0.51 mm mold close height (line C). In FIG. 6 the strain (unit extension per unit length) is plotted versus time in seconds. The strain curves indicate that the pressure was higher in Trial C than in Trial B and Trial B was higher than in Trial A.

Figure 7:
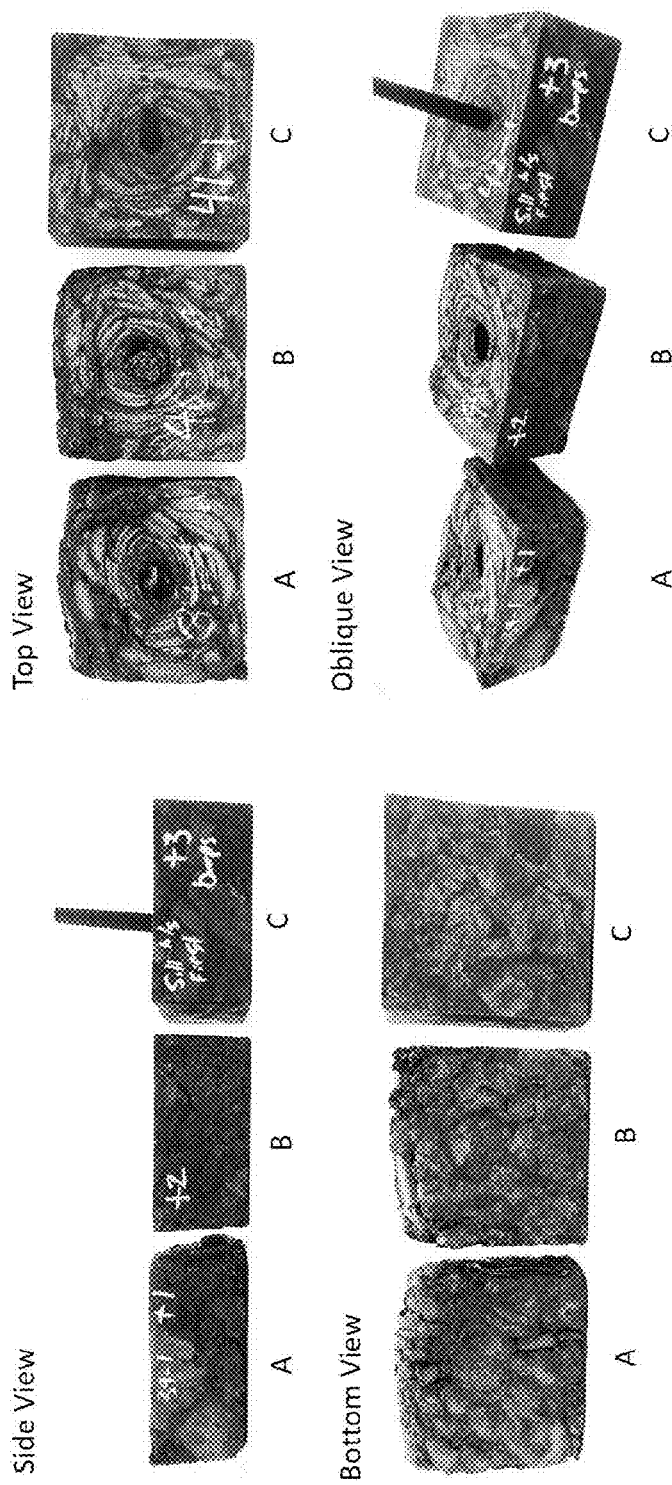
FIG. 7 shows photographic images of views in different aspects of Parts A, B, and C as described in Example 4.

FIG. 7 includes photographic images showing a side view, a top view, an oblique view, and a bottom view of Parts A, B, and C. Parts A and B showed evidence of collapse, as the parts did not sufficiently match the mold cavity shape. Part A showed more collapse than Part B. Part C was more fully formed than either of Parts A and B in that the edges of Part C were better defined, and Part C conformed better to the mold cavity shape, and the interior of the part appeared more homogenous.

It was believed that parts could partially collapse in the cavity during molding if sufficient pressure is not supplied to stabilize the foam in the cavity during solidification. Accordingly, in Series II the mold was closed more tightly at slower injection rates in order to maintain sufficient pressure to prevent collapse of the part during molding.

Series II

In Series II the gap between mold halves, the mold close height, was systematically decreased as the injection rate was decreased. The molding conditions used were the same as those in Series I except that the injection rates and mold close heights used were those as shown in TABLE 15:

TABLE 15

| | Series II | |
|---|---|---|
| Trial | Injection Rate (cc/sec) | Mold Close Height (mm) |
| A' | 394 | +0.51 (gap) |
| B' | 317 | +0.21 (gap) |
| C' | 162 | −0.26 (pressure) |
| D' | 85 | −0.51 (pressure) |

Four parts were produced in Trials A', B', C', and D', Parts A', B', C', and D' respectively.

Figure 8:
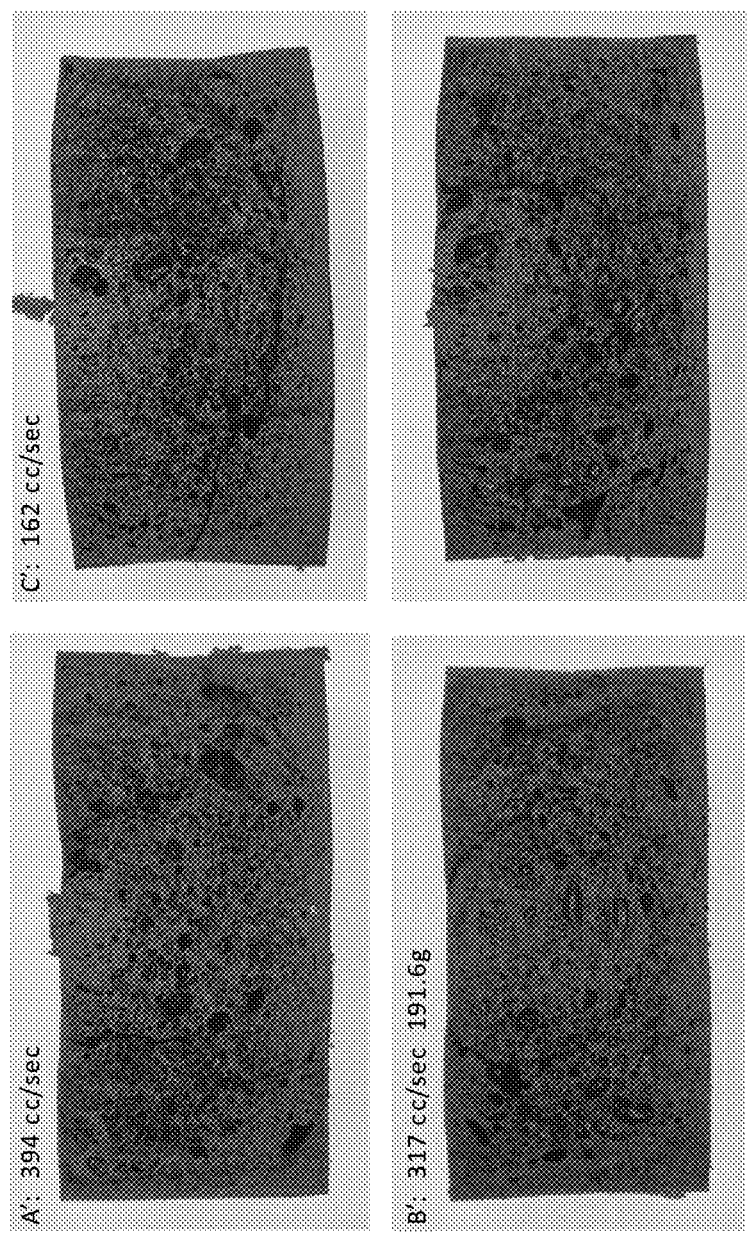
FIG. 8 shows photographic images views of cross sections of Part A', B', C', and D' as described in Example 4.

Each of Parts A', B' C' and D' was cut into two, and the cross section photographed. The photographic images are shown in FIG. 8. In order to produce a part that did not collapse before solidification, the mold halves had to be increasingly closed, as shown in TABLE 15, until they were actually being pressed together (as indicated by negative dimension).

Parts A', B' C', and D' showed no evidence of collapse, had well defined edges and surfaces, and appeared fairly uniform. Accordingly, parts were made using the MFIM process using drastically different injection rates by controlling the pressure within the cavity during injection, e.g. by varying mold close height.

Example 5

In Example 5, the same LDPE composite material as Examples 1-3 was used in a non-standard two cavity mold with molding parameters as shown in TABLES 16-18.

TABLE 16

| Material Composition | | |
|---|---|---|
| | | Weight % |
| Polymer: | LDPE | 82% |
| Filler: | Talc | 15% |
| Foaming agent: | Hydrocerol ® BIH 70 | 3% |

LDPE/Talc pellets dry blended with foaming agent and mixed during loading into molding machine.

TABLE 17

| Baseline Mold Parameters | |
|---|---|
| Total Mold Cavity Volume (cc) | 1232 |
| Sprue & Runner Volume (cc) | 18 |
| Single Mold Cavity Volume (cc) | 607 |

TABLE 18

| Machine Setpoints and Mold Details | |
|---|---|
| Shot size (cc) | 555.7 |
| Decompression volume (cc) | 463.1 |
| Decompression time (s) | 160 |
| Pack Volume Time (sec) | 0.00 |
| Pack Volume Speed (cm/sec) | 0.00 |
| Hold Press (kPa) | 0.00 |
| Hold Time (sec) | 10.00 |
| Back Pressure (kPa) | 0.00 |
| Cushion (cm) | 0.00 |
| Cooling Time (sec) | 180.00 |
| Sprue Break (cm) | 2.54 (Stack) |
| Sprue Volume (cc) | 18 |
| Barrel Temperatures (° C.) | 163\|185\|177\|166 |
| Mold Temperature (° C.) | 26.7 |
| Injection Velocity (cc/sec) | 394 |
| Screw Speed (rpm) | 165 |
| Screw Rotate Delay Time (sec) | 20 |
| Fill Time (sec) | 2.385 |

Figure 9:
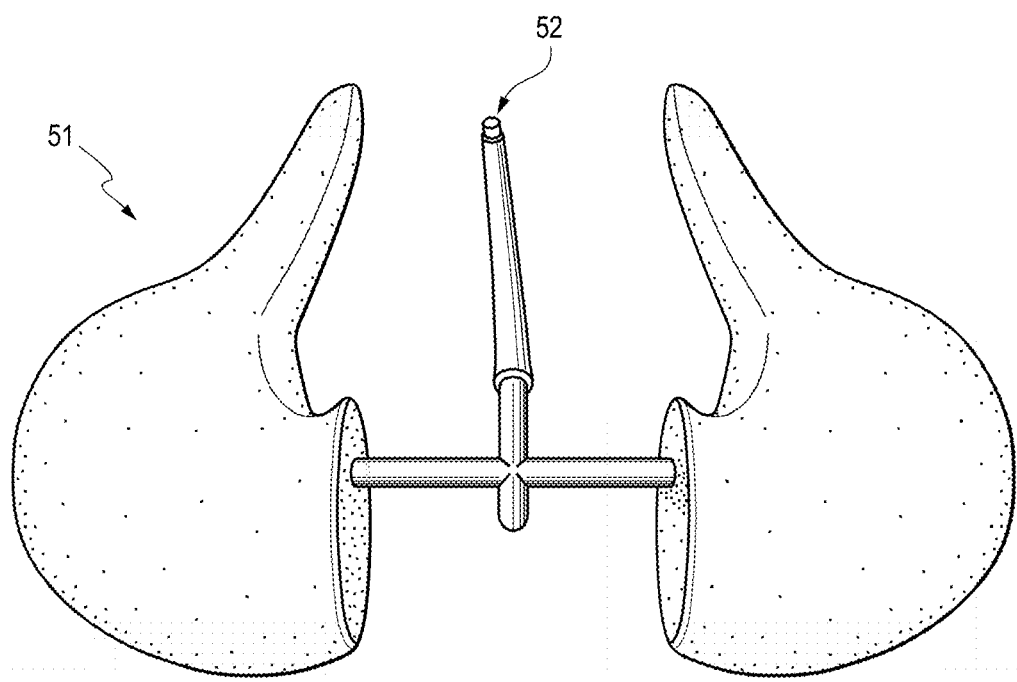
FIG. 9 is a drawing of two parts as described in Example 5.

Example 5 produced the parts 51 shown in FIG. 9. During injection the molten foam melt entered through the sprue 52 and split off into two separate channels to fill the parts 51 substantially simultaneously. Accordingly, the MFIM process could be used to form parts by splitting the melt into multiple pathways in the mold.

Example 6

A first part was molded using a formulation of 15 wt. % talc/85 wt. % polycarbonate composite was blended with 3 wt. % Hydrocerol® XH-901 prior to loading into the injection molding machine. The first part was formed using the MFIM process. Process details are provided in TABLES 19 and 20. The part was made using a 4×2×2 block mold (5.08×10.16×10.16 cm) with a mold cavity volume of 524.4 cc and a sprue volume of 17.4 cc. The sprue was cut from the part, and the part was then subject to X-ray tomography to quantify the cellular structure formed within the 5.08× 10.16×10.16 cm geometry.

TABLE 19

| Material Composition | | |
|---|---|---|
| | | Weight % |
| Polymer: | Polycarbonate | 82% |
| Filler: | Talc | 15% |
| Foaming Agent: | Hydrocerol ® XH-901 | 3% |

TABLE 20

| Settings | |
|---|---|
| Barrel Temperatures (° C.) | 288\|282\|277\|260\|232\|204 |
| Nozzle Temperature (° C.) | 288 |
| Feed Throat Temperature (° C.) | 65.5 |
| Mold Temperature (° C.) | 32 |
| Injection Speed (cc/s) | 655.48 |
| Specific Back Pressure (kPa) | 6,895 |
| Polymer Shot Size (cc) | 139 |
| Decompression Size (cc) | 90 |
| Total Molten Foam Shot Size (cc) | 229 |
| Screw Speed (cm/sec) | 7.62 |
| Screw Rotate Delay Time (sec) | 40 |
| Appx. Decompression Time (sec) | 80 |
| Hold Pressure (kPa) | 0 |
| Hold Time (sec) | 0 |
| Cooling Time (sec) | 120 |
| Clamp Force (kN) | 267 |

X-Ray tomography was carried out using a Zeiss Metrotom 800 130 kV Imaging system (available from Carl Zeiss AG of Oberkochen, Germany). The instrument measured the attenuation of the X-ray radiation due to the component geometry and the density of the material used. The column data were calculated using the Feldkamp reconstruction algorithm, a standard technique for the industry. The instrument had a flat panel detector of 1536×1920 pixels for an ultimate resolution of 3.5 µm under the conditions of this measurement.

Figure 10:
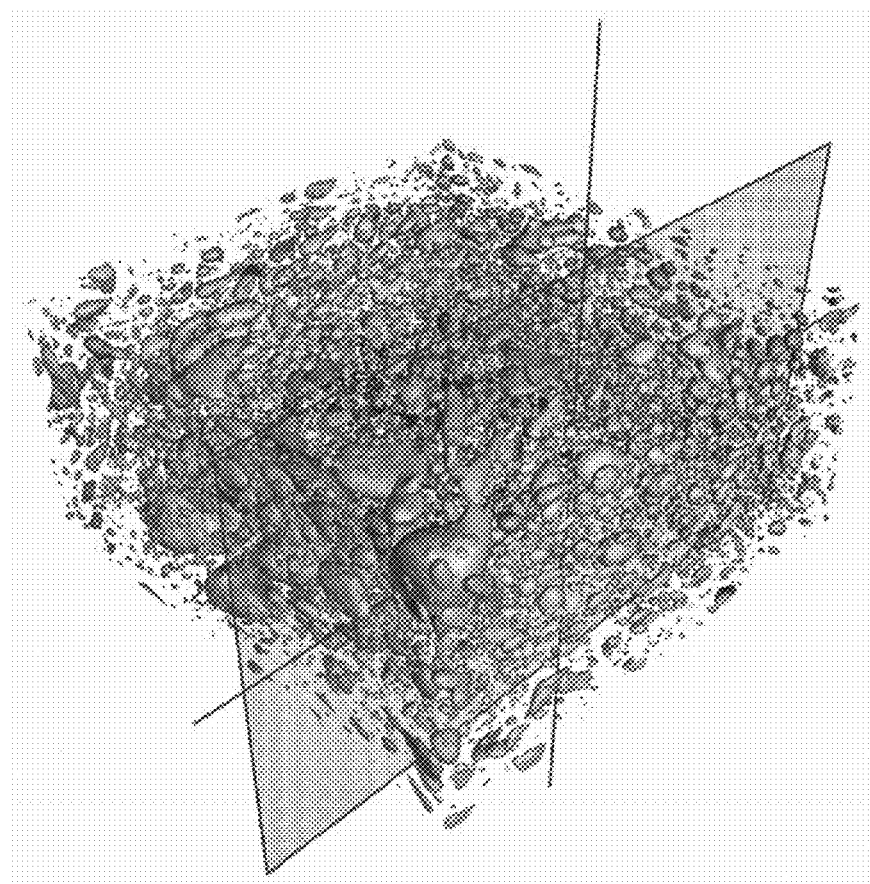
FIG. 10 is an isometric image of a tomography scan of the first part made according to an MFIM process as described in Example 6.
Figure 11:
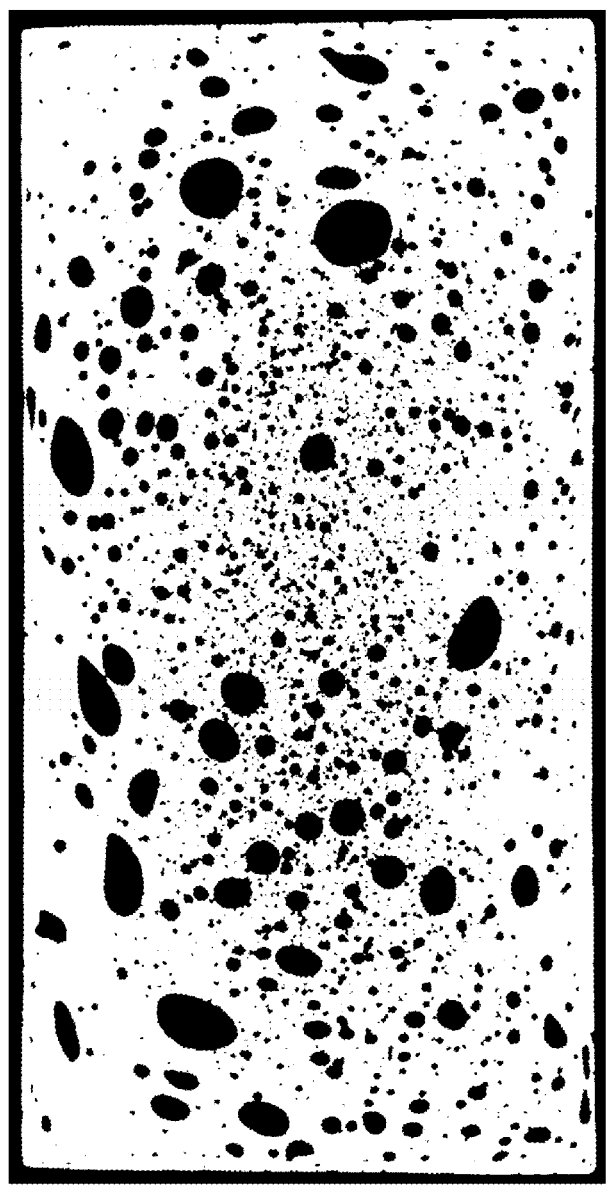
FIG. 11 is an image of the cross section plane shown in FIG. 10 as described in Example 6.

An isometric image of a full Zeiss 3D Tomography scan of the first part is shown in FIG. 10, with the solid polymer fraction shown as transparent, the cells shaded for visualization, and the cutting plane A-A for single cross-section indicated. FIG. 11 is a single-plane cross section A-A selected from the X-ray data with a threshold analysis applied to allow for discrete cell identification and subsequent quantitative analysis.

The circularity of the cross-sections of the cells was obtained. The circularity of these cross sections was used as a measure of the sphericity of the cells. Accordingly, circularity and sphericity are used interchangeably in the Examples. Quantitative analysis shown in FIG. 12 revealed a cell distribution of both counts and average size as a function of the circularity of each cell. A circularity value of zero represents a completely non-spherical cell, and a value of 1 represents a perfectly spherical cell. The data showed a distribution of cell sizes and shapes. With the exception of the most deformed cells (indicated by 0.1-0.2 on the circularity scale), there was an inverse relationship between the average cell size and the number of cells of a given circularity. Further, there is an inverse relationship between the average cell size and the number of cells.

Using an MFIM process, a second, spherical, part of diameter of six inches (15.24 cm) was molded from low-density polyethylene (LDPE) using the polymer formulation and processing parameters as outlined in TABLE 21 and TABLE 22. The LDPE/talc pellets were dry blended with the foaming agent, Hydrocerol® BIH 70 and mixed during loading into the molding machine.

TABLE 21

Material Composition

| | | Weight % |
|---|---|---|
| Polymer: | LDPE | 82% |
| Filler | Talc | 15% |
| Foaming Agent: | Hydrocerol BIH-70 | 3% |

TABLE 22

Settings

| | |
|---|---|
| Barrel Temperatures (° C.) | 182\|174\|171\|171\|166\|135 |
| Nozzle Temperature (° C.) | 182 |
| Feed Throat Temperature (° C.) | 54 |
| Mold Temperature (° C.) | 21 |
| Injection Speed (cc/sec) | 655.5 |
| Specific Back Pressure (kPa) | 6895 |
| Polymer Shot Size (cc) | 574 |
| Decompression Size (cc) | 1475 |
| Total Molten Foam Shot Size (cc) | 2048 |
| Screw Speed (cm/sec) | 15.24 |
| Screw Rotate Delay Time (sec) | 60 |
| Appx. Decompression Time (sec) | 100 |
| Hold Pressure (kPa) | 0 |
| Hold Time (sec) | 0 |
| Cooling Time (sec) | 160 |
| Clamp Force (kN) | 178 |

Figure 13:
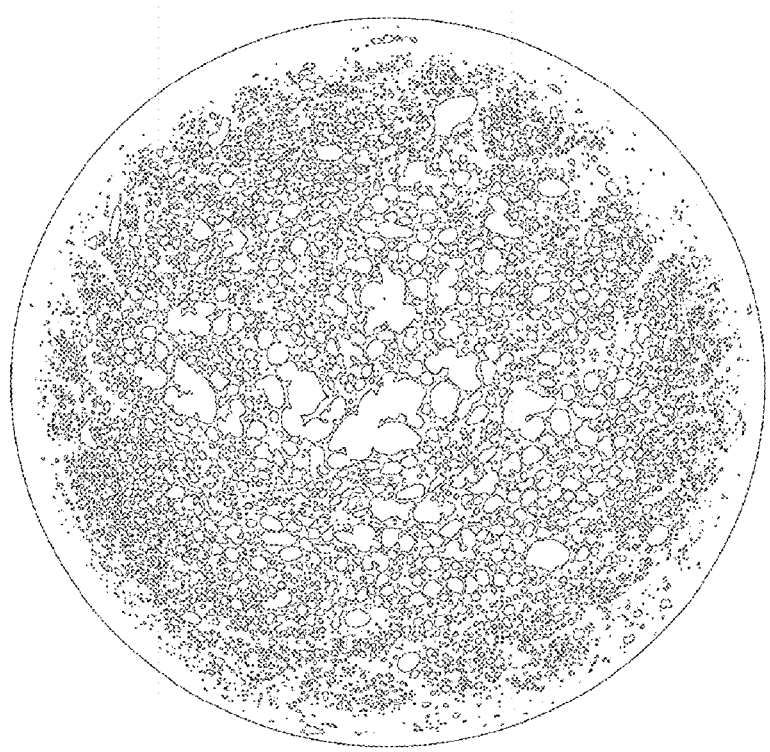
FIG. 13 is drawing of an X-ray tomographic image of a cross section of a second (spherical) part as described in Example 6.

FIG. 13 is an x-ray tomographic image of a cross section of the sphere. As seen in FIG. 13, the outer region contained a plethora of smaller cell sizes with larger cells in the central region.

FIG. 14 shows a plot of average cell size and average cell count versus average cell circularity and reveals an inverse relationship between the average cell size and the circularity and an inverse relationship between the average cell size and the number of cells.

Example 7

An MFIM process was used to mold an LDPE composite sphere (92 wt. % polymer, 5 wt. % talc, and 3 wt. % Hydrocerol® BIH 70) with a diameter of three inches (7.62 cm) and the resulting foam cell structure detailed in FIGS. 15-18. Molding conditions are provided in TABLE 23. The part was molded on an Engel Victory 340 Ton injection molding press in a custom designed, water cooled aluminum mold. The volume of the mold cavity was 15.38 in$^3$ (252 cc), the shot size was 5 in$^3$ (82 cc), and the decompression volume in the barrel was 5 in$^3$ (82 cc). The decompression time was 77 seconds. The molded part weight was 80.31 g, yielding a final part density of 0.32 g/cc.

TABLE 23

Machine Setpoints and Mold Details

| | |
|---|---|
| Pack Volume Time (sec) | 0.00 |
| Pack Volume Speed (cm/sec) | 0.00 |
| Hold Press (kPa) | 0.00 |
| Hold Time (sec) | 0.00 |
| Cushion (cm) | 0.00 |
| Cooling Time (sec) | 120.00 |
| Sprue Break (cm) | 2.54 (Stack) |
| Sprue Volume (cc) | 18 |
| Mold Cavity Volume (cc) | 252 |
| Barrel Temperatures (° C.) | 180\|174\|166\|160 |
| Mold Temperature (° C.) | 13 |
| Injection Speed (cm/sec) | 51 |
| Back Pressure (kPa) | 689.5 |
| Screw Speed (cm/sec) | 30.5 |
| Screw Rotate Delay Time (sec) | 40 |
| Fill Time (sec) | 2.38 |
| Clamp Force (kN) | 98 |

After removal from the mold, the part was aged in ambient conditions for 24 hours, then scored and submerged in liquid nitrogen for two minutes. After removal from the liquid nitrogen, the sphere was fractured along the scored surface line and the fracture surface was imaged using an environmental scanning electron microscope (ESEM) (FEI Quanta FEG 650). The images shown in FIGS. 15-18 are micrographs at various magnifications taken of the fracture surface of the sphere part using a large field detector, 5.0 kV and 40 Pa of pressure.

Figure 15:
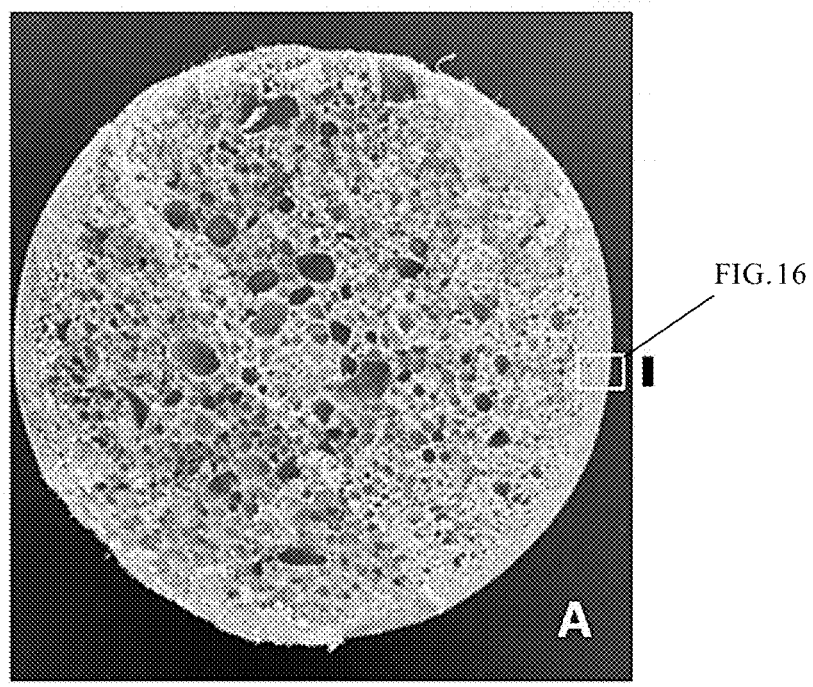
FIG. 15 is a micrograph of a fracture surface of a fractured three-inch diameter composite sphere made according to an MFIM process, as described in Example 7.
Figure 16:
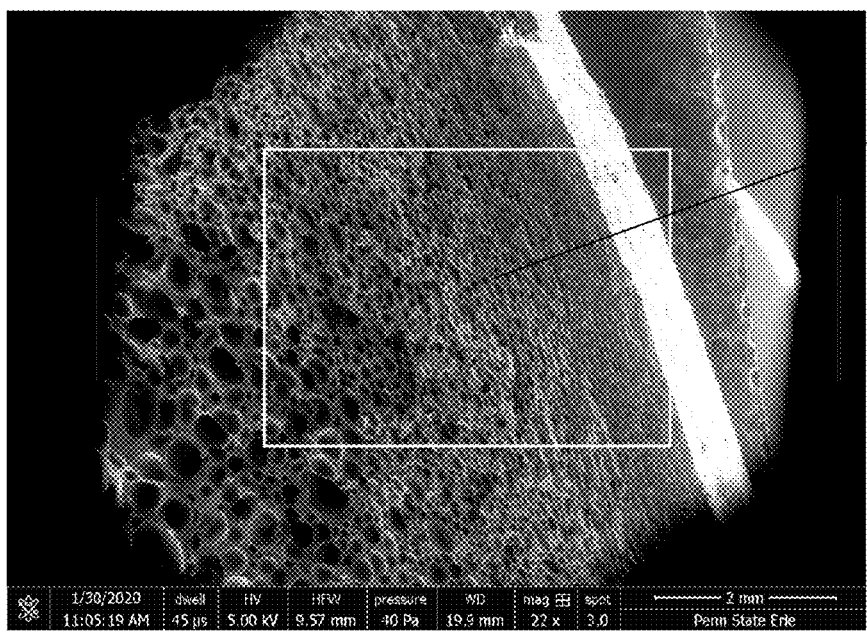
FIG. 16 is an image a micrograph of a fracture surface of a fractured three-inch diameter composite sphere made according to an MFIM process, as described in Example 7.

The white box in FIG. 15 indicates the area detailed in FIG. 16. The white box in FIG. 16 indicates the area detailed in FIG. 17.

In FIG. 17, the cells to the left of the image are larger and relatively spherical, whereas those cells to the right side of the photograph appear progressively flattened as they approach the surface of the sphere.

The image in FIG. 18 details the area indicated by the white box in FIG. 17. As seen in FIG. 18, there is a gradual transition from spherical to "flattened" or compressed cells moving towards the surface of the part.

Example 8

To establish the baseline differences between parts of standard thickness manufactured under standard foam molding conditions, a recently published study of standard foam injection molding (Paultkiewicz et al., *Cellular Polymers* 39, 3-30 (2020)) was used to establish a molding parameter baseline using a 16-run statistical analysis designed experimental (DOE) approach. Material (standard molding grade polypropylene with 0 wt %, 10 wt %, and 20 wt. % talc; and 0 wt %, 1 wt %, and 2 wt % of Hydrocerol® BIH 70 (foaming agent)) was compounded to specifications outlined in the publication in order to closely mimic the baseline study. The study was designed to investigate the influence of foaming agent concentration, talc content, and process conditions on selected properties of injection molded foam parts. A standard ISO tensile bar mold having cavity dimensions of 4.1 mm in thickness, 10 mm width in the gauge length, and 170 mm in length was used. No special venting was developed for the ISO bar mold. After ensuring that the injection molding machine, material formulations, and process window were able to replicate results published by Paultkiewicz et al., a second study was carried out using process variables specific to MFIM, specifically decompression volume and decompression time, while pressure and holding time (important variables in the published study) were set to a constant value of zero kN and zero seconds respectively.

The molding was completed using an Engel Victory 340 Ton machine equipped with water cooling. The constant and variable process conditions that were used are shown in TABLE 24 for both the "standard" foam molding process and the MFIM molding process.

TABLE 24

Constant Machine Setpoints and Mold Details

|  | Standard Molding | MFIM Molding |
|---|---|---|
| Variable Settings | | |
| Designed Experiment Variable | Low/Med/High levels | |
| Foaming agent content (ba) (wt %) | 0/1/2 | 0/1/2 |
| Talc content (ta) (wt %) | 0/10/20 | 0/10/20 |
| Injection Velocity (cc/sec) | 34.4/54.6/74.6 | 34.4/54.6/74.6 |
| Hold Pressure (kPa) | 75840/19995 | 0 |
| Hold time (sec) | 2/20 | 0 |
| Decompression Volume (cc) | — | 0/7.4/14.7 |
| Decompression Time (sec) | — | 15 |
| Constant Settings | | |
| Cooling Time (sec) | 20 | |
| Mold Temp (° C.) | 20 | |
| Injection Temp (° C.) | 210 | |
| Specific Backpressure (kPa) | 6895 | |
| Cooling Time (sec) | 20.00 | |
| Barrel Temperatures (° C.) | 210/210/210/177/163/149/38 | |
| Shot size (in$^3$) | 44.2 | 29.5 |

The designed study required 16 combinations of processing conditions/polymer formulation (16 runs) for each of the standard molding and MFIM molding studies. Multiple replicates were conducted of each run, producing replicate parts for each run. TABLE 25 outlines the variation between runs in both the standard and MFIM designed runs. The runs were conducted in a random order to avoid bias. The L/T ratio for the ISO tensile bar is 40.5.

TABLE 25

| Molten Foam Injection Molding Process | | | | Standard Foam Molding Process | | | |
|---|---|---|---|---|---|---|---|
| Run # | Decompression volume (cc) | Foaming agent (%) | Talc loading (wt %) | Run # | Hold pressure (kPa) | Foaming agent (%) | Talc loading (wt %) |
| 1 | 0 | 0 | 0 | 1 | 75842 | 0 | 0 |
| 2 | 14.7 | 0 | 0 | 2 | 75842 | 0 | 0 |
| 3 | 0 | 0 | 20 | 3 | 75842 | 0 | 20 |
| 4 | 14.7 | 0 | 20 | 4 | 75842 | 0 | 20 |
| 5 | 7.4 | 0 | 10 | 5 | 75842 | 0 | 10 |
| 6 | 7.4 | 1 | 0 | 6 | 19995 | 1 | 0 |
| 7 | 7.4 | 1 | 20 | 7 | 19995 | 1 | 20 |
| 8 | 0 | 1 | 10 | 8 | 19995 | 1 | 10 |
| 9 | 14.7 | 1 | 10 | 9 | 19995 | 1 | 10 |
| 10 | 7.4 | 1 | 10 | 10 | 19995 | 1 | 10 |
| 11 | 7.4 | 1 | 10 | 11 | 19995 | 1 | 10 |
| 12 | 0 | 2 | 0 | 12 | 19995 | 2 | 0 |
| 13 | 14.7 | 2 | 0 | 13 | 19995 | 2 | 0 |
| 14 | 0 | 2 | 20 | 14 | 19995 | 2 | 20 |
| 15 | 14.7 | 2 | 20 | 15 | 19995 | 2 | 20 |
| 16 | 7.4 | 2 | 20 | 16 | 19995 | 2 | 10 |

Figure 19:
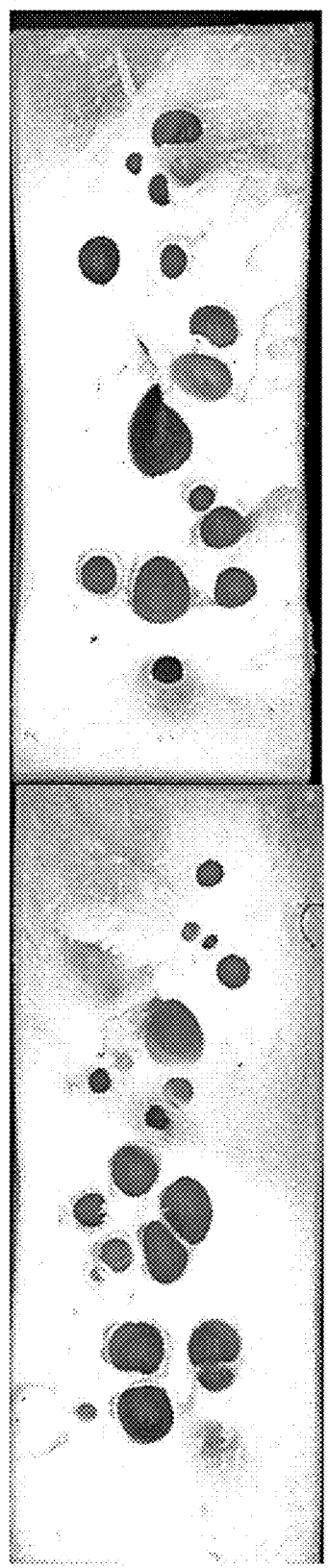
FIG. 19 shows micrograph images of cross sections from ISO bar parts made according to standard foam molding process runs 10, 11, 14, and 15, as described in Example 8.
Figure 19:
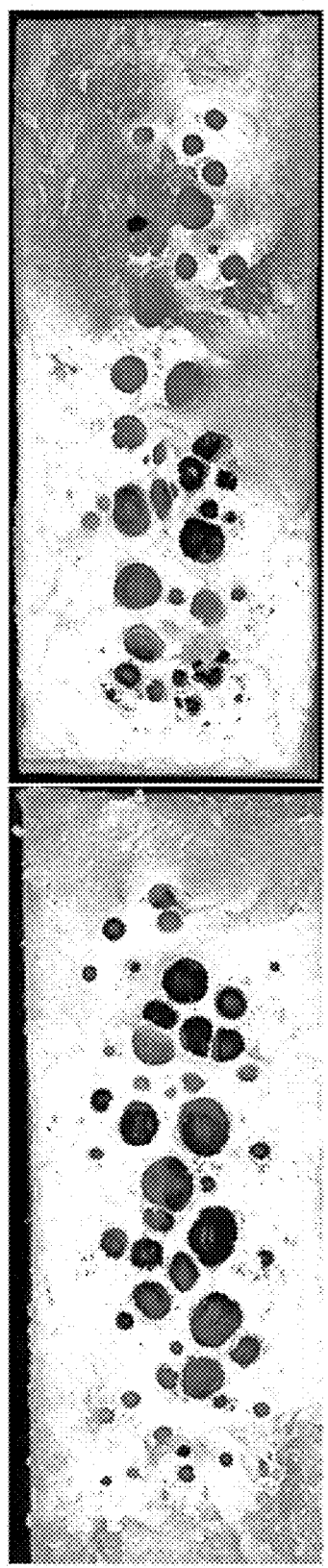
Figure 20:
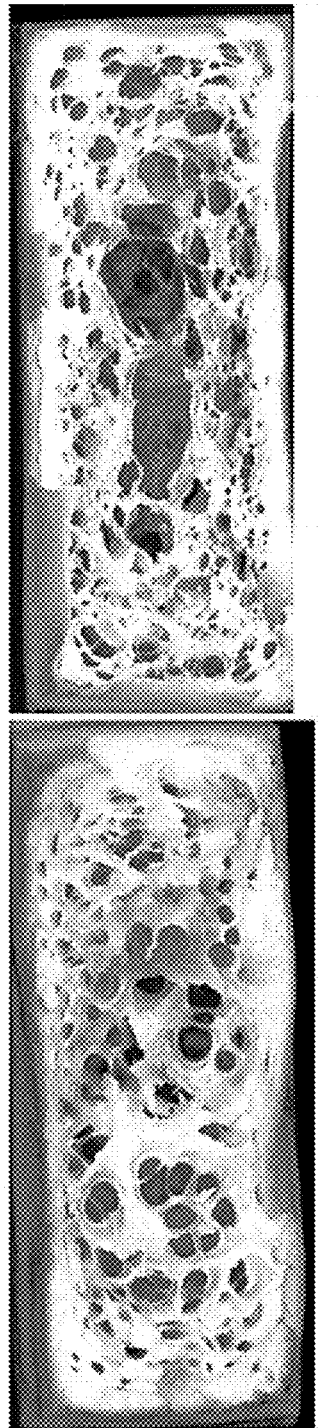
FIG. 20 shows micrograph images of cross sections from ISO bar parts made according to MFIM process runs 9, 10, 15, and 16, as described in Example 8.
Figure 20:
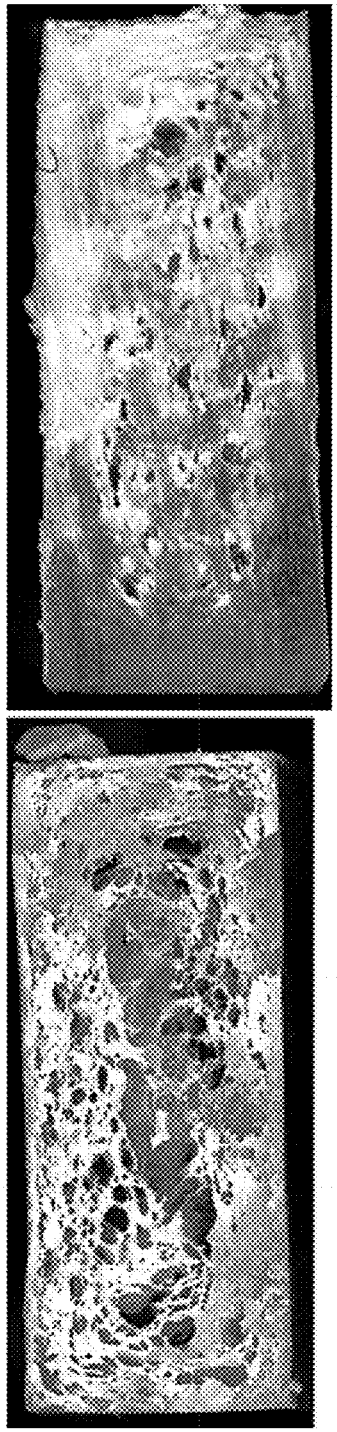

After molding 32 unique process combinations of the two 16-run DOE studies, five samples of each series were mechanically tested for tensile strength and the fracture surface imaged after fracture. A representative selection of ISO bar cross sections from Runs 10, 11, 14, and 15 of the standard foam molding process are shown in FIG. 19 and a representative selection of ISO bar cross-sections from Runs 9, 10, 15, and 16 of the MFIM process are shown in FIG. 20.

Differences between the standard foam molding technique as adopted from recent literature and the MFIM process are apparent when examining the cross-section images. The structure in the standard process bars consist of relatively few, but well defined, spherical cells flanked on all sides by a thick region of polymer lacking cells. The cross-section images obtained from the standard foam molding process are in good agreement with those in the publication by Paultkiewicz et al. and are representative of the current industry standard. In contrast, the typical cross sections of the MFIM molded ISO bars display a cell structure with more asymmetric, deformed cells.

The cells in the MFIM cross-section also proceed to the region adjacent to the surface in almost all cases, similar to previous examples described herein, and despite being a much thinner part with a much larger L/T ratio (40.5) than previously described. The results clearly indicate that the adoption of the decompression step in MFIM, in combination with eliminating the standard foam molding process variables of hold pressure and time, results in a significantly different cell structure in molded parts.

Figure 21:
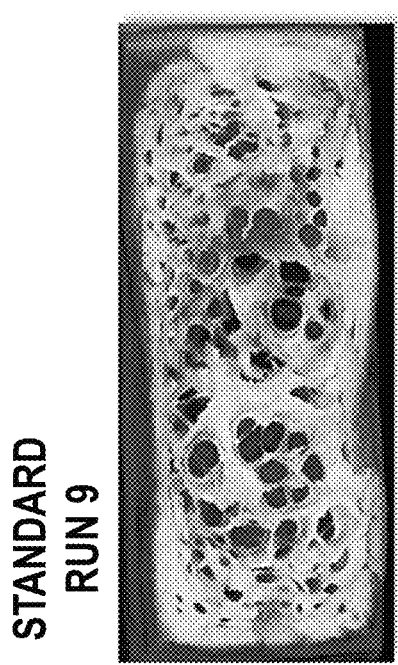
FIG. 21 shows a micrograph of a cross section of an ISO bar part made according to the MFIM process of Run 9 and stress-strain plots of replicate parts made according to the MFIM process of Run 9, as described in Example 8.
Figure 21:
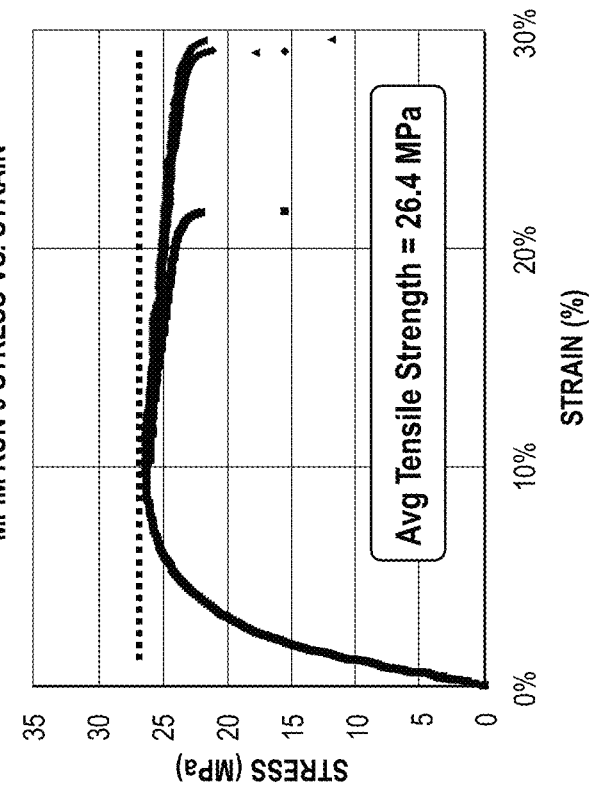

Tensile tests of five replicate parts from MFIM Run 9 were run. FIG. 21 shows a representative cross section and a series of stress/strain plots for the five parts tested from MFIM Run 9.

Figure 22:
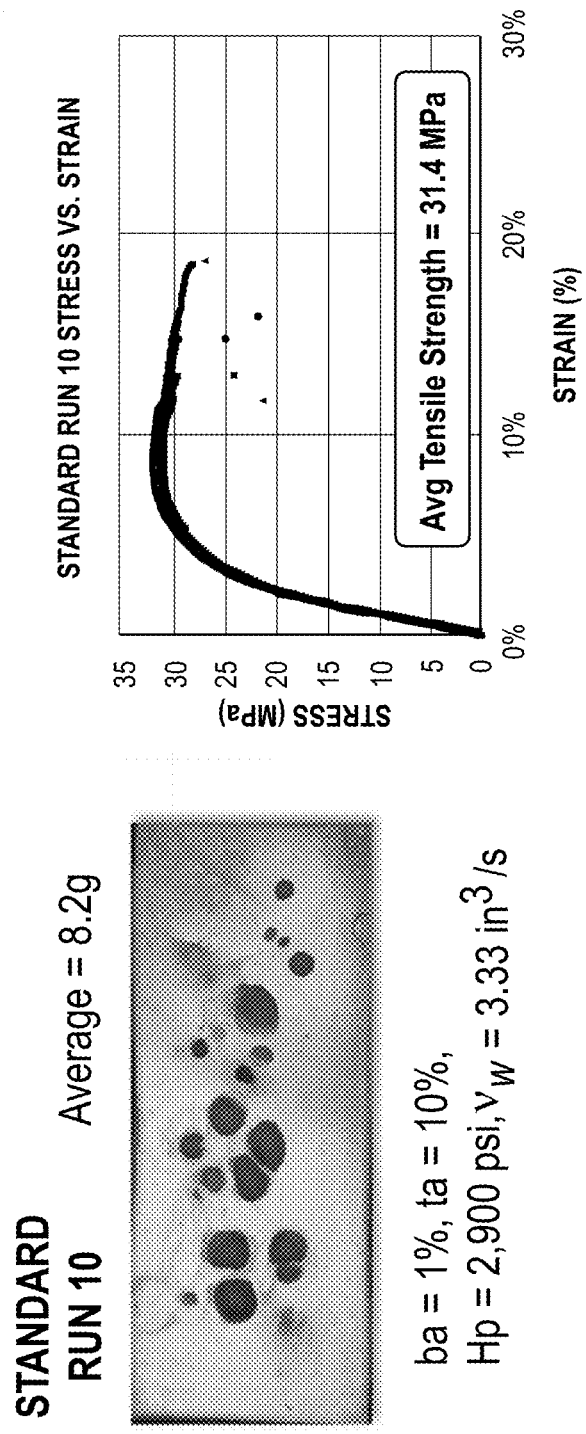
FIG. 22 includes a micrograph of a cross section of an ISO bar part made according to the standard foam molding process of Run 10 and stress-strain plots of replicate parts made according to the standard foam molding process of Run 10, as described in Example 8.

Tensile tests of five replicate parts from Run 10 made using the standard foam molding process were run. FIG. 22 shows a representative cross section and a series of stress/strain plots for the five parts tested from standard foam process Run 10.

The average tensile strength of the five parts from MFIM Run 9 was less than that of the average of the five parts from standard foam molding process Run 10. However, the MFIM parts showed a greater strain (elongation) at break.

More cells were visible in the cross section of the MFIM part from Run 9 (102 cells) than in the standard foam molding process part from Run 10 (19 cells).

Figure 23:
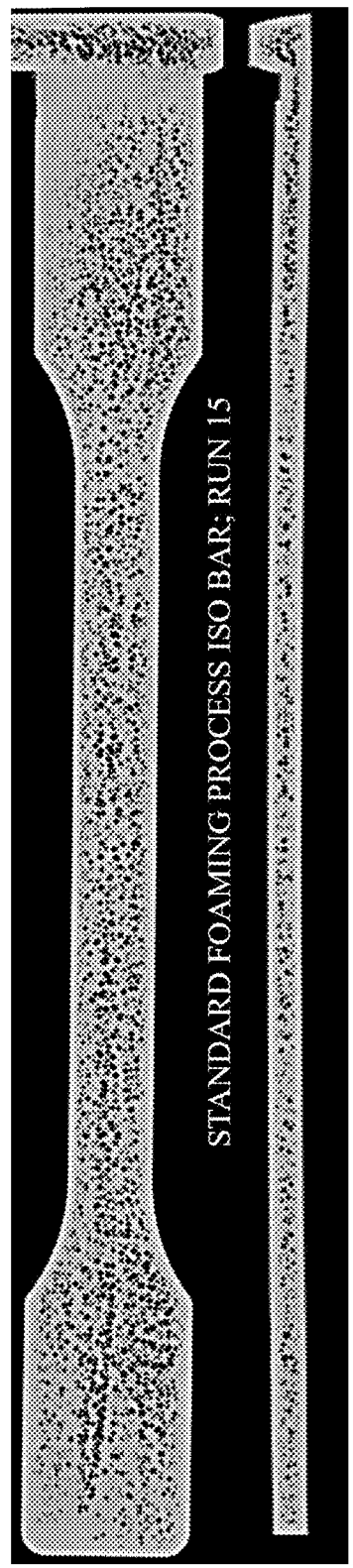
FIG. 23 includes two images from X-ray tomography of an ISO bar part made according to the standard foam molding process of Run 15, as described in Example 8.
Figure 24:
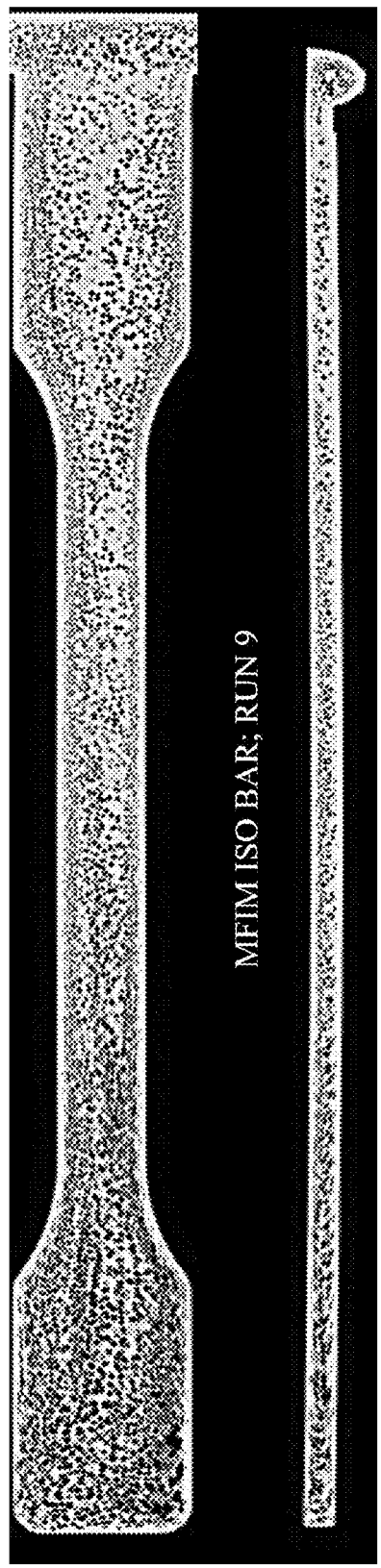
FIG. 24 includes two images from X-ray tomography of an ISO bar part made according to the MFIM process of Run 9, as described in Example 8.

X-ray tomography scans (completed under conditions described in Example 5) were completed for a randomly selected replicate part from Run 15 of the standard foam molding process (shown in FIG. 23) and for a randomly selected replicate part produced during Run 9 of the MFIM process (shown in FIG. 24). Both FIG. 23 and FIG. 24 show a "top" view, taken at 50% depth and a "side" view, also taken at 50% depth.

In the developed cell structure of the standard foam molding process ISO bar (FIG. 23), cells were circular in shape and the regions adjacent to the surface of the bar lacked cells.

In contrast, the ISO bar produced via the MFIM process as shown in FIG. 24 includes a high population of elongated cells and cells are found in the region adjacent to the surface of the part.

Example 9

To explore the dependence of final cell structure on MFIM processing conditions, eight tensile bars of LDPE were molded using the MFIM process on an Engel Victory 340 Ton injection molding machine. The mold included an aluminum material modified tensile bar cavity having dimensions of 24 cm in length, a thickness of 2.54 cm, and a variable width with gauge length of 6 cm and a gauge width of 2.54 cm tapering to flanges of 3.5 cm in width. The large tensile bar was fed from a cold sprue and runner system through a gate 1.0 cm in diameter. The material formulations consisted of LDPE with or without talc, always containing 2 wt % foaming agent Clariant Hydrocerol® BIH 70. The melt temperature was set to the profile detailed in TABLE 26, and residence time in the barrel was 13 minutes before building a shot for injection. After building the shot, the screw was retracted to give a decompression volume of either 4.0 cubic inches (66 cc) or 6.0 cubic inches (98 cc) and the LDPE foaming agent mixture was allowed to foam for either 15 or 45 seconds into the empty barrel space prior to injection. The study was completed for both unfilled LDPE and 15% talc filled LDPE. Detailed process conditions are shown in TABLE 26.

TABLE 26

Constant Machine Setpoints and Mold Details for MFIM of Large Test Bar

| Designed Experiment Variable | Low /High levels |
| --- | --- |
| Talc Content (wt %) | 0/15 |
| Decompression Volume (dv) (cc) | 66/98 |
| Decompression Time (dt) (sec) | 15/45 |
| Constant Settings | |
| Foaming Agent Content (wt %) | 2 |
| Cooling Time (sec) | 60 |
| Mold Temp (° C.) | 10 |
| Injection Temp (° C.) | 182 |
| Injection Velocity (cc/sec) | 328 |
| Specific Back Pressure (kPa) | 6895 |
| Cooling Time (sec) | 60.0 |
| Barrel Temperatures (° C.) | 210/210/210/177/163/149/38 |
| Shot Size (cc) | 98 |
| Clamp Force (kN) | 89 |

Figure 25:
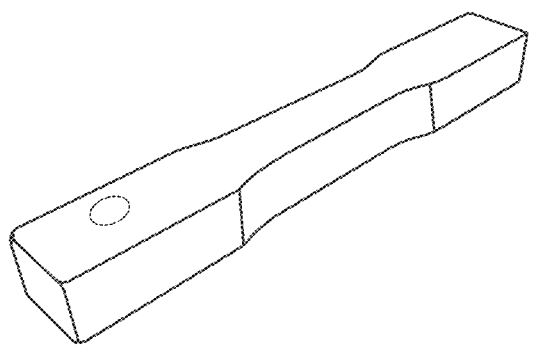
FIG. 25 is a line drawing of an image from an X-ray scan of a large tensile bar part made according to an MFIM process, as described in Example 9.

FIG. 25 is a line drawing of an X-ray scan of one of the parts from this study, showing the overall shape of each part.

Figure 26:
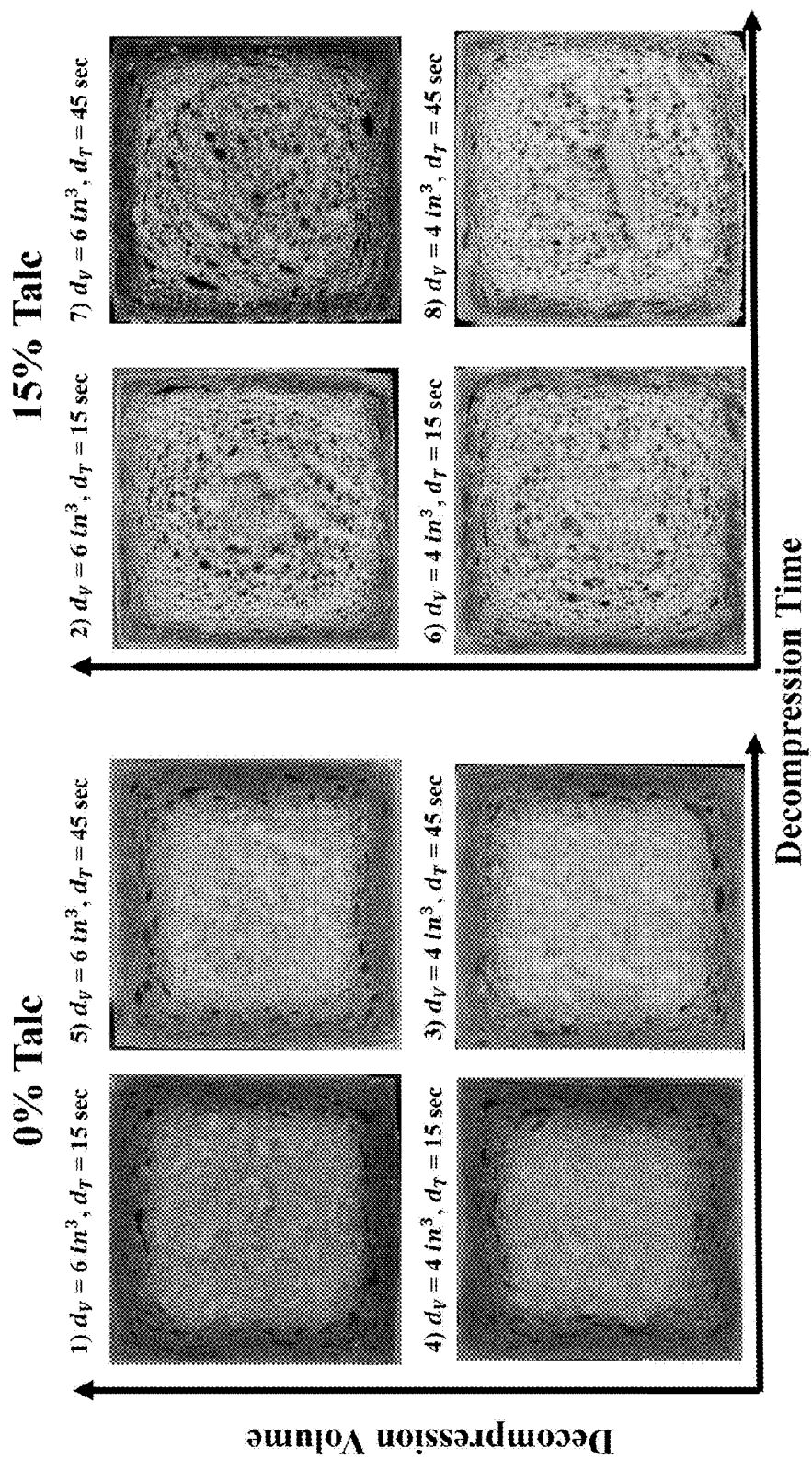
FIG. 26 includes cross sections of eight large tensile bar parts made according to MFIM processes, as described in Example 9.

FIG. 26 depicts a cross section of each test bar molded in the study, cut from the middle of the gauge length, with the variable parameters indicated. The sample set includes two primary groups: samples made with talc and samples made without talc. In FIG. 26, the sample set on the left depicts those parts made without talc. These parts display a smaller cell structure in the core of the part, and the integrity of the developed cell structure is largely unaffected by the changes in decompression ratio and decompression time, indicating the decompression ratios and times were all within an acceptable range.

The sample set on the right depicts those bars containing 15 wt % talc. Some smearing on the part surfaces resulted from knife damage on the low-modulus LDPE and is not representative of part quality. The cell structure in the talc parts was consistently larger, and the circularity of the cells was slightly lower than the talc-free equivalents.

Figure 27:
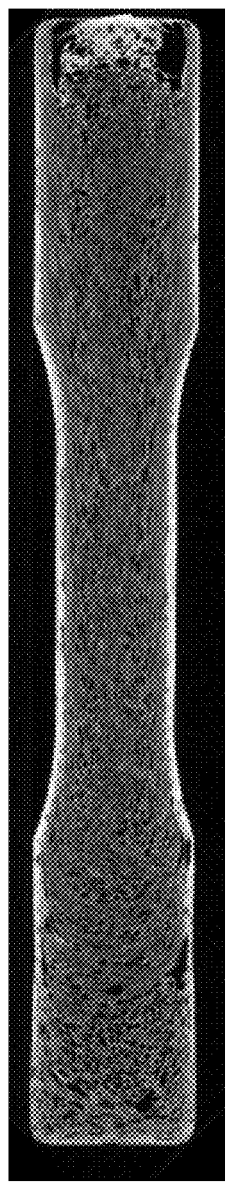
FIG. 27 is an X-ray tomography image of a large tensile bar part made according to an MFIM process, as described in Example 9.

An X-ray tomography image was taken of a cross section from the major surface about 50% into the MFIM part made with 15% talc, 6 in$^3$ (98 cc) decompression volume, and 15 seconds decompression time. The image is shown in FIG. 27.

Example 10

Figure 28:
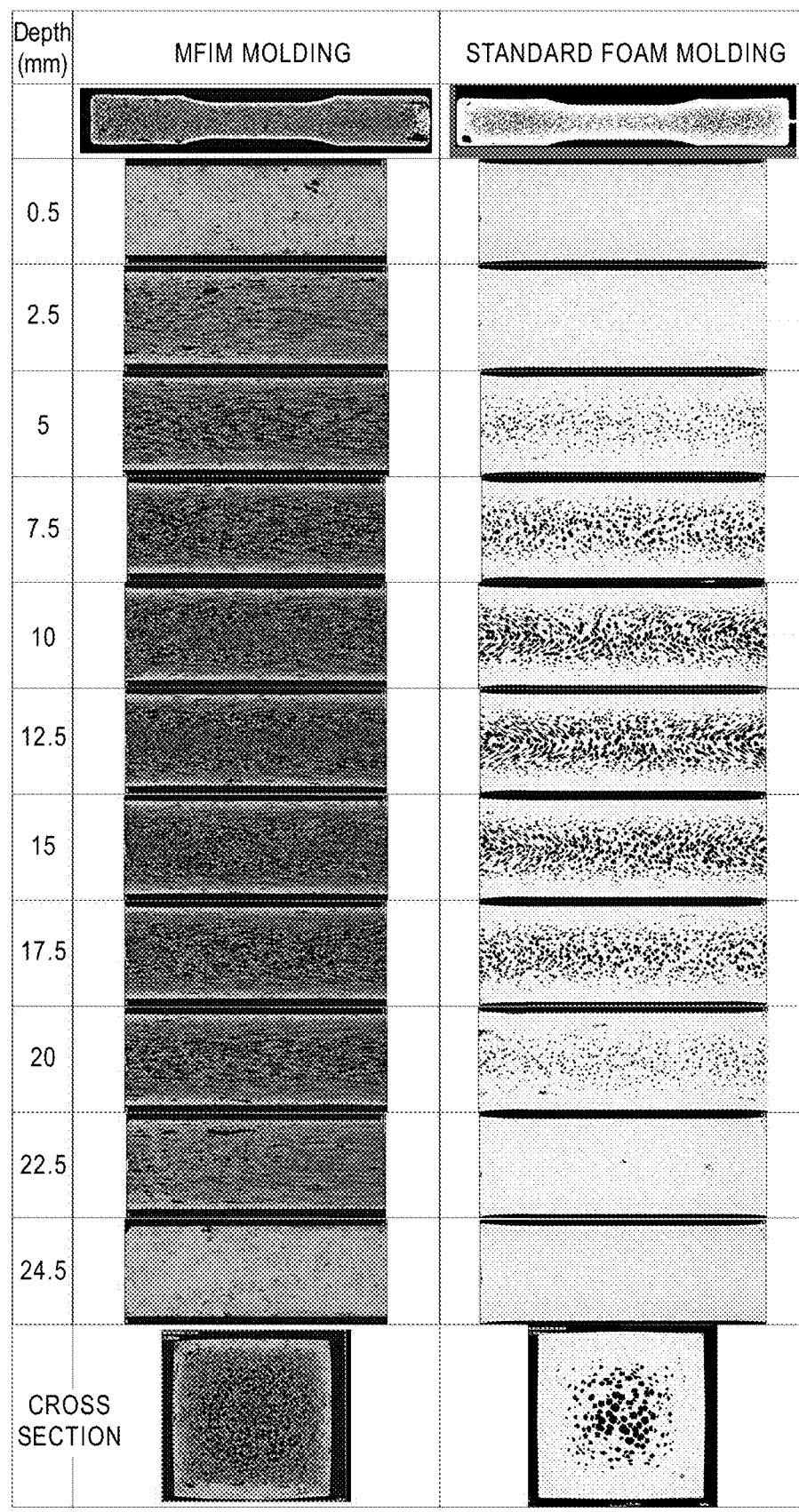
FIG. 28 includes a series of X-ray tomographic images at different depths within a tensile bar part made according to an MFIM process and a series of images at different depths within a tensile bar part made according to a standard foam molding process, as described in Example 10.

A tensile bar part was made using a standard foam molding process from LDPE loaded with 15 wt % talc, and 2 wt % Hydrocerol® BIH 70 using processing parameters as described for Example 9, but without the decompression step of the MFIM process. This standard foam molding part was compared with the MFIM part made with 15% talc, 6 in$^3$ (98 cc) decompression volume, and 15 seconds decompression time from Example 9. Using methods as described in Example 6, X-ray tomography images were taken of a central portion of each of the parts (MFIM molding and standard foam molding) at a variety of depths from a major surface. Cross section images were also recorded. The images are shown in FIG. 28.

X-ray tomographic analysis of cell count, cell circularity, and average cell size (longest dimension of cell) was performed on the images of each tensile bar part (MFIM and standard process materials) at each depth from the major surface. Cell count, cell circularity, and average cell size were each plotted against depth of the cross section; and the respective plots are shown in FIGS. 29-31 respectively.

Figure 29:
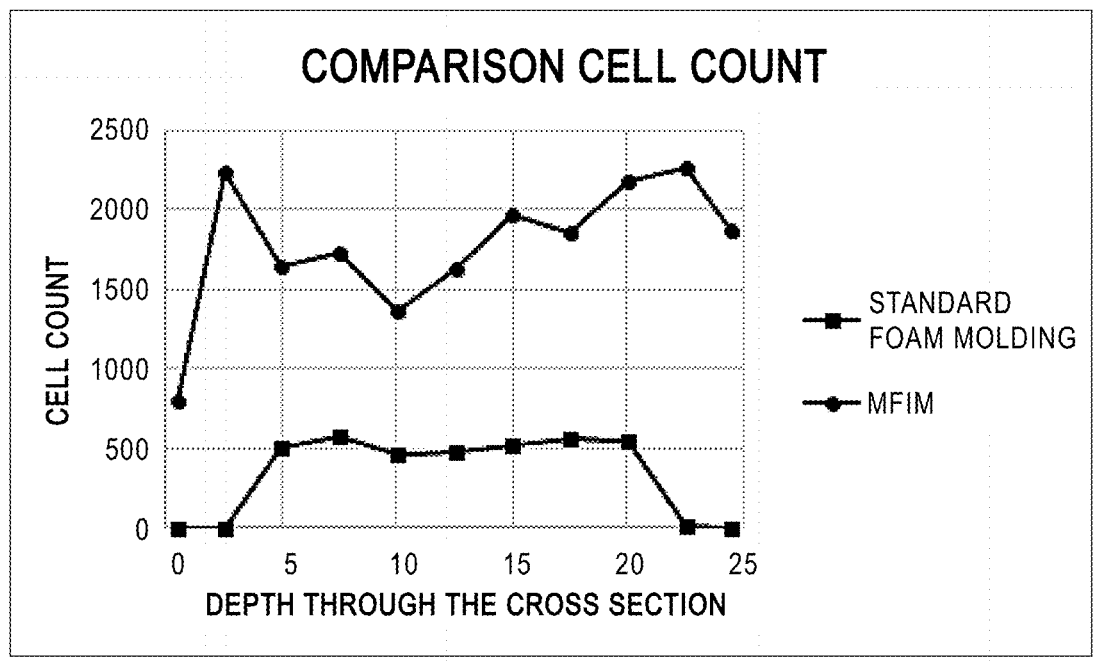
FIG. 29 is a graph including a plot of cell count versus depth for the tensile bar part made according to an MFIM process and a plot of cell count versus depth for the tensile bar part made according to a standard foam molding process, as described in Example 10.

As shown in FIG. 29, cell count was higher in the MFIM molded part at all depths. As seen throughout the Examples and Figures, the part molded using the standard foam molding process appears to have no or substantially no cells in the region or "skin" adjacent to the surface, e.g. in about the first 2.5 mm of depth from the major surface, whereas cells are present in the part molded using the MFIM process within the region between about 2.5 mm below the surface and the surface.

Figure 30:
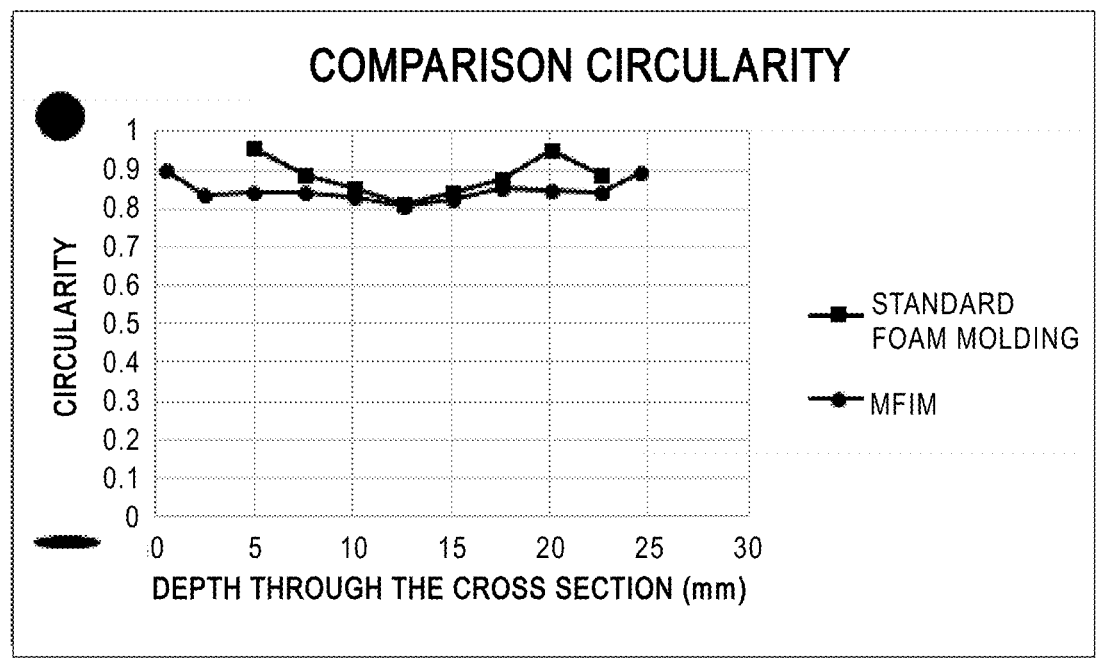
FIG. 30 is a graph including a plot of cell circularity versus depth for the tensile bar part made according to an MFIM process and a plot of cell circularity versus depth for the tensile bar part made according to a standard foam molding process, as described in Example 10.

As shown in FIG. 30, in general cell circularity was greater in the standard foam molding process sample than in the MFIM-molded part except towards the middle of the MFIM part, where circularity was also high in the MFIM molded sample.

Figure 31:
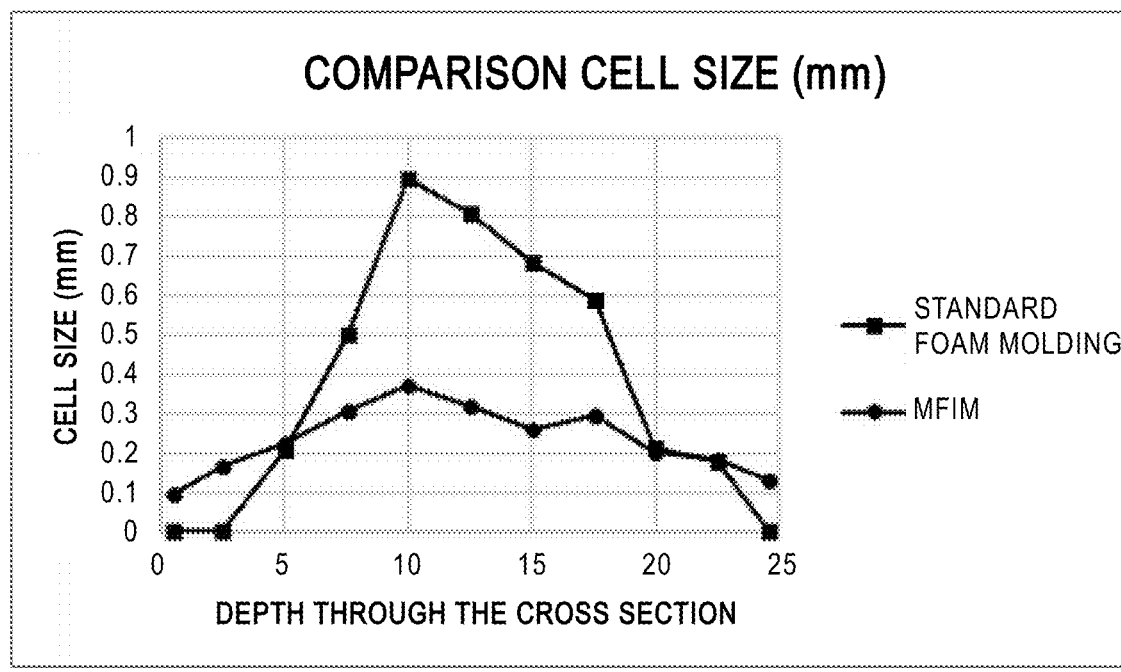
FIG. 31 is a graph including a plot of cell size versus depth for the tensile bar part made according to an MFIM process and a plot of cell size versus depth for the tensile bar part made according to a standard foam molding process, as described in Example 10.

As shown in FIG. 31, cell size was generally larger for the standard foam molded tensile bar part, but fell off rapidly to zero in the regions proximal the outer surfaces (e.g. within 2.5 mm of the surface). In contrast, cell size was more uniform through the depth of the MFIM-molded part, and cells continued right to the surface.

The same trends are seen by visual examination of the cross sections shown in FIG. 28. Within 2.5 mm of any outer surface, the standard foam molded part appears to lack cells, whereas cells are visible up to the outer surface in the MFIM part.

Example 11

A large sample of recovered ocean plastic was analyzed using differential scanning calorimetry and was estimated to consist of approximately 85 wt % of HDPE, with the balance comprising polypropylene and contaminants.

Two parts were successfully molded from the ocean plastic using an MFIM process, a 4"×4"×2" brick and a sphere of 15.24 cm diameter. Molding was conducted using an Engel Duo 550 Ton injection molding machine (available from Engel Machinery Inc. of York, Pa., USA). Both parts were center-gated and filled by a viscous coil-folding flow.

Processing parameters and characteristics of the resulting part are listed in TABLE 27 and TABLE 28 respectively:

TABLE 27

|  | 6" Sphere | 4" × 4" × 2" Brick |
|---|---|---|
| Material | Ocean Plastic | Ocean Plastic |
| Machine | Engel Duo 550 Ton | Engel Duo 550 Ton |
| Decompression volume (cc) | 819 | 295 |
| Decompression time (sec) | 340 | 60 |
| Foaming agent BIH 70 (wt %) | 3 | 3 |
| Cooling Time (sec) | 400 | 120 |
| Mold Temp (° C.) | 35 | 38 |
| Injection Temp (° C.) | 204 | 204 |
| Injection Velocity (cc/sec) | 655 | 787 |
| Specific Back Pressure (kPa) | 6895 | 13790 |
| Barrel Temperatures (° C.) | 204/191/177 /163 /149/107/54 | |
| Shot size (cc) | 1229 | 279 |
| Clamp Force (kN) | 445 | 445 |
| Hold Time (s) | 0 | 0 |
| Hold Pressure (kPa) | 0 | 0 |

TABLE 28

| Part Characteristics | 6" Sphere | Brick |
|---|---|---|
| Part Weight (g) | 921.6 | 253.2 |
| Volume (without runner) (cc) | 1856 | 524.3 |
| Part Density (g/cc) | 0.496 | 0.482 |

Example 12

A sphere of nine inches (22.86 cm) in diameter, "Sample 10", was molded using the MFIM process described herein. Further, a second sphere of nine inches (22.86 cm) in diameter, Sample 20, was molded using a variant process. The variant process, termed herein "reverse MFIM" process was as follows:

A) A mixture was prepared by blending a polymer (which may be in the form of pellets, powder, beads, granules, and the like) with a chemical foaming agent, and any other additives such as a filler. The mixture was introduced to the injection unit, and the rotating injection unit screw moved the material forward in the injection molding machine barrel, thus forming a heated fluid material in accordance with normal injection molding processes. B) The screw was moved backwards towards the hopper, creating an intentional space between the screw and the nozzle within the barrel. C) A set volume of the material was dosed to the front of the barrel of the injection unit by rotation of the screw, thus moving the set volume from the feed zone to the front of the screw and into the intentional space created in step B. During this feed step, the screw was rotated to move melted material to the space in the barrel between the screw and the nozzle, thereby providing the set volume. However, the set volume occupied only part of the intentional space, thereby providing volume for the shot to foam and expand, the decompression volume. D) The material sat in the barrel between the screw and the nozzle for a period of time, termed herein the "decompression time". During the decompression time, the material expanded due to foaming to fill or partially fill the space created in step (B). E) The molten foam was injected into the mold cavity by forward translation of the screw and/or rotation of the screw.

Thus the regular and reverse MFIM processes differed from each other in that in the MFIM process, the screw was rotated to introduce the shot to the front of the barrel before the screw was translated backwards to allow for a decompression space; whereas in the reverse process the screw was translated backwards to allow for a decompression space before the screw was rotated to introduce the shot of material into the intentionally created space.

Sample 10 and Sample 20 were both molded of virgin LDPE containing 2% Hydrocerol® BIH 70, 2% talc, and 1% yellow colorant. Molding was carried out on the Engel Duo 550 Ton injection molding machine (available from Engel Machinery Inc. of York, Pa., USA). The mold was a spherical cavity within an aluminum mold fed by a cold runner and sprue.

The processing parameters are shown in TABLE 29:

TABLE 29

|  | Sample 10 | Sample 20 |
|---|---|---|
| Process Method | MFIM | Reverse MFIM |
| Shot Size (cc) | 1639 | 1762 |
| Decompression Volume (cc) | 1475 | 1475 |
| Batter (cc) | 3114 | 3236 |
| Shot to Decompression Volume Ratio | 10:9 | 10:9 |
| Cooling Time (sec) | 300 | 300 |
| Screw Rotation Delay Time (sec) | 140 | 140 |
| Metering Performance (cc/sec) | 32.8 | 32.8 |
| Decompression Speed (cc/sec) | 164 | 164 |
| Approximate Decompression Time (sec) | 101 | 106 |
| Clamp Force (kN) | 89 | 89 |
| Specific Back Pressure (kPa) | 6895 | 6895 |
| Injection Pressure (kPa) | 52476 | 53827 |
| Injection Speed (cc/sec) | 655 | 655 |
| Screw Speed (cm/sec) | 15.24 | 15.25 |
| Mold Temperature (° C.) | 10 | 10 |
| Shot Weight (g) | 1334 | 1335 |

The density of the parts, both Sample 10 and Sample 20, was 0.214 g/cc with a density reduction in both cases of 77%.

A photograph of Sample 20 is shown in FIG. 32 and of Sample 10 in FIG. 33, with each spherical part mounted on a stand. As can be seen in the Figures, Sample 20 made using the "reverse MFIM process" exhibited an uneven surface, whereas the surface of Sample 10 made using the MFIM process was much more even. Average wrinkle depth was estimated using optical microscopy and X-ray tomography. The average wrinkle depth was measured at less than 50 microns for Sample 10, but 565 microns for Sample 20.

Figure 34:
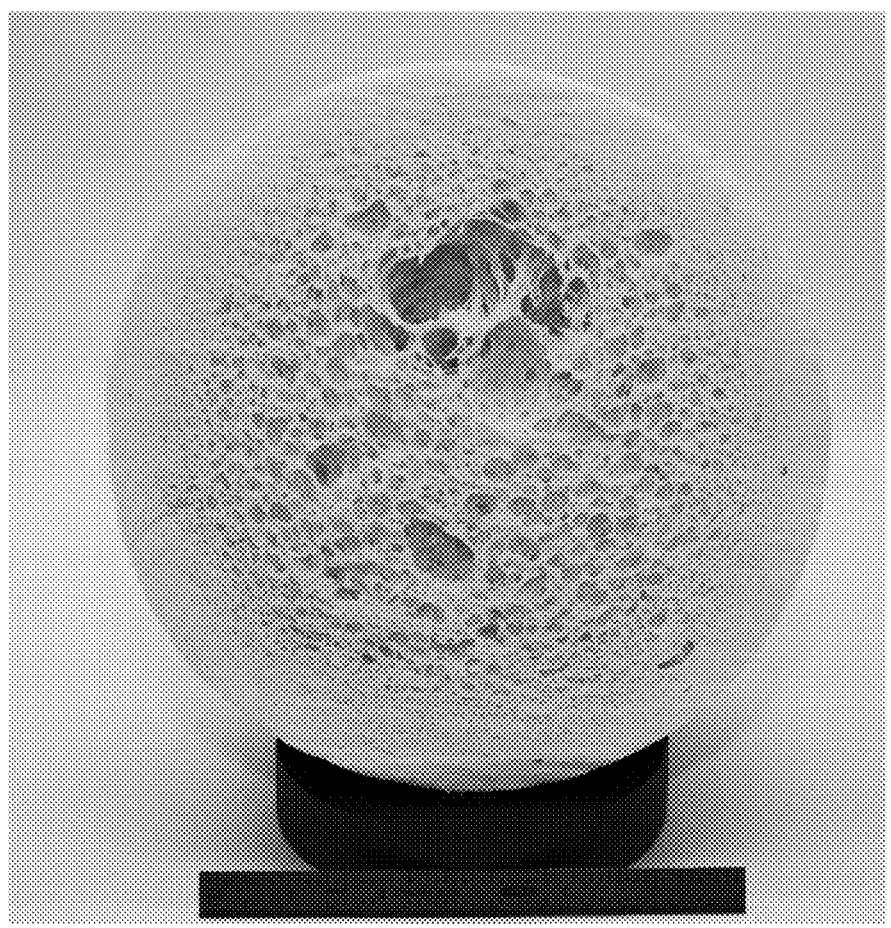
FIG. 34 is a photograph showing a cross section of Sample 20 made according to a reverse MFIM process, as described in Example 12.
Figure 35:
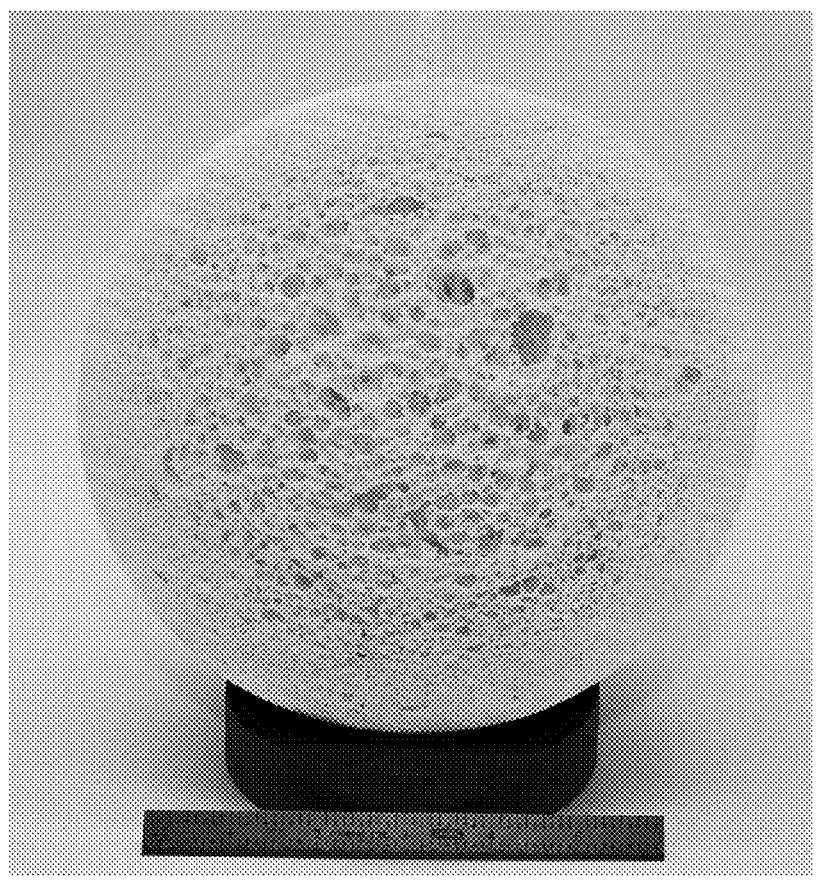
FIG. 35 is a photograph showing a cross section of Sample 10 made according to an MFIM process, as described in Example 12.

Each of Sample 10 and Sample 20 was cut into half to provide a cross section at the maximum diameter. The cross section of the four pieces was photographed. One half of Sample 20 made by the reverse MFIM method is shown in shown in FIG. 34 and one half of Sample 10 is shown in FIG. 35. Close examination of the edge showed that in Sample 10 and Sample 20, cells were found right up to the surface, e.g. within 2.5 mm of the surface, unlike parts produced elsewhere in the Examples by the standard foam method.

Figure 36:
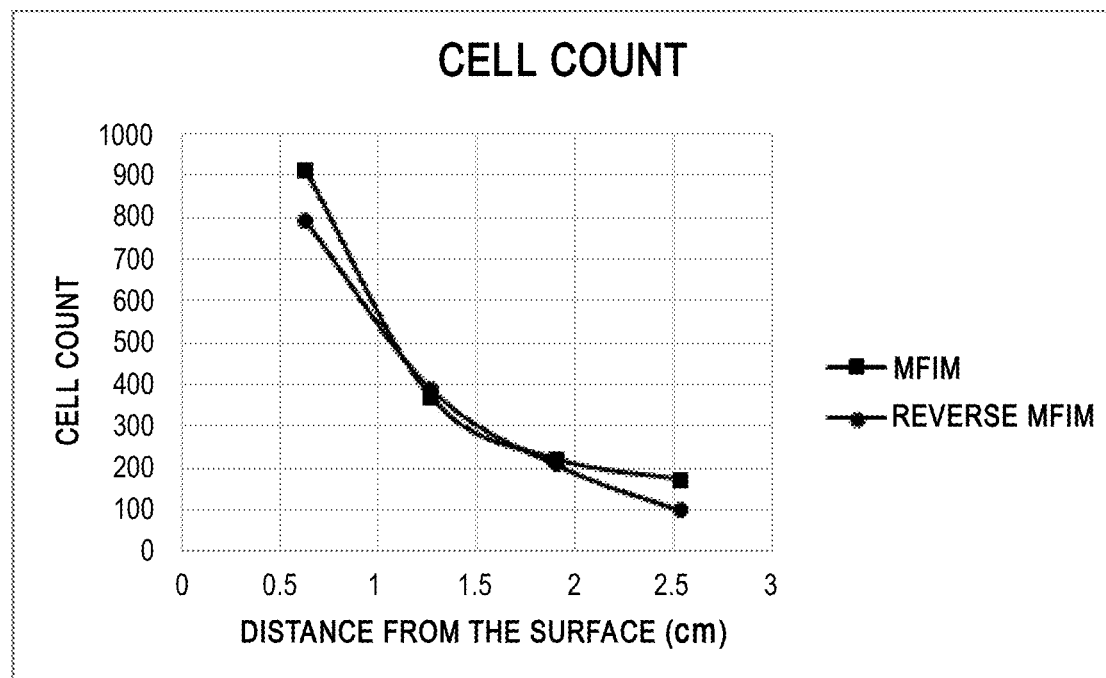
FIG. 36 is a plot of cell count versus depth (distance from surface) for Sample 10 (MFIM) and Sample 20 (Reverse MFIM) as described in Example 12.
Figure 37:
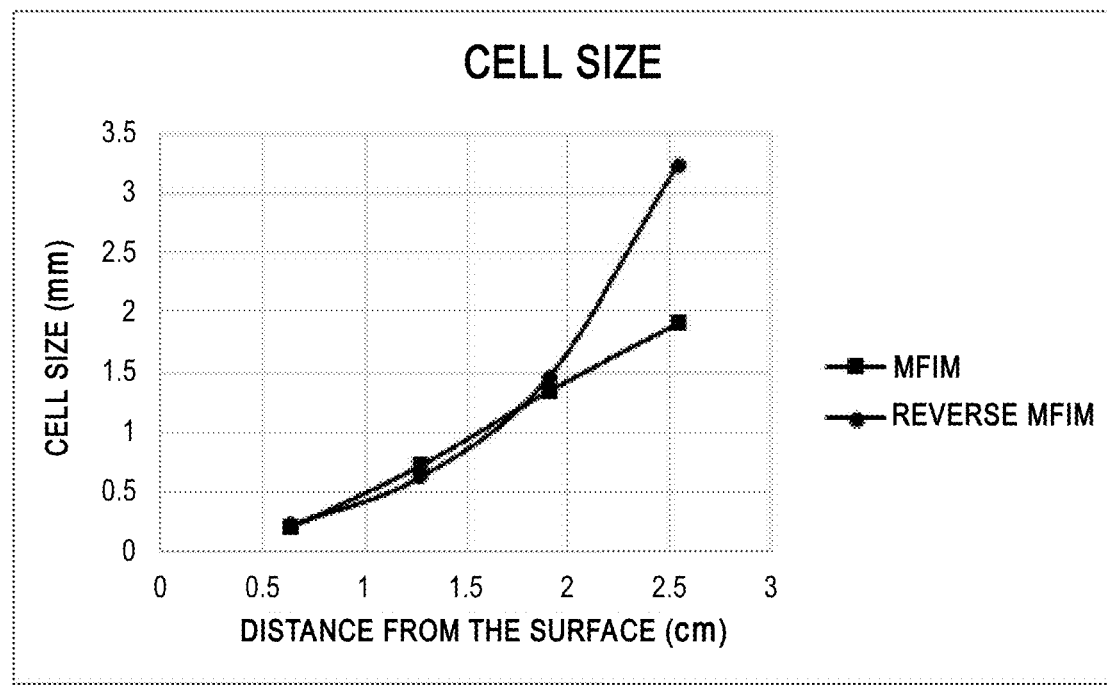
FIG. 37 is a plot of cell size versus depth (distance from surface) for Sample 10 (MFIM) and Sample 20 (Reverse MFIM) as described in Example 12.

X-ray tomography was performed on the first inch of depth of a sample of Sample 10 and of Sample 20, and using methods described for Example 6, cell count and cell size was measured for different distances from the surface of each sample. Plots are given in FIGS. 36 and 37, wherein "MFIM" refers to Sample 10 and "Reverse MFIM" refers to Sample 20.

Figure 38:
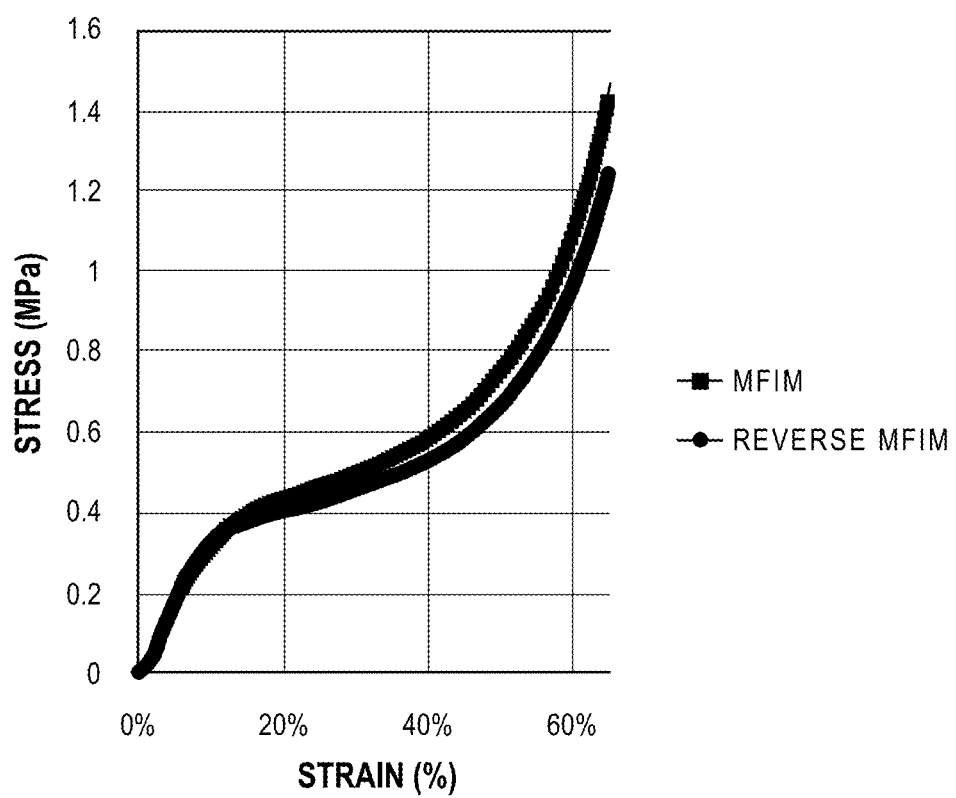
FIG. 38 is a graph including a plot of averaged stress versus strain for Sample 10 (MFIM) and a plot for Sample 20 (Reverse MFIM) from compression modulus measurements, as described in Example 12.

Two further sphere parts, Parts 6 and 7, were prepared under the same conditions and with the same polymer/talc/colorant/foaming agent mix as Sample 10, i.e. by the MFIM method. Five cuboid parts, each approximately 2 inches by 2 inches by 1 inch, were cut from each of Parts 6 and 7, and compression modulus (stress versus strain) was tested. The average stress versus the average strain (MFIM method) was plotted and is shown in FIG. 38.

Two further sphere parts, Parts 22 and 24, were prepared under the same conditions and with the same polymer/talc/colorant/foaming agent mix as Sample 20. Five cuboid parts, each approximately 2 inches by 2 inches by 1 inch (about 5.1 cm by 5.1 cm by 5.1 cm), were cut from each of Parts 22 and 24, and compression modulus (stress versus strain) was tested. The average stress versus the average strain (reverse MFIM method) was plotted and is also shown in FIG. 38. as seen in FIG. 38, the compression moduli of the parts made by the MFIM process (average of Parts 6 and 7) and the parts made by the reverse MFIM process (average of Parts 22 and 24) are similar.

Figure 39:
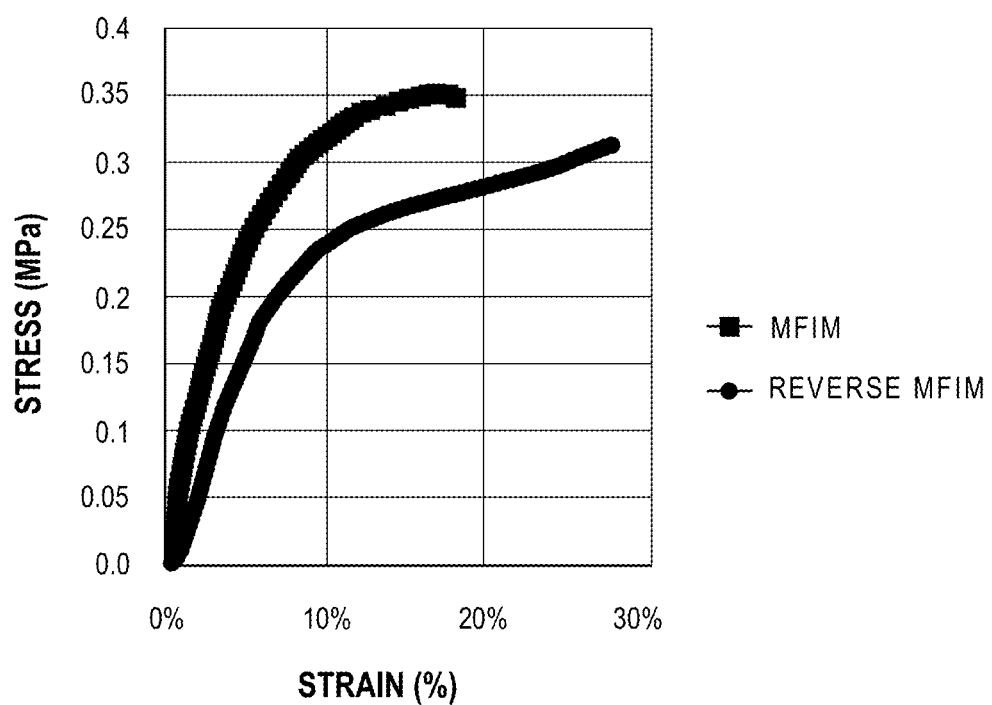
FIG. 39 is a graph including a plot of averaged stress versus strain for Sample 10 (MFIM) and a plot for Sample 20 (Reverse MFIM) from flexural modulus measurements, as described in Example 12.

Five strips were cut from each of Parts 6 and 7 (MFIM) and 22 and 24 (reverse MFIM). Each strip was approximately 1 inch by 1 inch by 8 inches. The flexural modulus (stress versus strain) was tested for all of the strips, and the results averaged for the ten MFIM-produced strips and the results averaged for the ten reverse MFIM strips. The results are plotted in FIG. 39.

Example 13

Parts were fabricated using MFIM methods as described herein, of various shapes and materials as shown in TABLE 30. The parts were cross sectioned. In all cases, a region proximal the surfaces included cells of lower size, but moving away from a surface, cell size increased. The region of reduced cell size closer to the surfaces transitioned to a larger cell size further from the surface. While the transition was gradual and so there was no a distinct layer of smaller size and a distinct layer of larger size, using microscopy the relative areas of the region of smaller or "compressed" cells and the region of larger cells was estimated by eye and confirmed by light microscopy, and is shown in TABLE 30. While the numbers are only estimates, examination of the images showed that the depth of the region and the percent area that was occupied by "compressed" cells varied widely, perhaps depending on part shape, material, and/or run conditions.

TABLE 30

| Material | Filler | Sphere diameter (inches) | Estimated Percent of Core | Estimated Percent of Compressed Zone |
|---|---|---|---|---|
| LDPE | — | 3 in Sphere | 91% | 9% |
| LDPE | 15% Talc | 3 in Sphere | 80% | 20% |
| Nylon 6 | 15% Talc | 3 in Sphere | 85% | 15% |
| LDPE | 15% Talc | 6 in Sphere | 87% | 13% |
| LDPE | — | 6 in Sphere | 85% | 15% |
| High-Impact Polystyrene | 15% Talc | 6 in Sphere | 85% | 15% |

| Material | Filler | Geometry (inches) | Estimated Percent of Core | Estimated Percent of Compressed Zone |
|---|---|---|---|---|
| Metallocene Polyethylene | — | 4 × 4 × 2 | 66% | 34% |
| High-Impact Polystyrene | 15% Talc | 4 × 4 × 2 | 53% | 47% |
| ABS | 20% Talc | 4 × 4 × 2 | 71% | 29% |

| Material | Filler | Geometry | Estimated Percent of Core | Estimated Percent of Compressed Zone |
|---|---|---|---|---|
| LDPE | — | Large Tensile Bar | 54% | 46% |
| LDPE | 15% Talc | Large Tensile Bar | 73% | 27% |
| Polypropylene | 10% Talc | ISO Tensile Bar | 65% | 35% |

Example 14

A first part was molded using a formulation of 98 wt. % metallocene polyethylene was blended with 2 wt. % Hydrocerol® BIH 70 prior to loading into the injection molding machine. The first part was formed using the MFIM process. Process details are provided in TABLE 31 and TABLE 32. The part was made using a 2"×4"×4" block mold (5.08× 10.16×10.16 cm) with a mold cavity volume of 524.4 cc and a sprue volume of 17.4 cc. The sprue was cut from the part, and the part was then subject to compression load testing to quantify the compressive strength properties of the cellular structure formed within the 2"×4"×4" geometry.

TABLE 31

Material Composition

| | | Weight % |
|---|---|---|
| Polymer: | Metallocene Polyethylene | 98% |
| Foaming Agent: | Hydrocerol BIH 70 | 2% |

TABLE 32

| Settings | |
|---|---|
| Barrel Temperatures (° C.) | 204 \| 193 \| 188 \| 188 \| 177 \| 166 \| 166 \| |
| Nozzle Temperature (° C.) | 204 |
| Feed Throat Temperature (° C.) | 49 |
| Mold Temperature (° C.) | 55 |
| Injection Speed (cc/s) | 655.48 |
| Specific Back Pressure (kPa) | 10,342 |
| Polymer Shot Size (cc) | 245.8/327.7/409.7 |

TABLE 32-continued

| Settings | |
|---|---|
| Decompression Size (cc) (for samples A/B/C) | 360.5/163.9/81.9 |
| Screw Speed (cm/sec) | 7.62 |
| Screw Rotate Delay Time (sec) | 100/740/740 |
| Appx. Decompression Time (sec) | 60 |
| Hold Pressure (kPa) | 0 |

Compression testing was carried out on an Instron Universal Testing System (available from Instron USA, Norwood, Mass., USA). Each molded foam block was placed between the testing platens and stabilized within an environmental chamber at 30° C. for five minutes prior to testing. The instrument was equipped with a 250 kN load cell. The compression test rate was 5 mm/min.

Figure 40:
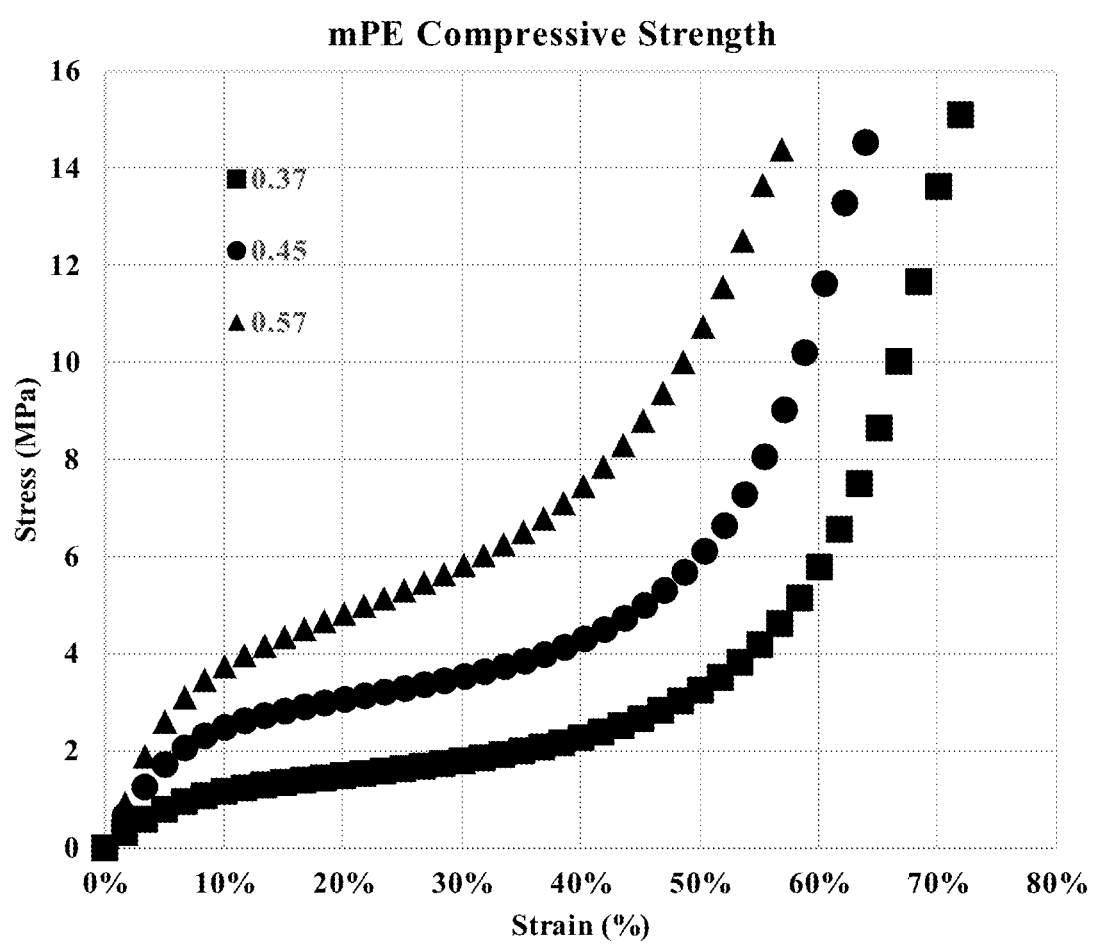
FIG. 40 is a graph of plots of stress versus strain from compression modulus measurements made of three metallocene polyethylene (mPE) materials of different densities and made according to MFIM processes, as described in Example 14.

Results showed a compressive modulus was 19 MPa for sample A (0.37 g/cc), 39 MPa for sample B (0.45 g/cc) and 55 MPa for sample C (0.57 g/cc). As shown in FIG. 40, the compressive strength of metallocene polyethylene (mPE) blocks increases with increasing density.

Example 15

Two sample parts, Part 87 and Part 111, were foam molded using a blend of low-density polyethylene with 2.5 wt % Hydrocerol® BIH 70 foaming agent (available from Clariant AG of Muttenz, Switzerland). Molding was conducted using an Engel Victory 160 Ton injection molding machine (available from Engel Machinery Inc. of York, Pa., USA). The mold included a cylindrical cavity of 6.35 cm diameter and 5.715 cm height, for a total volume of 180.33 cm3. An aluminum mold having a cold sprue and runner system feeding the described cylinder shape was employed for both parts. The melt delivery system for each part was the same, and the only process set-point differing between the two parts was the decompression volume.

The process settings used to produce each part are detailed in TABLE 33. A first part (Part 87) was molded using the MFIM process with 10 seconds of calculated decompression time and a decompression volume of 65.55 cc. A second part (Part 111) was molded under the same conditions, but while a period of 10 seconds for decompression was allowed, as with Part 87, the screw was not translated backwards to allow a decompression volume. Accordingly, the decompression volume was 0 cc.

TABLE 33

| Settings, Part 87 and Part 111 | | |
|---|---|---|
| | Part 87 | Part 111 |
| Barrel Temperatures (° C.) | 182.2 \| 182.2 \| 182.2 \| 182.2 \| 148.9 \| 137.8 \| 37.8 | |
| Mold Temperature (° C.) | 10 | |
| Injection Speed (cc/s) | 327.7 | |
| Back Pressure (kPa) | 6895 | |
| Decompression Time (sec) | 10 | |
| Decompression Volume (cc) | 65.55 | 0 |
| Decompression Rate (cc/s) | 163.9 | |
| Depressurization Rate (GPa/sec) | 0.0145 | |
| Cushion | 0.5 | |
| Cooling Time (sec) | 160 | |
| Shot Volume (cc) | 53.3 | |
| Final Part Weight (g) | 48.4 | 34.5 |

Figure 42:
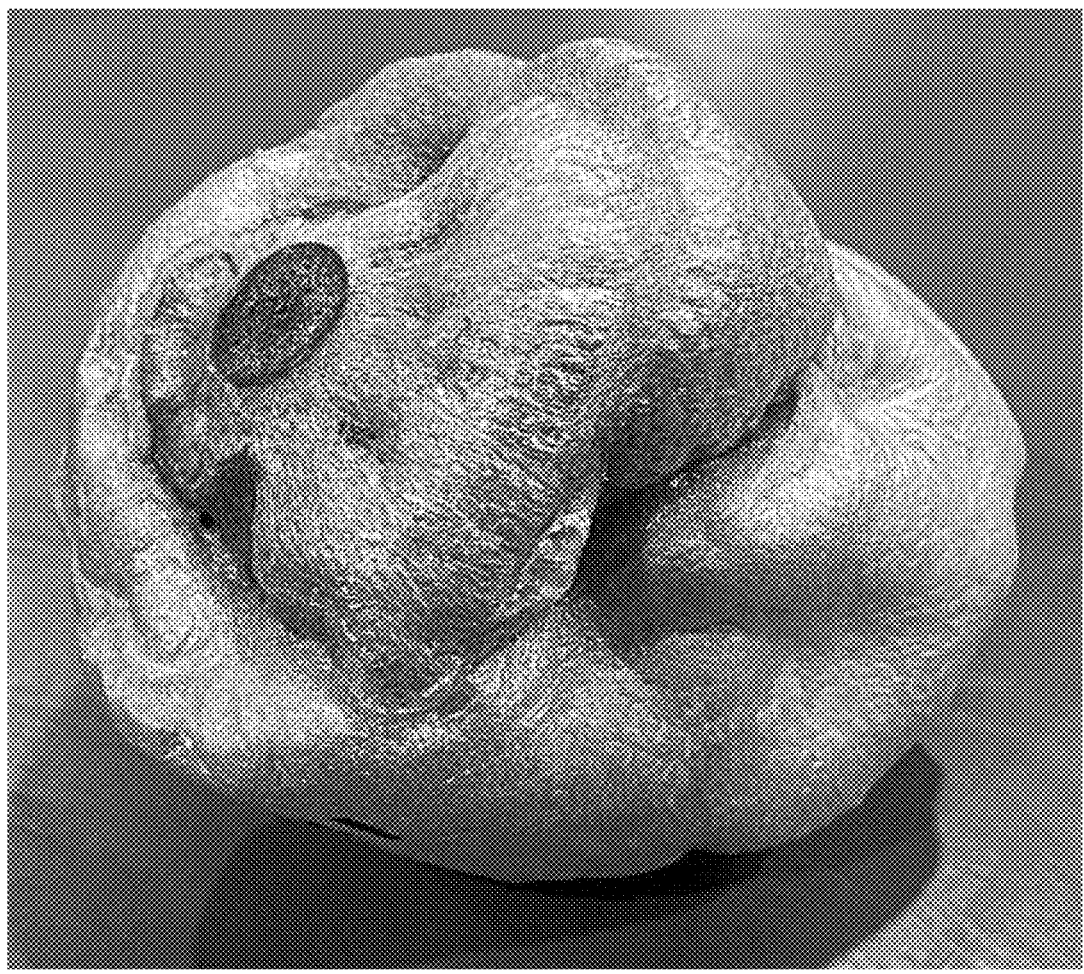
FIG. 42 is a photograph showing a part, Part 111, made without a decompression step, as described in Example 15.

Both Part 87 and Part 111 were photographed. FIG. 42 is a photographic image of Part 111 molded using no decompression step. As seen in the image, the process without the decompression step did not yield a part that filled the mold cavity, and the part did not match the shape of the cylindrical cavity of the mold.

Figure 43:
FIG. 43 is a part, Part 87, made according to an MFIM process as described in Example 15.

FIG. 43 is a photographic image of Part 87 molded using a decompression volume of 69.55 cc. As seen in the image, the molding process using a decompression volume of 69.55 cc yielded a part that entirely or substantially filled the cylindrical mold cavity, and the part matched or substantially matched the shape of the cylindrical cavity of the mold.

During the molding processes used to create Part 87 and Part 111, the hydraulic ram pressure and barrel volume in front of the screw (i.e. between then screw and the nozzle) were displayed in readouts on the injection molding machine. The hydraulic ram pressure was recorded as a function of barrel volume as the injection progressed.

The injection pressure (or specific injection pressure) was calculated by multiplying the measured hydraulic pressure of the ram by the machine intensification ratio, which for the Engle Victory 160 Ton molding machine is 7.222. The intensification ratio is a geometric factor to calculate the pressure amplification due to geometric differences between the hydraulic ram and the tip of the injection molding screw at the molten polymer interface. The injection pressure was plotted against barrel volume as displayed in FIG. 44 for the molding processes of both Parts 111 and 87.

Figure 44:
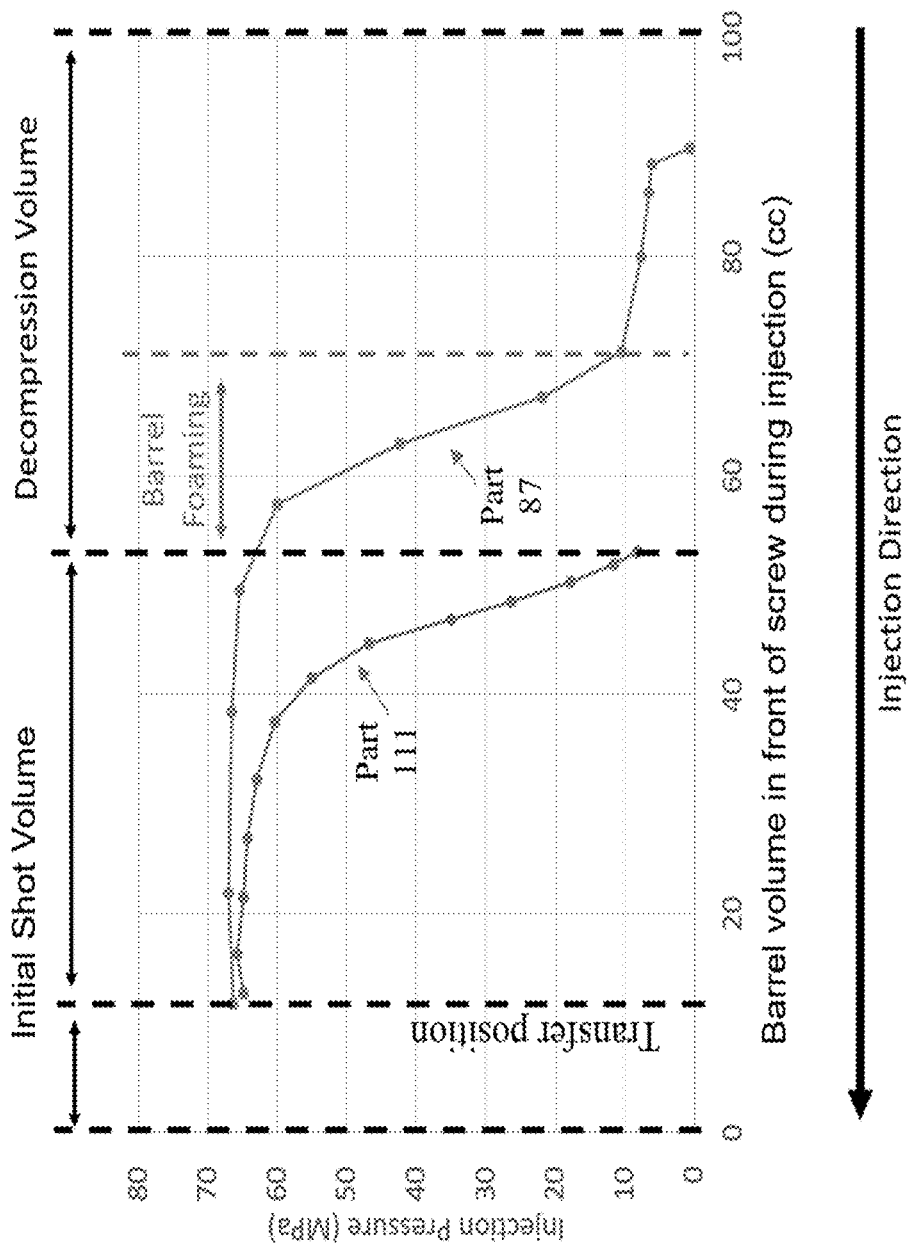
FIG. 44 is a plot of injection pressure against barrel volume for the molding processes of Part 111 and the molding process of Part 87 as described in Example 15.

Referring to the plot for Part 111 in FIG. 44, as expected an immediate pressure increase was observed as the barrel volume between the nozzle and the screw (i.e. in front of the screw) was decreased to less than the shot volume of about 53 cc by translation of the screw towards the nozzle. A final injection pressure of approximately 65 MPa at the nozzle was achieved with approximately 20 cc of molten polymer mixture remaining in the barrel.

Considering Part 87, a shot of 53.3 cc was built and then a decompression volume of 65.5 cc was added to the shot for a total possible shot volume of 118.8 cm3. Referring to the plot for Part 87, as the screw was translated towards the nozzle, the pressure initially began to build when the barrel volume in front of the screw was about 90 cc. Then the pressure climbed slowly until the barrel volume was just above 70 cc, when the pressure began to climb rapidly, achieving an equilibrium pressure after the barrel volume was reduced below 53 cc. The pressure/volume profile for the molding process of Part 87 was very different from that for the molding process of Part 111. In particular, the onset of rapid pressure rise (at a barrel volume of about 73 cc) for Part 87 was at a greater volume than that of onset of rapid pressure rise for Part 111 (at about 53 cc). The difference between these "onset volumes" suggests a higher volume of shot for Part 87 before injection into the mold due to expansion of the shot by foaming thereof into the decompression volume within the barrel. Accordingly, the extra volume is labeled "Barrel Foaming" to reflect this possibility.

Example 16

Two spherical foam molded parts, Part 16A and Part 16B, were separately made, each from a mixture of virgin low density polyethylene (85 parts by weight) and talc (15 parts by weight) using the MFIM process. Each of Parts 16A and 16B was cut through the middle (widest part) into two pieces to expose a cross section of the part, and a photograph taken of the cross section.

A further two parts, Part 16C and 16D, were made from a mixture of virgin low density polyethylene (85 parts by weight) and talc (15 parts by weight) using the MFIM process. However, Parts 16C and 16D were made using a reduced clamp force when compared with the process used to make Parts 16A and 16B. Each of Parts 16C and 16D was cut through the middle (widest part) into two pieces to expose a cross section of the part, and a photograph taken of the cross section.

A further part, Part 16E, was made from a mixture of virgin low density polyethylene (85 parts by weight) and talc (15 parts by weight) using the MFIM process. Part 16E differed from Parts 16A and 16B in using a different decompression ratio (the ratio between the shot volume and the decompression volume). Part 16E was cut through the middle (widest part) into two pieces to expose a cross section of the part, and a photograph taken of the cross section.

Each of Parts 16A, 16B, 16C, 16D, and 16E was ground by adding it to a RAPID Granulator Open-Hearted 400-60 (available from RAPID Granulator AB of Bredaryd, Sweden), which produced a regrind in the form of flakes. The regrind from each of Parts 16A, 16B, 16C, 16D, and 16E was then used as feedstock for injection molding to make a new spherical foamed part, 16AR, 16BR, 16CR, 16DR, and 16ER respectively.

Each of Parts 16AR, 16BR, 16CR, 16DR, and 16ER was cut through the middle (widest part) into two pieces to expose a cross section of the part, and a photograph taken of the cross section.

Screw rotate delay time for all foam molding processes was 40 seconds. Other process settings used to produce the parts are detailed in TABLE 34. Virgin refers to fresh mixture of virgin low density polyethylene (85 parts by weight) and talc (15 parts by weight).

TABLE 34

Settings, Parts 16A-16E and 16AR-16ER

| Run type | Feed-stock | Part | Shot volume (cc) | Decom-pression volume (cc) | Cool-ing time (sec) | Approx-imate decom-pression time (sec) | Clamp force (kN) |
|---|---|---|---|---|---|---|---|
| Baseline | Virgin | 16A | 655 | 655 | 100 | 60 | 448 |
| | Regrind of 16A | 16AR | 655 | 655 | 160 | 120 | 448 |
| | Virgin | 16B | 623 | 655 | 100 | 60 | 448 |
| | Regrind of 16B | 16BR | 655 | 655 | 160 | 120 | 448 |
| Reduced clamp force | Virgin | 16C | 623 | 655 | 160 | 120 | 199 |
| | Regrind of 16C | 16CR | 655 | 655 | 160 | 120 | 199 |
| | Virgin | 16D | 623 | 655 | 160 | 120 | 199 |
| | Regrind of 16D | 16DR | 655 | 655 | 160 | 120 | 100 |
| Reduced decom-pression ratio | Virgin | 16E | 541 | 737 | 160 | 120 | 448 |
| | Regrind of 16E | 16ER | 574 | 655 | 160 | 120 | 100 |

Figure 45:
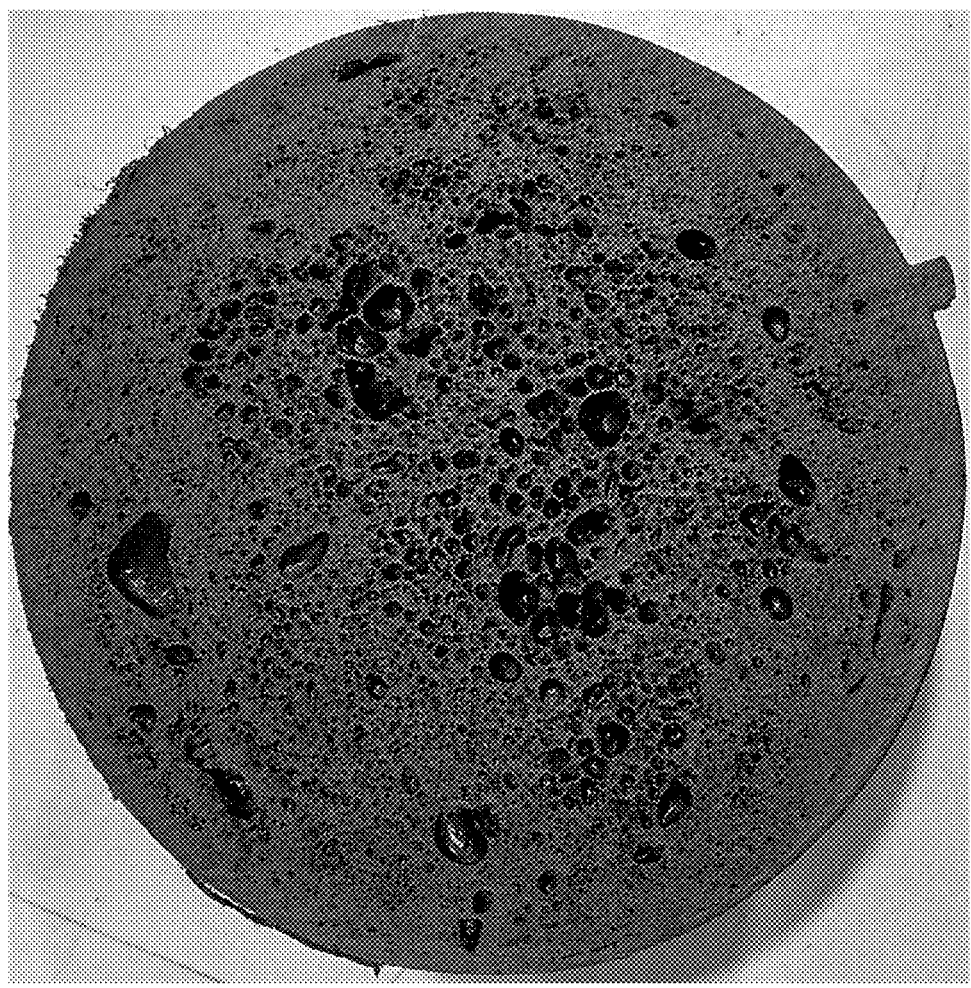
FIG. 45 is a photograph of a cross section of Part 16A as described in Example 16.
Figure 46:
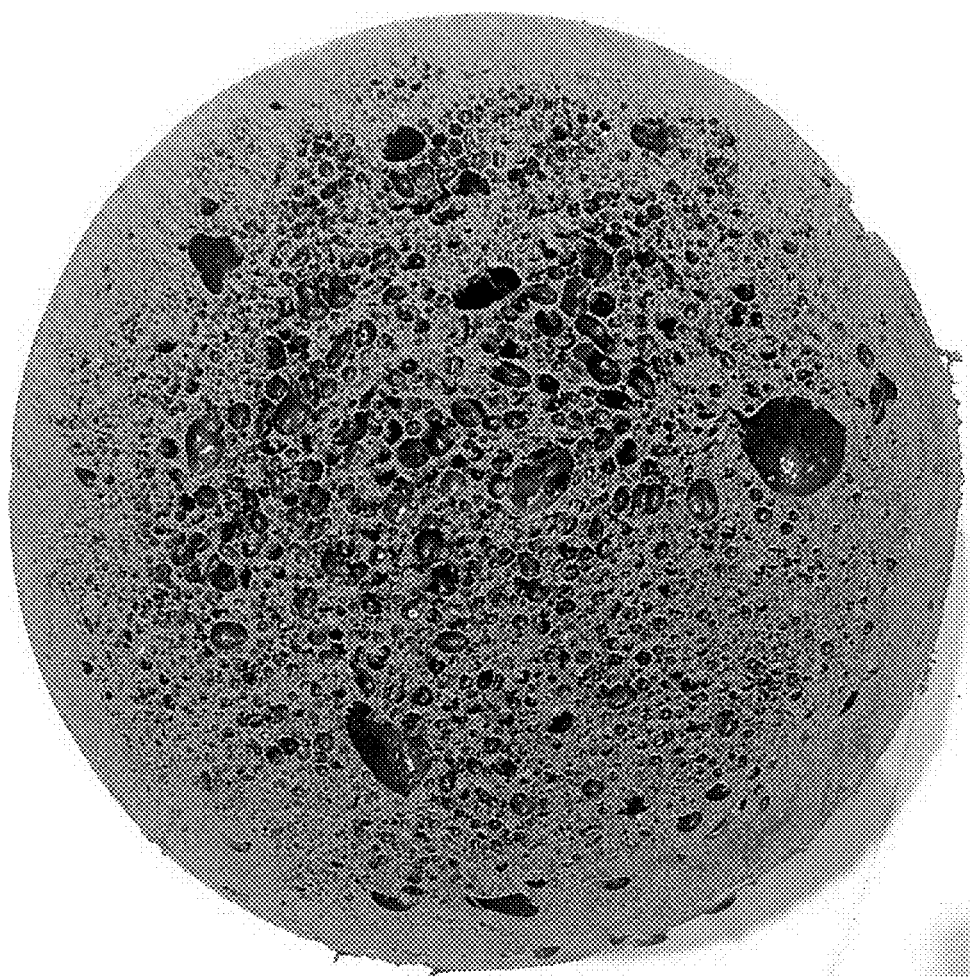
FIG. 46 is a photograph of a cross section of Part 16AR as described in Example 16.
Figure 47:
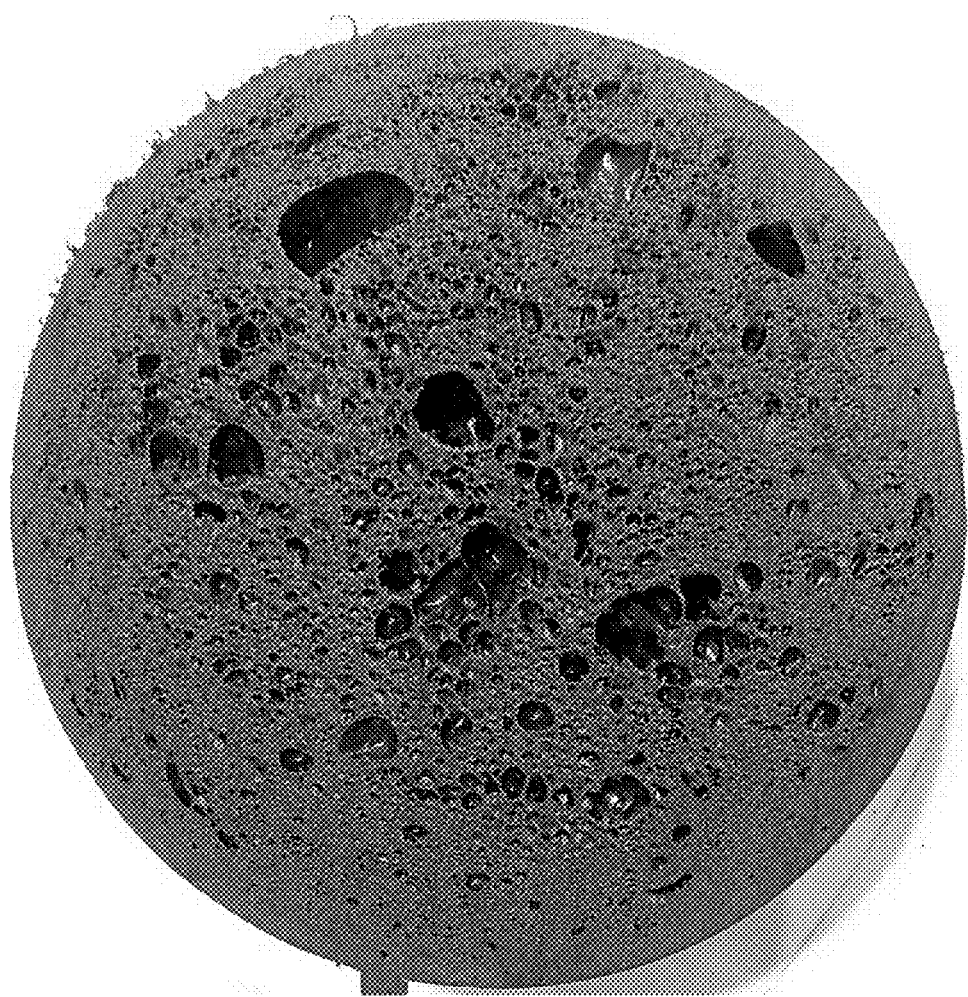
FIG. 47 is a photograph of a cross section of Part 16B as described in Example 16.
Figure 48:
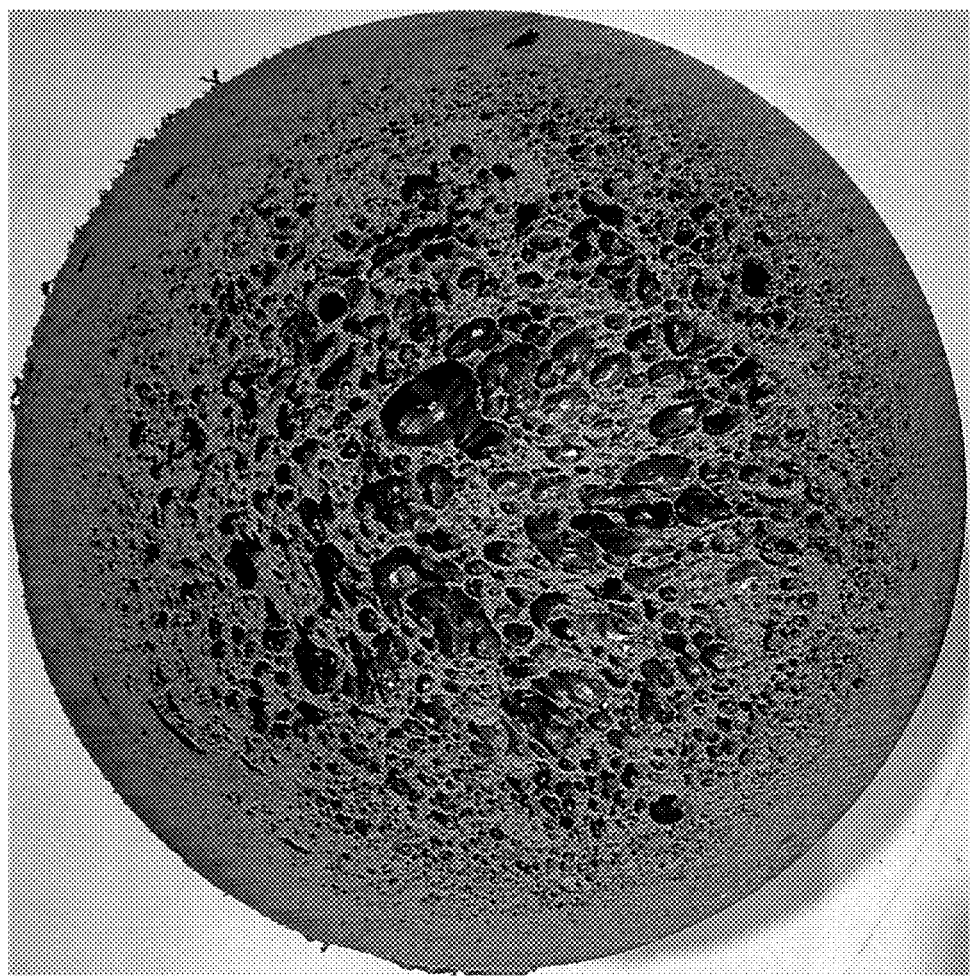
FIG. 48 is a photograph of a cross section of Part 16BR as described in Example 16.
Figure 49:
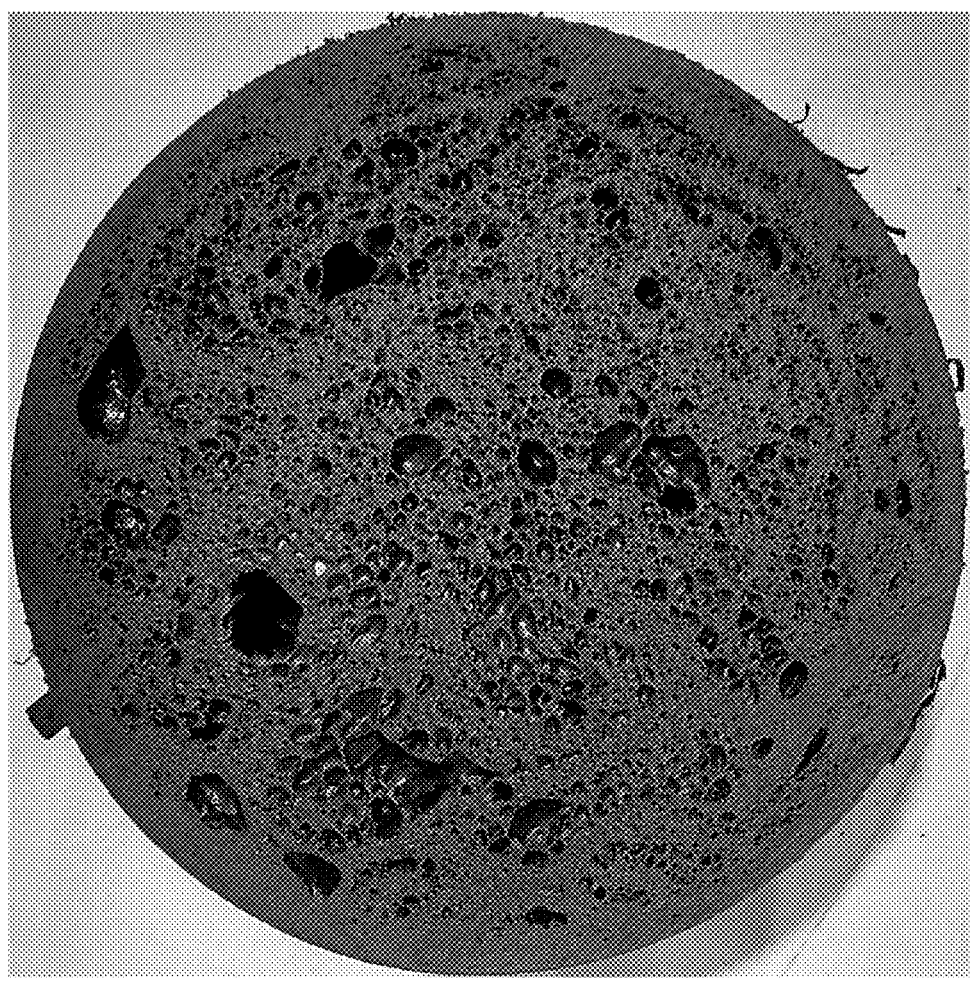
FIG. 49 is a photograph of a cross section of Part 16C as described in Example 16.
Figure 50:
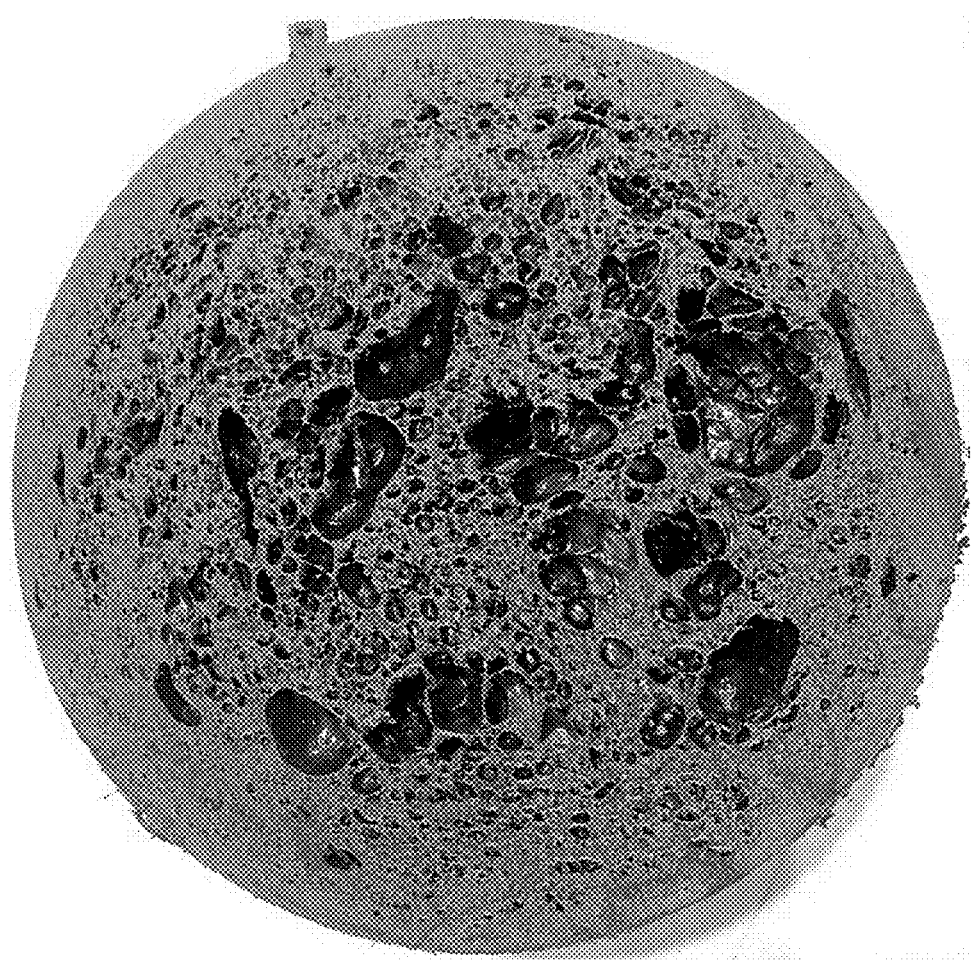
FIG. 50 is a photograph of a cross section of Part 16CR as described in Example 16.
Figure 51:
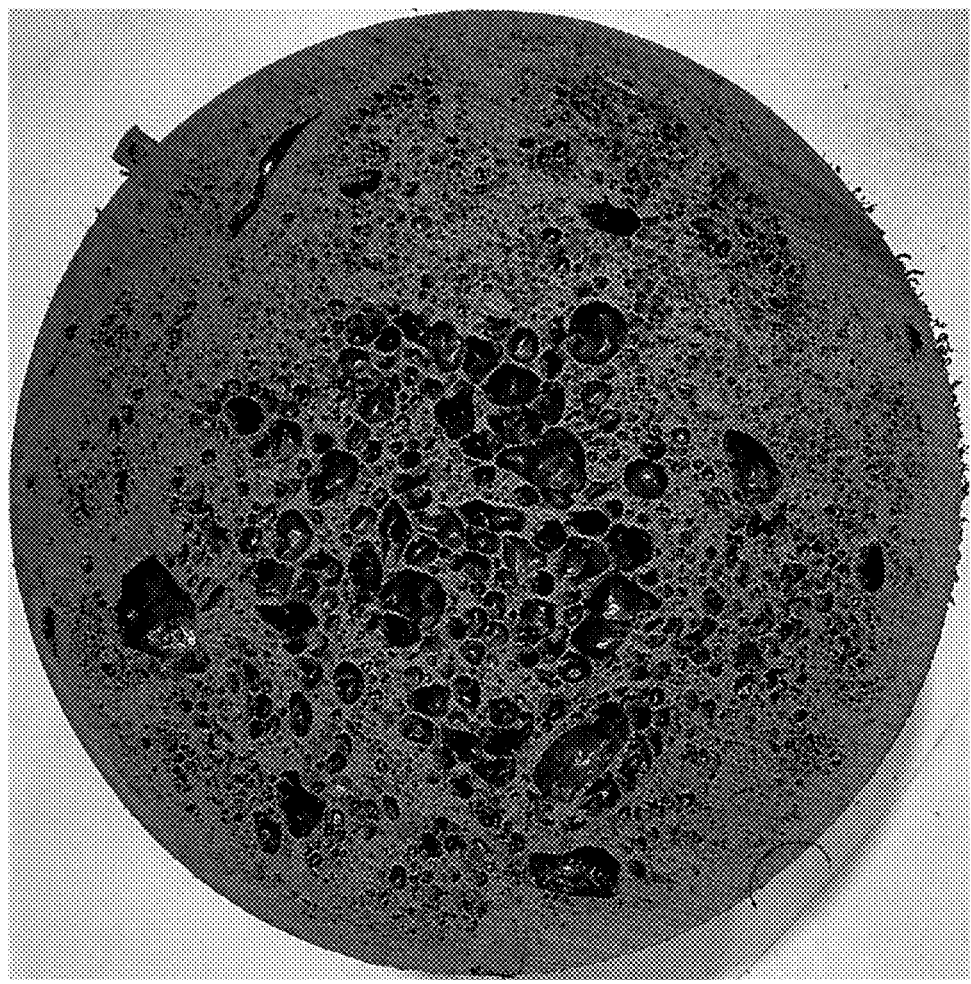
FIG. 51 is a photograph of a cross section of Part 16D as described in Example 16.
Figure 52:
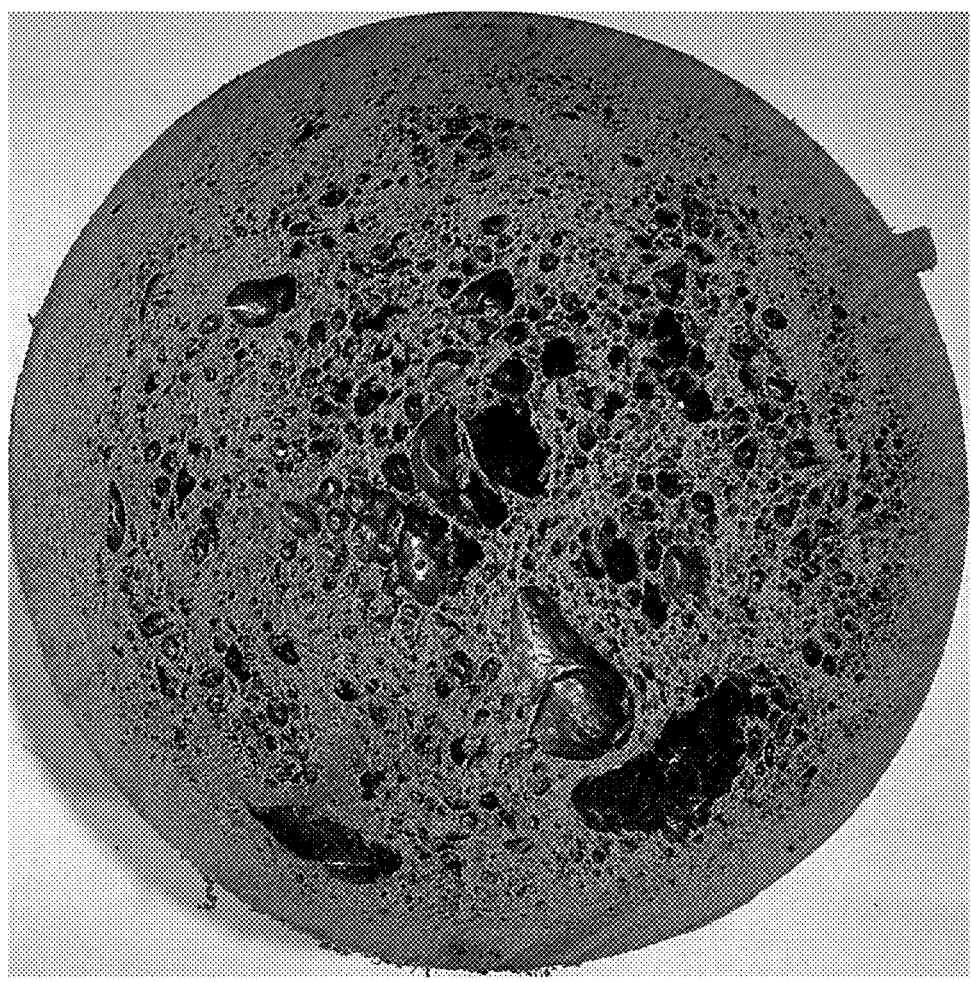
FIG. 52 is a photograph of a cross section of Part 16DR as described in Example 16.
Figure 53:
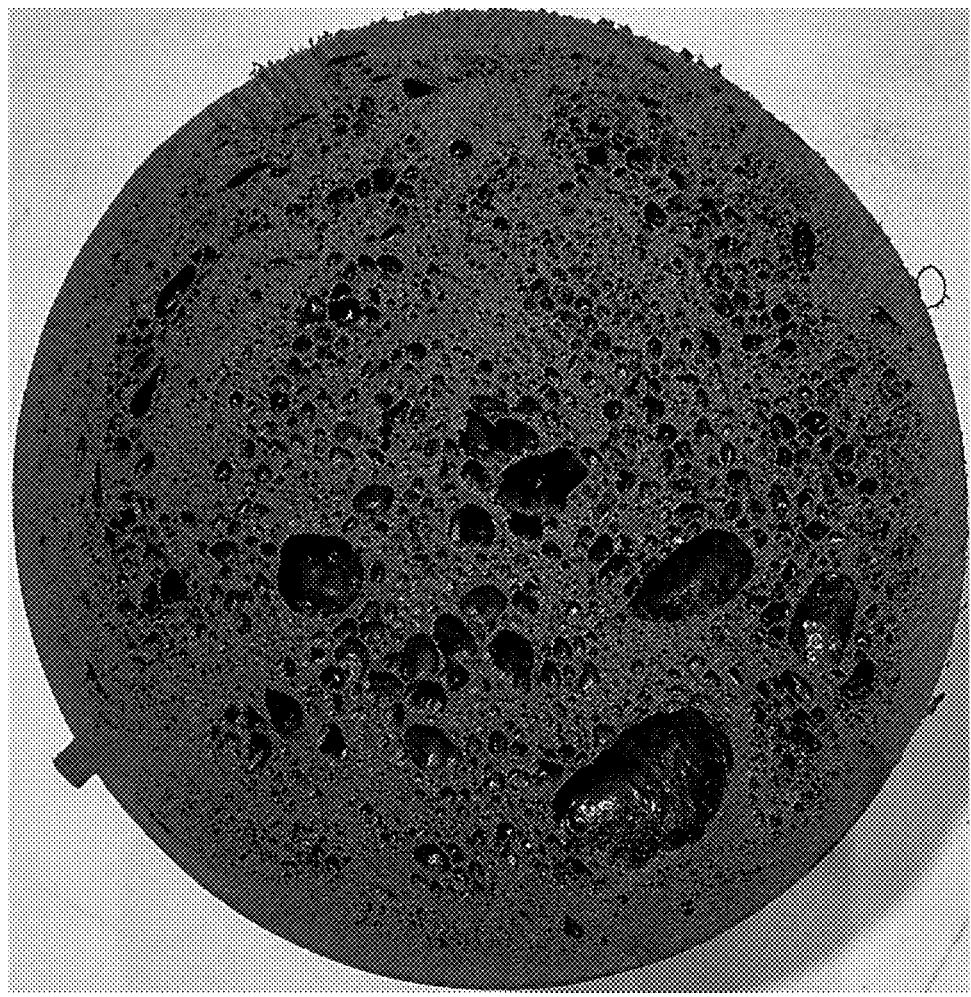
FIG. 53 is a photograph of a cross section of Part 16E as described in Example 16.
Figure 54:
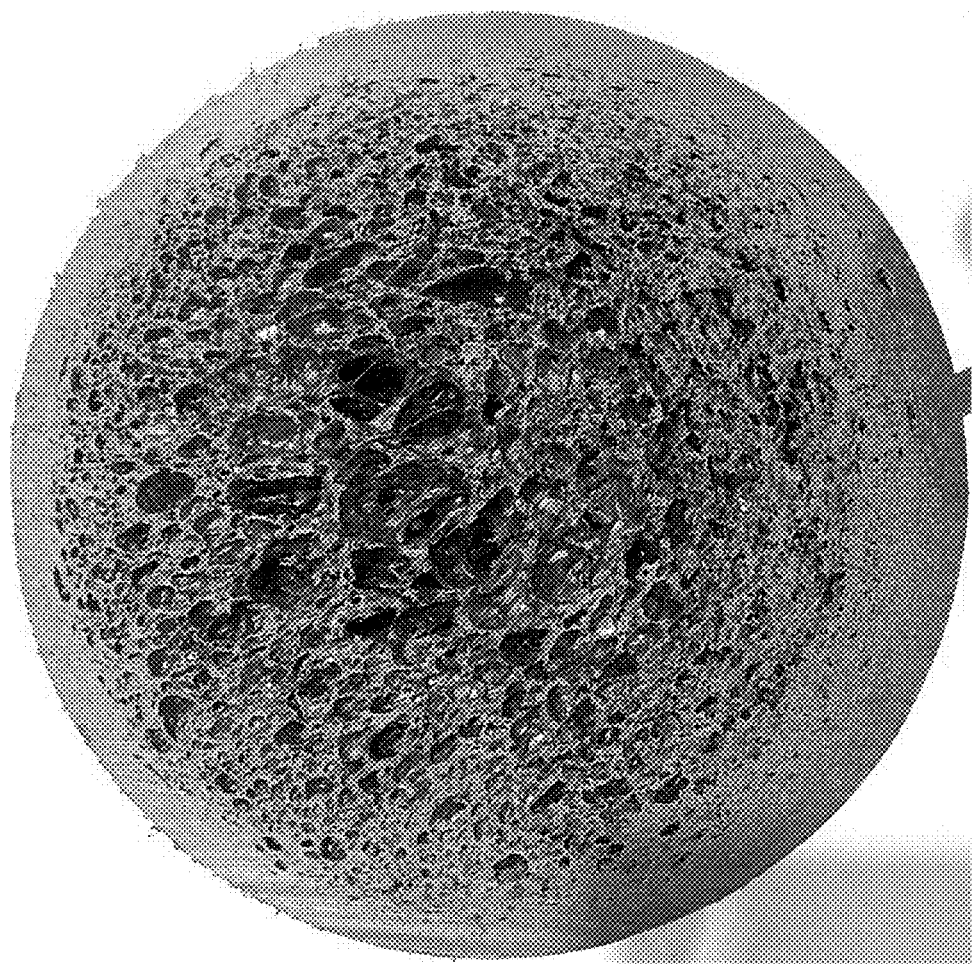
FIG. 54 is a photograph of a cross section of Part 16ER as described in Example 16.

FIG. 45 is the photograph of a cross section of Part 16A, FIG. 46 of Part 16AR, FIG. 47 of Part 16B, FIG. 48 of Part 16BR, FIG. 49 of a cross section of Part 16C, FIG. 50 of Part 16CR, FIG. 51 of Part 16D, FIG. 52 of Part 16DR, FIG. 53 of Part 16E, and FIG. 54 is the photograph of a cross section of Part 16ER. FIGS. 45-54 collectively show that each of MFIM-molded Parts 16A, 16B, 16C, 16D, and 16E was successfully recycled into a further MFIM-molded part; Parts 16AR, 16BR, 16CR, 16DR, and 16ER respectively.

A variety of further articles was made using the MFIM process from a variety of virgin thermoplastic resins including low-density polyethylene (LDPE), high-density polyethylene (HDPE), polypropylene (PP), high-impact polystyrene (HIPS), polyethylene terephthalate (PET), polybutylene terephthalate (PBT), polyamide (PA), thermoplastic polyurethane (TPU), and thermoplastic olefin (TPO). These further polymer foam articles were all successfully recycled by regrinding as described in this example and using the reground material as feedstock in a further MFIM process, further as demonstrated in FIGS. 45-54. The polymer foam articles made by recycling are referred to as formed from recycled material feedstock. This Example shows that recycled polymer foam articles are successfully formed from 100% recycled material feedstock by using the MFIM process. Further in this Example, all the polymer foam articles formed using the MFIM process are recyclable and therefore also constitute potential recyclable material feedstocks.

Example 17

Five parts were foam molded using a blend of low-density polyethylene blended with 2% by weight Hydrocerol® BIH 70 foaming agent. Molding was conducted using an Engel Duo 340 Ton injection molding machine (available from Engel Machinery Inc. of York, Pa., USA). The mold cavity was approximately spherical in shape with a diameter of six inches (15.24 cm). A first part was molded using an MFIM process without decompression, a second part with 0.5 seconds of calculated decompression time and decompression volume of 164 cc, and a third with 7 seconds of decompression time, decompression volume of 164 cc. The backpressure was set to 6895 kPa and the third process employed a depressurization rate of 0.0059 GPa/sec. The fourth and fifth parts were molded with nearly two orders of magnitude difference in depressurization rates employed.

An aluminum mold having a cold sprue and runner system feeding a 6-inch diameter sphere cavity was employed for all five parts. The melt delivery system for each part was the same, as were most of the processing conditions. The process settings used to produce each part are detailed in TABLE 35.

TABLE 35

Varied decompression time

| | Part 1 | Part 2 | Part 3 | Part 4 | Part 5 |
|---|---|---|---|---|---|
| Decompression Time (sec) | 0 | 0.5 | 7 | 10 | 10 |
| Barrel Temperatures (° C.) | 182/182/182/174/163/154/161/121/49 | | | | |
| Mold Temperature (° C.) | 10 | | | | |
| Injection Speed (cc/s) | | 655.5 | | 164 | 164 |
| Back Pressure (kPa) | | 6895 | | 689.5 | 6895 |
| Decompression Volume (cc) | 0 | 164 | | 16.4 | |
| Decompression Rate (cc/s) | — | 163.9 | | 262 | |
| Depressurization Rate (GPa/sec) | — | 0.0059 | | 0.0009 | .0629 |
| Cooling Time (sec) | 200 | | | | |
| Shot Volume (cc) | | 508 | | 500 | |
| Part Weight (g) | 348.0 | 376.8 | 378.4 | 337.3 | 343.5 |

Figure 55:
FIG. 55 is a photograph of Part 1 made using no decompression, as described in Example 17.

Each of the five parts was photographed. FIG. 55 is a photographic image of the part molded using no decompression. As seen in the image, the process without decompression did not yield a part that filled the mold cavity, and the part did not match the shape of the spherical cavity of the mold.

FIG. 56 is a photographic image of the second part, molded using a decompression time of 0.5 seconds after applying a depressurization rate of 0.0059 GPa/sec. As seen in the image, the molding process using 0.5 seconds of decompression time yielded a part that entirely or substantially filled the spherical mold cavity and the part matched or substantially matched the shape of the spherical cavity of the mold.

Figure 57:
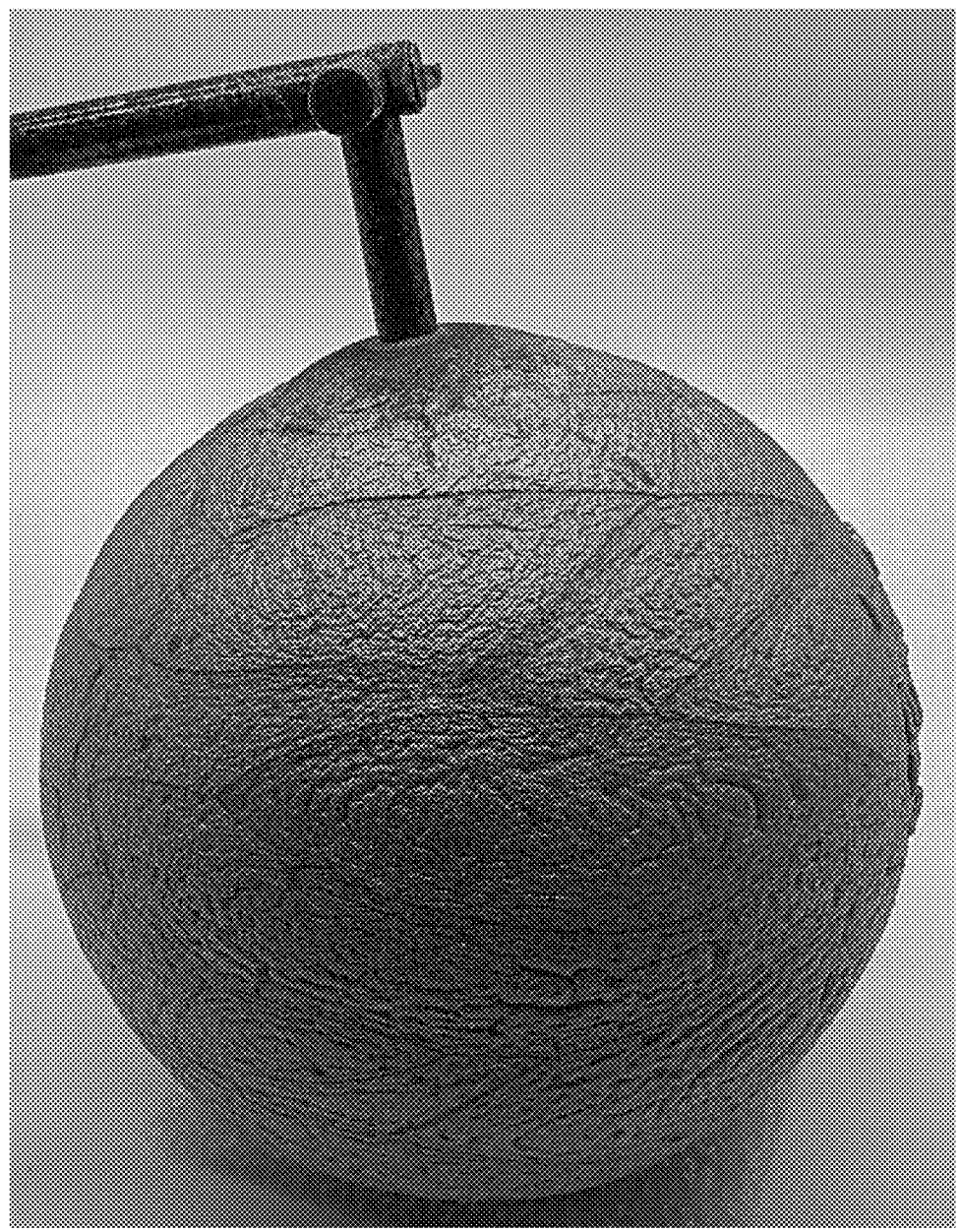
FIG. 57 is a photograph of a cross section of Part 3 made with a decompression time of 7 seconds, as described in Example 17.

FIG. 57 is a photographic image of the third part, molded using a decompression time of 7 seconds after applying a depressurization rate of 0.0059 GPa/sec. As seen in the image, the molding process using 7 seconds of decompression time yielded a part that entirely or substantially filled the spherical mold cavity and the part matched or substantially matched the shape of the spherical cavity of the mold.

Figure 68:
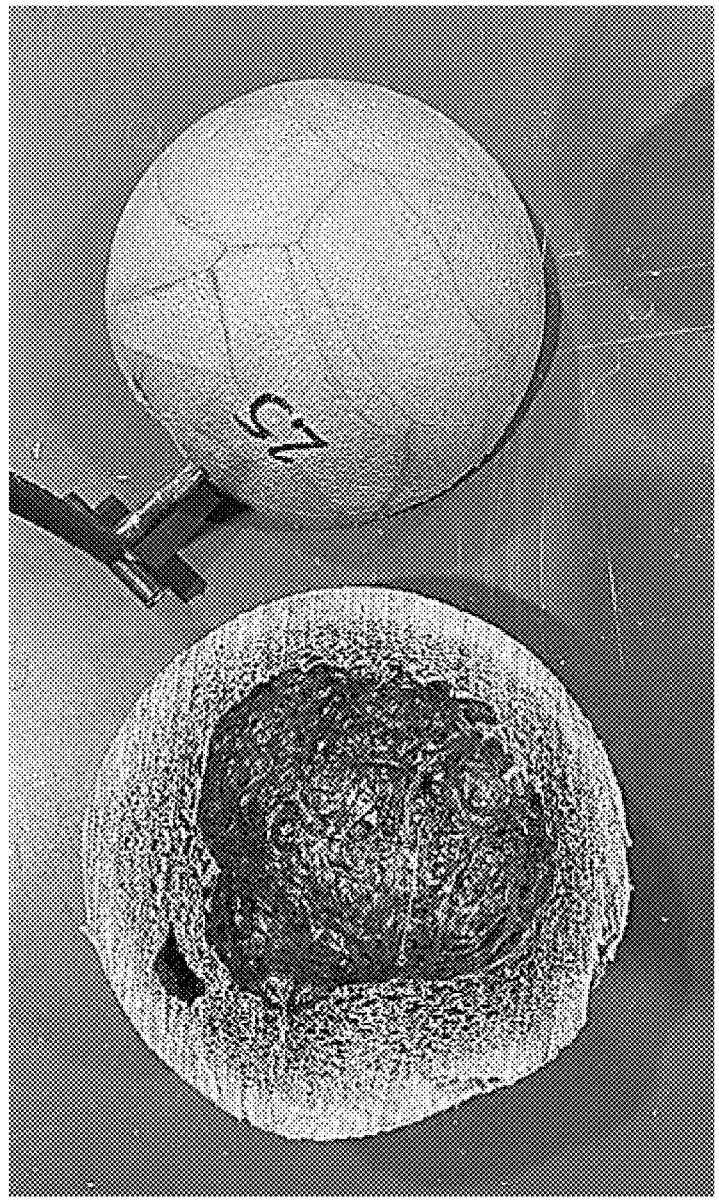
FIG. 68 is a photographic image of the fourth part, molded using a decompression time of 10 seconds after applying a depressurization rate of 0.0009 GPa/sec, as described in Example 17.

FIG. 68 is a photographic image of the fourth part, molded using a decompression time of 10 seconds after applying a depressurization rate of 0.0009 GPa/sec. As seen in the image, the molding process using a low depressurization rate of 0.0009 GPa/sec did not yield a part that substantially filled the mold cavity, though the part substantially matched the spherical shape of the mold.

Figure 69:
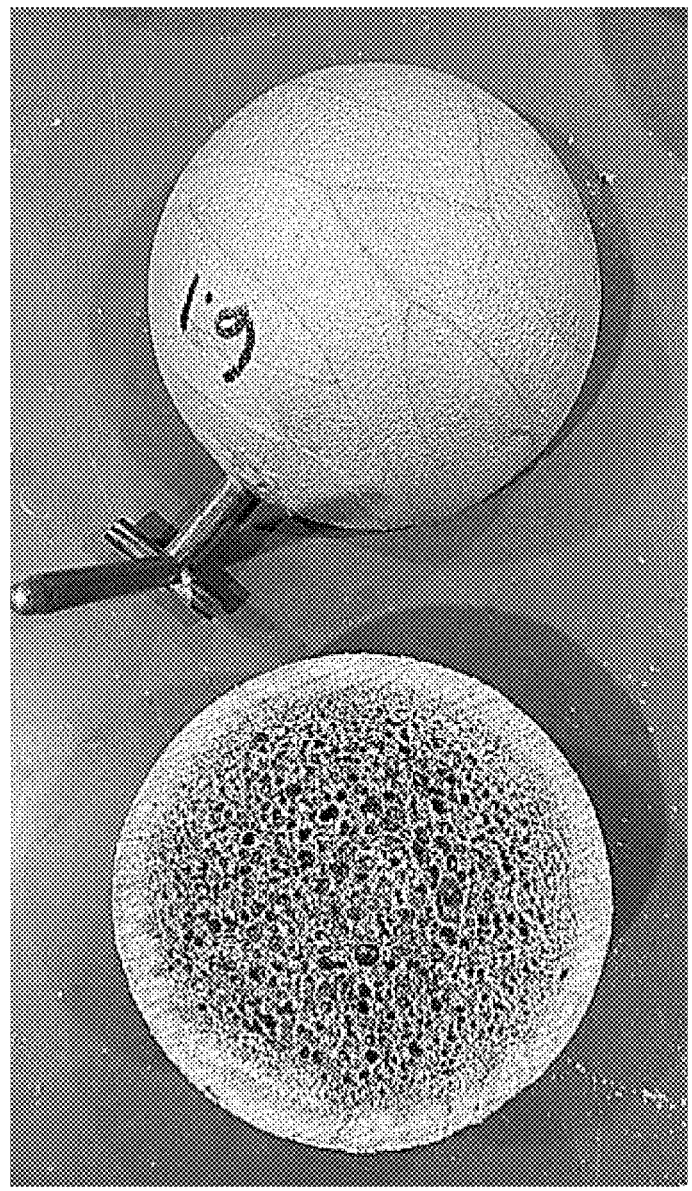
FIG. 69 is a photographic image of the fifth part, molded using a depressurization rate of 0.0629 GPa/sec, as described in Example 17.

FIG. 69 is a photographic image of the fifth part, molded using a depressurization rate of 0.0629 GPa/sec. As seen in the image, the molding process using the stated conditions yielded a part that substantially filled the spherical mold cavity and the part matched or substantially matched the shape of the spherical cavity of the mold.

Example 18

Two parts were foam molded using a blend of low-density polyethylene blended with 2% by weight Hydrocerol® BIH 70 foaming agent (available from Clariant AG of Muttenz, Switzerland). Molding was conducted using an Engel Duo 340 Ton injection molding machine (available from Engel Machinery Inc. of York, Pa., USA). The mold cavity was approximately spherical in shape of diameter six inches (15.24 cm). A first part was molded using an MFIM process with 100 psi (689 kPa) of back pressure and a decompression rate of 1 cubic inch per second (16.4 cc/s). Back pressure may be set by the operator. Decompression rate is determined by the speed of lateral movement of the screw away from the collection area of the injection molding machine, which may be set by the operator. A second part was molded using 1000 psi (6895 kPa) of back pressure and a decompression rate of 16 cubic inches per second (292 cc/sec). An aluminum mold having a cold sprue and runner system feeding a 6-inch diameter sphere cavity was employed for both parts. The melt delivery system for each part was the same, as were most of the processing conditions. The process settings used to produce each part are detailed in TABLE 36.

TABLE 36

Varied decompression rate

| | Part 1 | Part 2 |
|---|---|---|
| Decompression Rate (cc/s) | 16.4 | 292 |
| Barrel Temperatures (° C.) | 182 /182/182/174/163/154/161/121/49 | |
| Mold Temperature (° C.) | 10 | 10 |
| Injection Speed (cc/s) | 165 | |
| Back Pressure (kPa) | 689 | 6895 |
| Decompression Volume (cc) | 16.4 | |
| Depressurization rate (GPa/sec) | 0.0001 | 0.1049 |
| Cooling Time (sec) | 200 | |
| Shot Volume (cc) | 500 | |
| Part Weight (g) | 330.48 | 334.47 |

Figure 58:
FIG. 58 is a photograph of a cross section of Part 1 after sectioning, as described in Example 18.

Each of the two parts was photographed. FIG. 58 is a photographic image of Part 1, molded using a back pressure of 689 kPa, and a decompression rate of 16.4 cc/sec. As seen in the image, this molding process did not yield a part that filled the mold cavity substantially, and the part did not match the shape of the spherical cavity of the mold.

Figure 59:
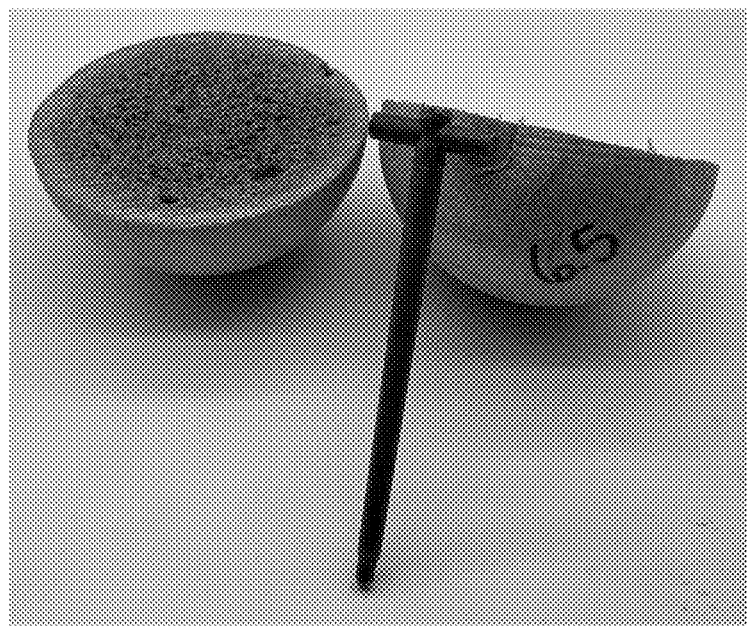
FIG. 59 is a photograph of a cross section of Part 2 after sectioning, as described in Example 18.

FIG. 59 is a photographic image of Part 2, molded using a back pressure of 6895 kPa and a decompression rate of 0.001 GPa/s. As seen in the image, the molding process utilizing a rapid decompression rate of 292 cc/sec, coupled with backpressure of 1000 psi (6895 kPa) yielded a part that entirely or substantially filled the spherical mold cavity and the part matched or substantially matched the shape of the spherical cavity of the mold.

Example 19

A mixture of 98.5 parts by weight of post-industrial polypropylene in the form of granules and 1.5 parts by weight of foaming agent (Hydrocerol® BIH 70, available from Clariant AG of Muttenz, Switzerland) was foam molded using the MFIM process with a 2.25×3.875×8 inch (5.7×9.8×20.3 cm) mold cavity to produce a 2.25×3.875×8 inch (5.7×9.8×20.3 cm) brick. Three separate such foam molding processes, 19-1D, 19-3D, and 19-5D, were performed to produce three polymer foam bricks.

Processes 19-1D, 19-3D, and 19-5D were performed in the same manner using many of the same processing conditions, except for the number of decompression steps. Further, the cooling time of the shot before decompression was adjusted to maintain the same shot residence time in the barrel in all three runs: multiple decompression steps would have led to a longer cycle residence time of the shot in the barrel for a larger number of decompression steps. In addition, the shot volume for each run was adjusted to produce three bricks of as similar weight to each other as possible.

Process 19-1D was an MFIM process with one decompression step, in which after the shot was introduced to the front of the barrel (between the nozzle and the screw) and left for a cooling adjustment period, the screw was translated backward (away from the nozzle) to provide a decompression volume for ten seconds (decompression time). Immediately after the decompression step, the screw was translated forwards (toward the nozzle) to inject the shot into the mold.

Process 19-3D was performed in a similar manner, except that the screw was translated backward from a pre-translation position to provide the decompression volume for ten seconds (decompression time), and then translated forward to the pre-translation position; then backward for a second time to again provide the decompression volume for ten seconds decompression time, then translated forward to the pre-translation position; and then backward for a third time and left for a decompression time of ten seconds before injection. Accordingly, run 19-3D had three decompression steps instead of the single decompression step of run 19-1D.

Process 19-5D was performed in a similar manner as run 19-3D, except that five ten-second decompression steps were performed.

Several runs of each process were carried out to produce brick parts by each process type. Parameters for the three process types are shown in TABLE 37:

TABLE 37

Varied number of decompression steps

| Run | 19-1D | 19-3D | 19-5D |
|---|---|---|---|
| Barrel Temperatures (° C.) | 204/204/204/193/182/171/38 | | |
| Decompression Volume (cc) | 163.87 | | |
| Mold Temperature (° C.) | 10 | | |
| Clamp Force (kN) | 996 | | |
| Decompression Time (sec) | 10 | | |
| Specific Back Pressure (MPa) | 6.89 | | |
| Depressurization Rate (GPa/sec) | 0.0059 | | |
| Injection Speed (cc/s) | 163.87 | | |
| Shot Volume (cc) | 537.50 | 540.77 | 557.16 |
| Cooling Time (sec) | 330 | 315 | 300 |
| Cycle time (min:sec) | 5:46 | | |

Figure 60:
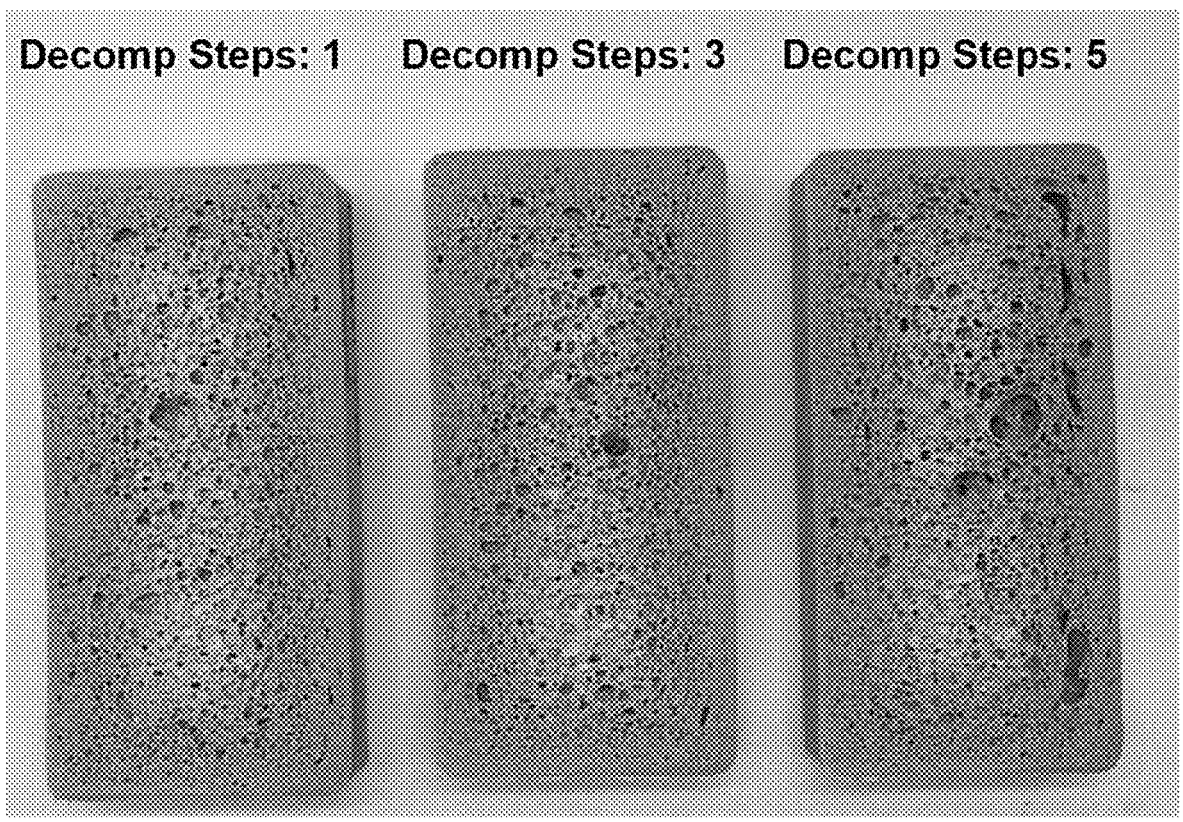
FIG. 60 shows a photograph of three brick parts made, as described in Example 19, with one decompression step, three decompression steps, and five decompression steps.

A brick from each process type was cut into two halves of 1×4×8 inch (2.5×10.2×20.3 cm), and the 4 inch×8 inch cross section of each was photographed. The photographs are displayed in FIG. 60. Parts molded with five decompression steps showed larger voids near the area where the melt enters the cavity.

Figure 61:
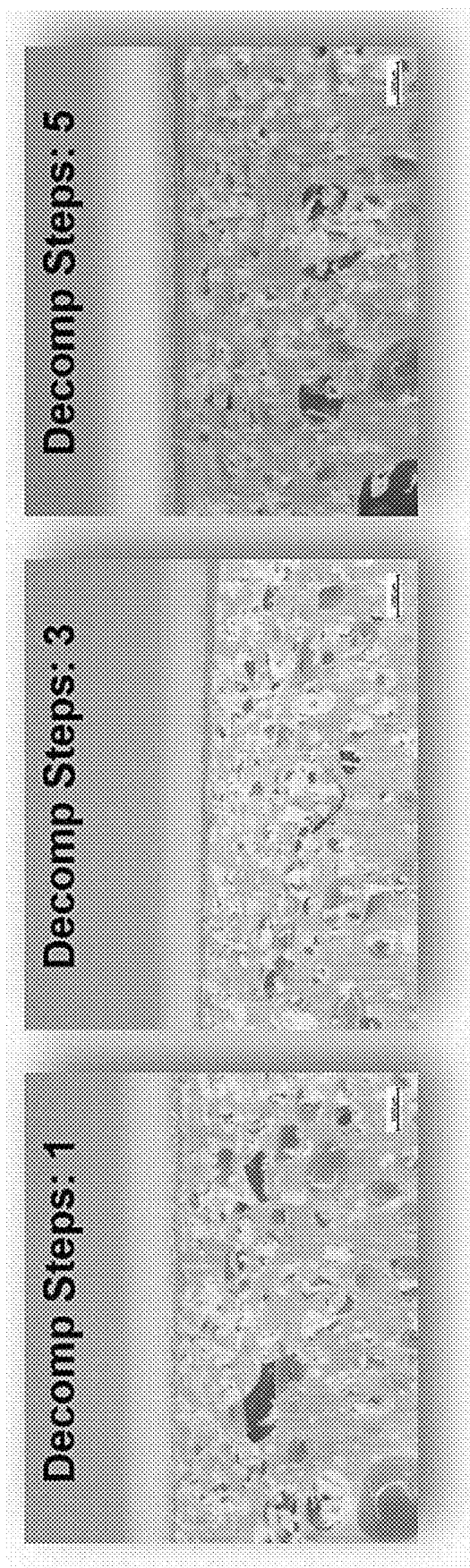
FIG. 61 shows magnified images of three brick parts made, as described in Example 19, with one decompression step, three decompression steps, and five decompression steps.

In addition, photographs were taken in side aspect of the surface of each cross sectioned brick at a magnification of 12×. The images show the cross-section face of each molded brick, and the original outer surface and edge can also be seen. The photographs are displayed in FIG. 61. Each brick showed cells within 500 micrometers of the surface.

One half of a brick from each process type was subject to compression testing. Compression testing using a modified ASTM D1621 standard test was carried out on an Instron Universal Testing System (available from Instron USA, Norwood, Mass., USA). Each molded foam block was placed between the testing platens and stabilized within an environmental chamber at 30° C. for five minutes prior to testing. The instrument was equipped with a 250 kN load cell. The compression test rate was 5 mm/min.

Figure 62:
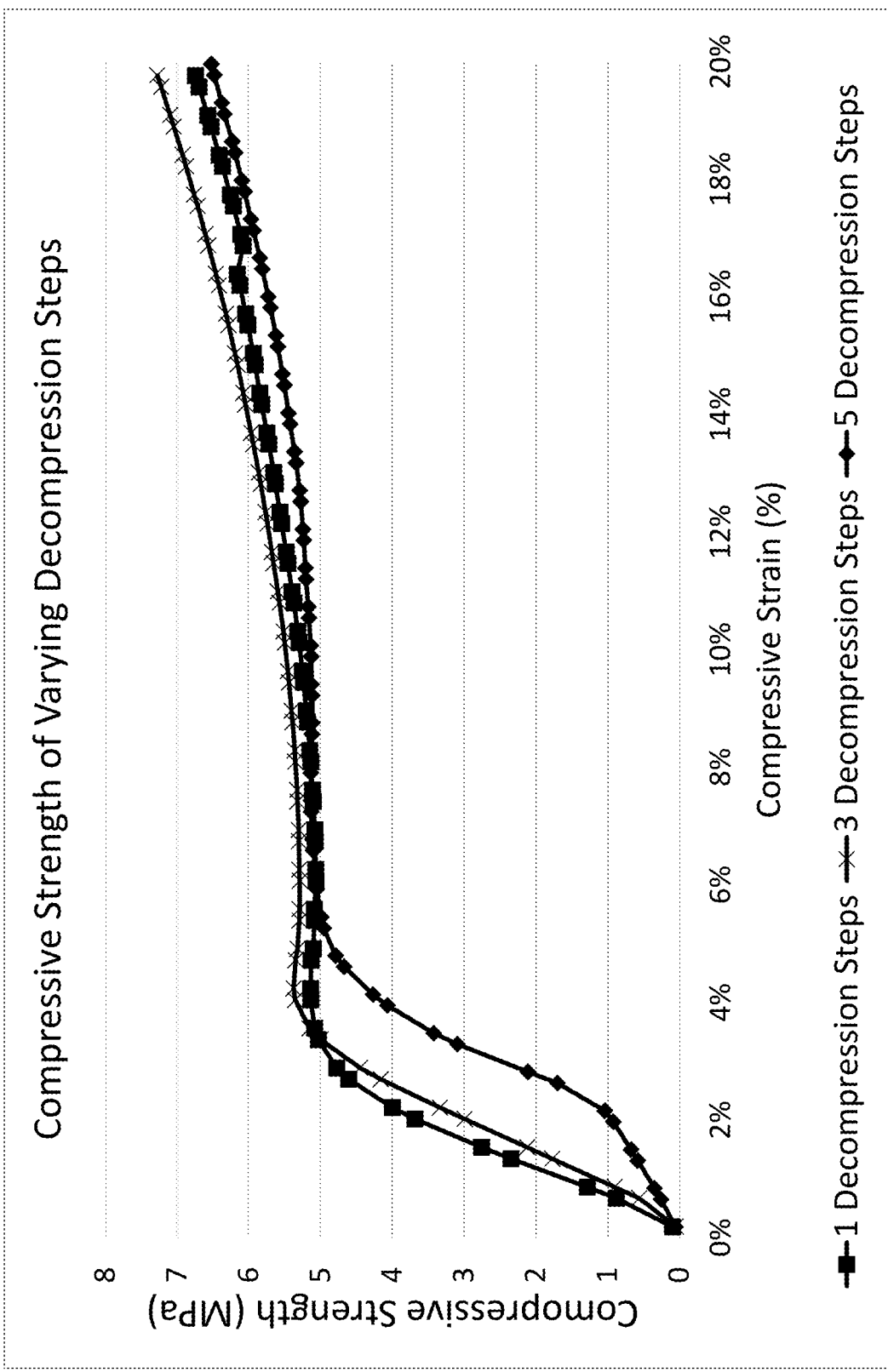
FIG. 62 is a plot of compressive strength versus compressive strain measured for three parts made as described in Example 19, using one decompression step, three decompression steps, and five decompression steps.

Plots of compressive strength versus compressive strain for bricks from each process type are shown in FIG. 62. Bricks made by all three processes had a similar maximum compressive strength of about 5.2 MPa. It was noted that the brick tested for five the 19-5D process has a large void near the gate.

Figure 63:
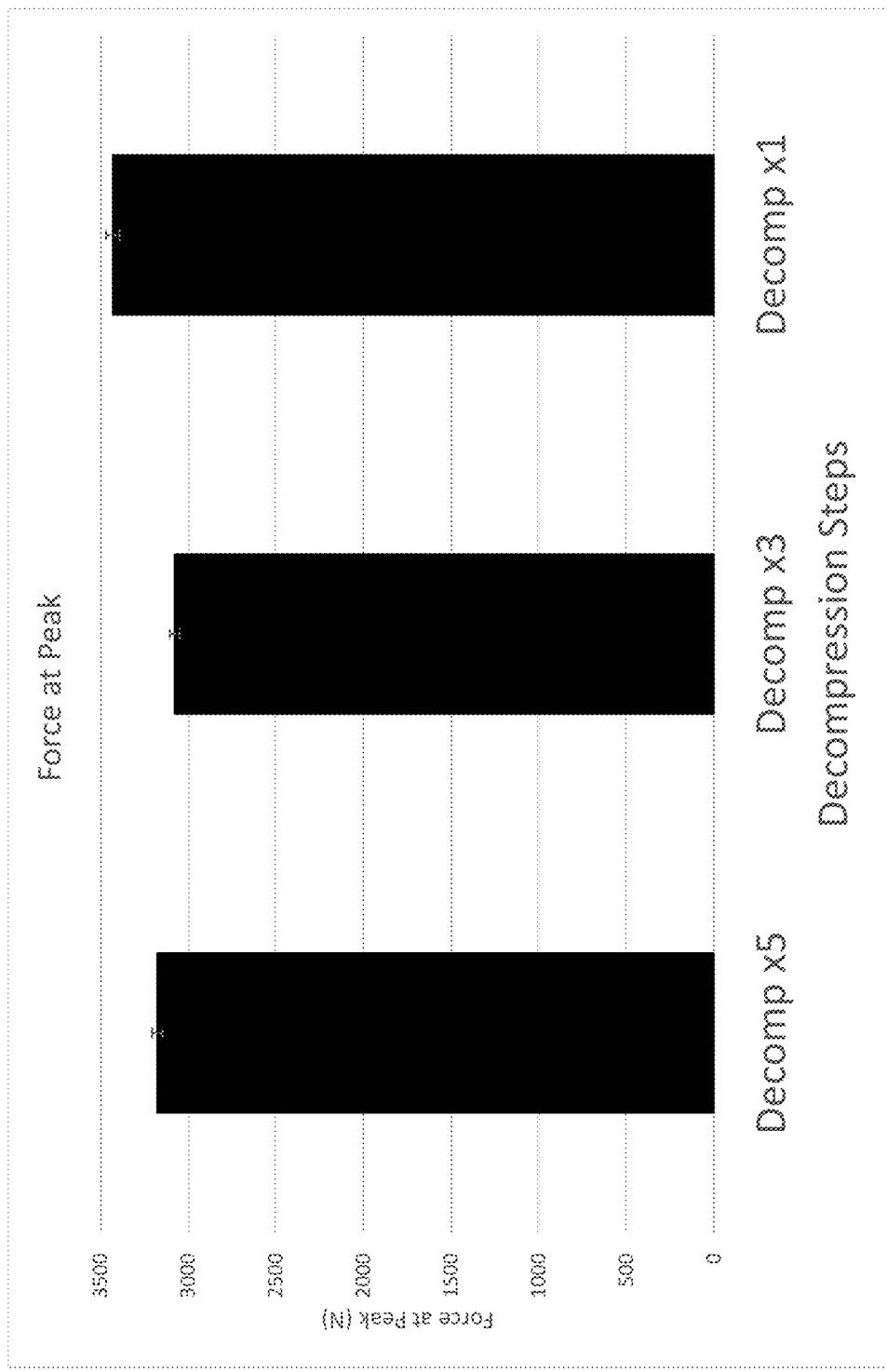
FIG. 63 is a graphical representation of the force at peak measured during stress-strain tests of three parts made as described in Example 19, using one decompression step, three decompression steps, and five decompression steps.
Figure 64:
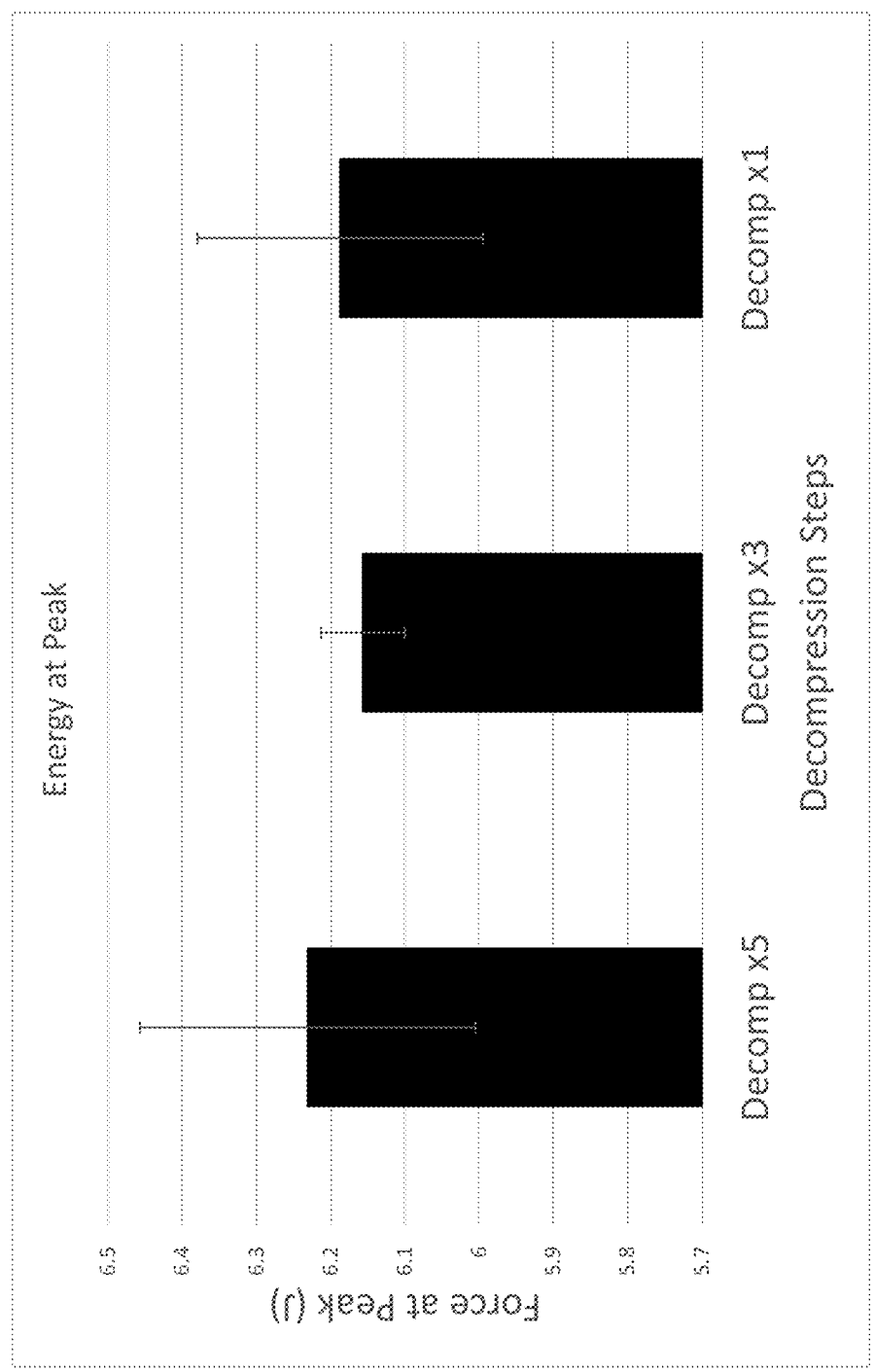
FIG. 64 is a graphical representation of the energy at peak measured during stress-strain tests of three parts made as described in Example 19, using one decompression step, three decompression steps, and five decompression steps.

One half of a brick from each process type was subject to impact testing using an Instron Drop Tower (available from Instron USA, Norwood, Mass., USA). Parts from each process type were tested three times along the center of the part for an average maximum force and energy reading. Test results for force at peak are shown in FIG. 63 and energy at peak are shown in FIG. 64. The maximum force recorded for all three process types was similar, and the average was 3228 N. The maximum energy recorded for all three process types was also very similar and the average was 6.2 J.

In general, no significant differences were observed in the compressive strength, impact force, and impact energy for parts resulting from a process including only one decompression step, only three decompression steps, and only five decompression steps. Mechanical properties were very similar, and all three process types resulted in parts with cells within 500 microns of the surface of the part.

Example 20

The objective of the present example was to make parts having a higher void fraction than those previously made using the MFIM process. Two parts were made; a foam-molded sphere of 8.25 cm diameter made from a SUR-LYN™ ionomer (available from the Dow Chemical Company, of Midland, Mich., USA) incorporating 4% by weight Hydrocerol® BIH 70 foaming agent (available from Clariant AG of Muttenz, Switzerland), and a foam-molded sphere of approximately six-inch diameter (approximately 15.2 cm) of a blend of 90 parts by weight low-density polyethylene and 10 parts by weight of high-density polyethylene incorporating 3% by weight of the BIH 70 foaming agent.

Processing variables were adjusted to achieve high void fractions. Processing parameters used to mold the SURLYN sphere into a 7.62 cm diameter spherical cavity by an MFIM process are displayed in TABLE 38 and those for the 15.24 cm diameter polyethylene sphere in TABLE 39. It is noted that the SURLYN sphere solidified and was removed from the mold, and further expansion during cooling resulted in a sphere larger than the cavity used to mold the sphere.

TABLE 38

High void-fraction SURLYN™ sphere

| Process Variable | Value | Units |
|---|---|---|
| Melt Temperature | 160\|160\|160\|160\|160\|149\|49 | ° C. |
| Mold Temperature | 12.8 | ° C. |
| Shot Volume | 98.3 | cc |
| Clamp Force | 294 | kN |
| Decompression Time | 70 | sec |
| Specific Back Pressure | 6.9 | MPa |
| Blowing Agent | 4 | % |
| Injection Speed | 327.7 | cc/sec |

TABLE 39

High void-fraction polyethylene sphere

| Process Variable | Value | Units |
|---|---|---|
| Melt Temperature | 182\|182\|182\|182\|182\|171\|38 | ° C. |
| Mold Temperature | 12.8 | ° C. |
| Shot Volume | 409.7 | cc |
| Clamp Force | 294 | kN |
| Decompression Time | 10 | sec |
| Specific Back Pressure | 6.9 | MPa |
| Blowing Agent | 3 | % |
| Injection Speed | 409.7 | cc/sec |

Each part was cut into two halves, and the cross section colored with a black marker pen. A photograph was taken of the cross section. Then a 25× magnified image was produced of the cross section close to the surface.

Figure 65:
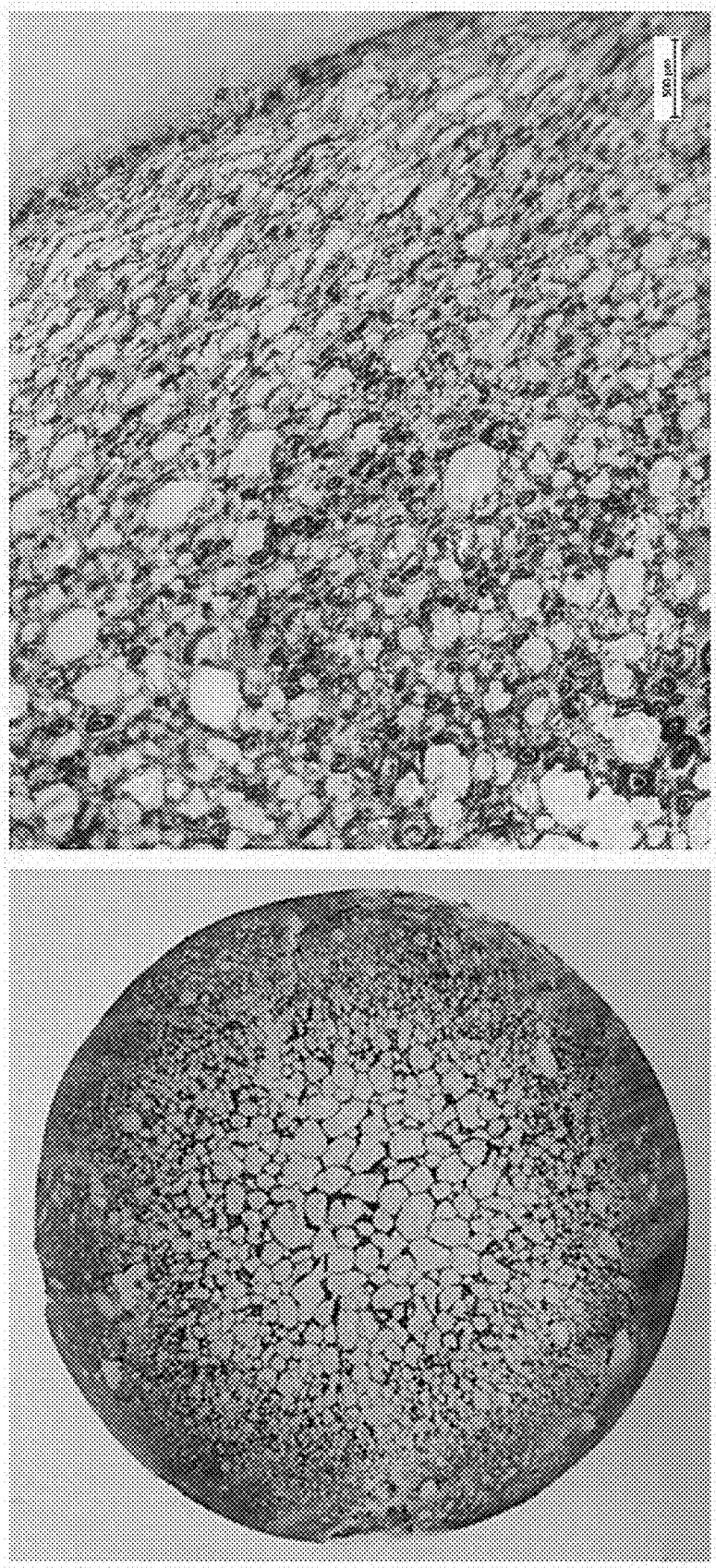
FIG. 65 shows a photograph of a cross section of a spherical SURLYN™ part after sectioning and a magnified image of the cross section close to the spherical surface of the part, as described in Example 20.

The photograph and magnified image of the SURLYN sphere are shown in FIG. 65.

Figure 66:
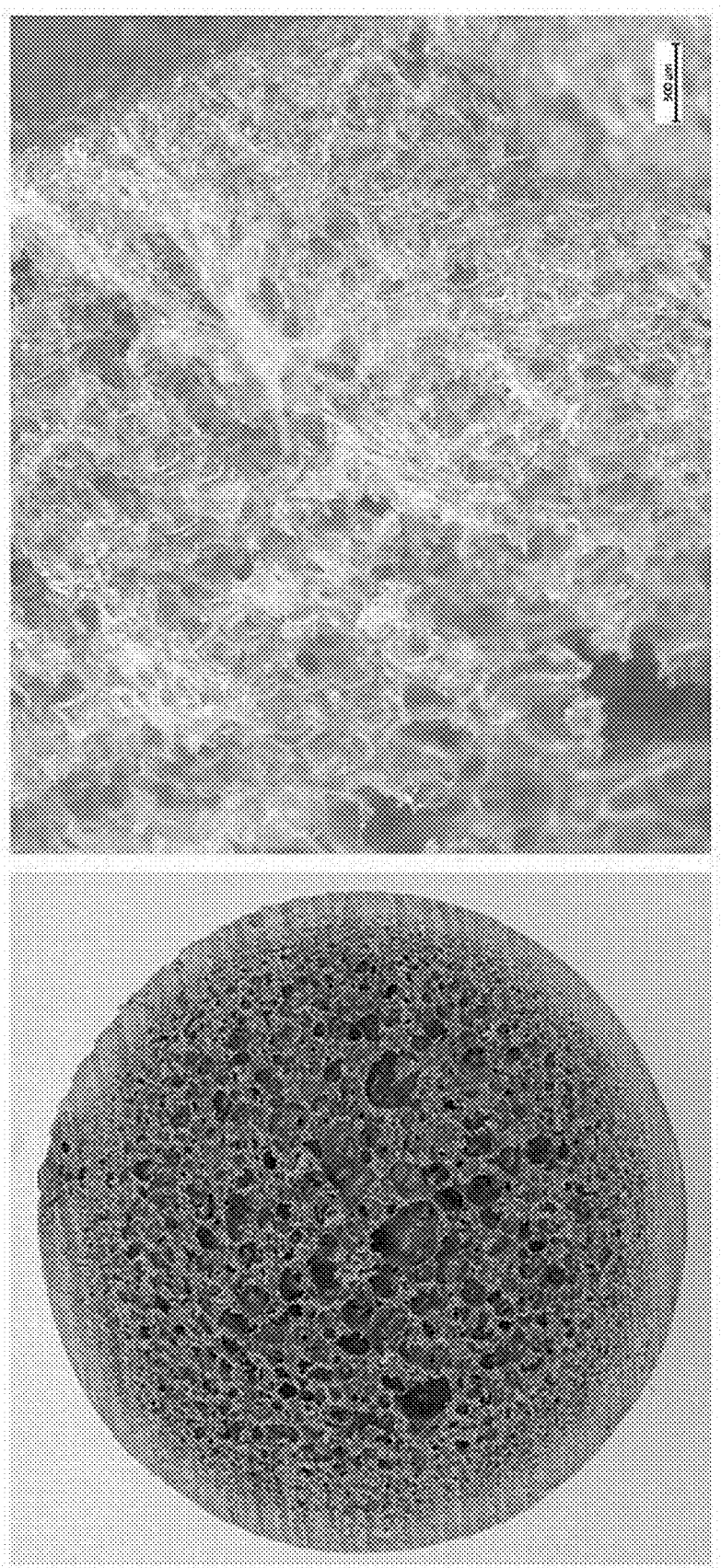
FIG. 66 shows a photograph of a cross section of a spherical polyethylene part after sectioning and a magnified image of the cross section close to the spherical surface of the part, as described in Example 20.

The photograph and magnified image of the polyethylene sphere are shown in FIG. 66.

The images confirmed a cell structure across the cross section including within 500 microns of the surface of the sphere.

Each sphere was weighed and the void fraction calculated as follows: The equation for the density of a foamed part ($\rho_f$) is described in Equation 1:

$$\rho_f = \frac{M}{V}, \quad \text{Equation 1}$$

where M is the mass of the foamed part and V is the volume of the foamed part.

The void fraction equation is described in Equation 2:

$$V_f = 1 - \frac{\rho_f}{\rho_{polymer}}, \quad \text{Equation 2}$$

where $\rho_{polymer}$ is the density of the material.

The part density and void fraction data are set forth in TABLE 40:

TABLE 40

Densities and Void Fraction Data

| | SURLYN Part | LDPE/HDPE Part |
|---|---|---|
| Part Weight (g) | 63.6 | 281.2 |
| Sphere Diameter (cm) | 8.25 | 14.34 |
| Sphere Volume (cc) | 293.65 | 1544.96 |

TABLE 40-continued

Densities and Void Fraction Data

| | SURLYN Part | LDPE/HDPE Part |
|---|---|---|
| Sphere Density (g/cc) | 0.22 | 0.18 |
| Polymer density (g/cc) | 0.97 | 0.92 |
| Void Fraction (%) | 77.7 | 80.3 |

Example 21

An objective of the present example was to demonstrate that an article could be made by an MFIM process in which the mold was only partially filled.

Two flowerpots were molded from low-density polyethylene (comprising 1.5% by weight Hydrocerol® BIH 70 foaming agent, available from Clariant AG of Muttenz, Switzerland) using an MFIM process by foam injection into a mold having a mold cavity of volume 10860.20 cc. Run SF produced a flowerpot by filling or substantially filling the mold cavity. A second run, Run PF, was performed with a lower shot volume and lower decompression volume in order to only partially fill the mold cavity and produce a partially filled part.

The MFIM mold parameters were the same for the two runs except for the shot volume and the decompression volume. The parameters (settings) for the two runs are displayed in TABLE 41:

TABLE 41

Partially and Substantially Filling a mold

| Run | SF | PF |
|---|---|---|
| Shot Volume (cc) | 7046.44 | 3523.22 |
| Decompression Volume (cc) | 819.35 | 409.68 |
| Decompression Rate (cc/s) | 163.87 | |
| Barrel Temperatures (° C.) | 182/182/174/174/160/160/49 | |
| Mold Temperature (° C.) | 18.3 | |
| Specific Back Pressure (MPa) | 6.9 | |
| Injection Speed (cc/s) | 573.547 | |
| Clamp Force (kN) | 981 | |
| Cooling Time (sec) | 500 | |
| Transfer Position (cm) | 7.62 | |
| Resulting Part Volume (cc) | 10083.87 | 5204.60 |

Figure 67:
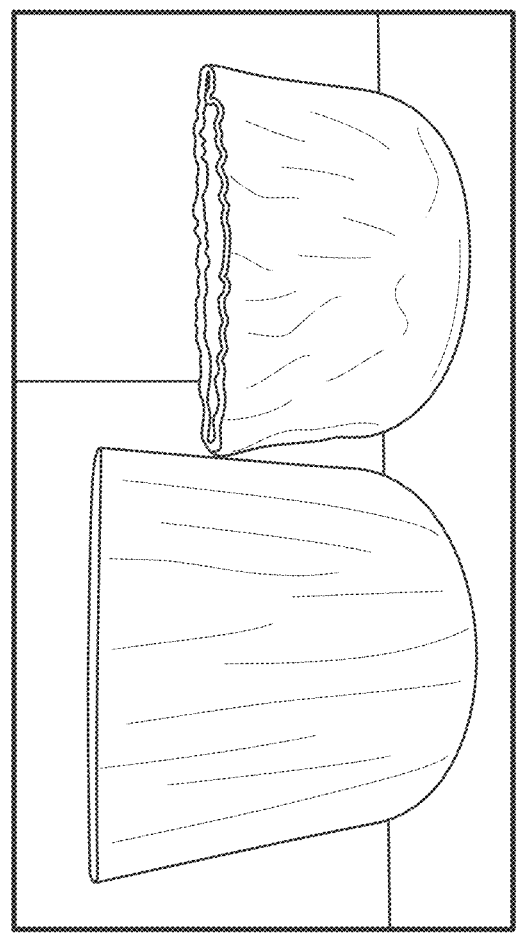
FIG. 67 is a line drawing of a photograph of the two parts made as described in Example 21.

The volumes of the two flowerpot parts were measured using a 3-dimensional scanning arm, a FARO® Quantum ScanArm (available from FARO of Lake Mary, Fla., USA). The resulting part volumes are shown in TABLE 41. The two parts are shown in FIG. 67 with the part from Run SF on the left and the part from Run PF on the right. The results of this example demonstrate that a partially full mold can generate a part by the MFIM process. The volume of the part from the partially filled mold was approximately half that of the part made from the substantially filled mold, yet still had the critical characteristics of a flowerpot, viz. the part had structural integrity and no holes.

Example 22

60 blocks were made from high-impact polystyrene including 0.376% by weight of Hydrocerol® BIH 70 foaming agent (available from Clariant AG of Muttenz, Switzerland) using the MFIM process. Each block was cuboid in shape and had dimensions of approximately 20 cm by 20 cm by 40 cm. The processing parameters used to make the blocks are set forth in TABLE 42:

TABLE 42

| Settings | |
|---|---|
| Barrel Temperatures (° C.) | 171 /171/149/149/149/138 |
| Nozzle Temperature (° C.) Nozzle 1 | 171 |
| Nozzle Temperature (° C.) Nozzle 2 | 171 |
| Feedthroat Temperature (° C.) | 49 |
| Shot Size (cc) | 10651.62 |
| Decompression Volume (cc) | 819.36 |
| Cooling Time (sec) | 600 |
| Screw Rotate Delay Time (sec) | 300 |
| Metering Performance (cc/sec) | 40.97 |
| Decompression Speed (cc/sec) | 163.87 |
| Appx. Decompression Time (sec) | 35 |
| Clamp Force (kN) | 996.4 |
| Specific Back Pressure (MPa) | 6.89 |
| Injection Pressure (MPa) | 129.14 |
| Injection Speed (cc/s) | 983.23 |
| Screw Speed (m/sec) | 0.15 |
| Mold Temperature (° C.) | 12.78 |

A hot sprue and runner system fed the mold: temperatures of the hot sprue and runner system are displayed in TABLE 43.

TABLE 43

| Hot Sprue and Mold Temperatures | |
|---|---|
| Tip 1 (° C.) | 216 |
| Tip 2 (° C.) | 216 |
| Tip 3 (° C.) | 216 |
| Tip 4 (° C.) | 216 |
| Manifold bottom (° C.) | 193 |
| Manifold Top (° C.) | 193 |
| Inlet (° C.) | 193 |
| Gate 1 (° C.) | 216 |
| Gate 2 (° C.) | 216 |
| Gate 3 (° C.) | 216 |
| Gate 4 (° C.) | 216 |

The average actual block dimensions for the 60 blocks were 20.005±0.114 cm by 19.964±0.659 cm by 40.066±0.061 cm.

Figure 70:
FIG. 70 is a photograph of a sectioned block, Block 45 of 60, made as described in Example 22.
Figure 71:
FIG. 71 is a photograph of a sectioned block, Block 27 of 60, made as described in Example 22.
Figure 72:
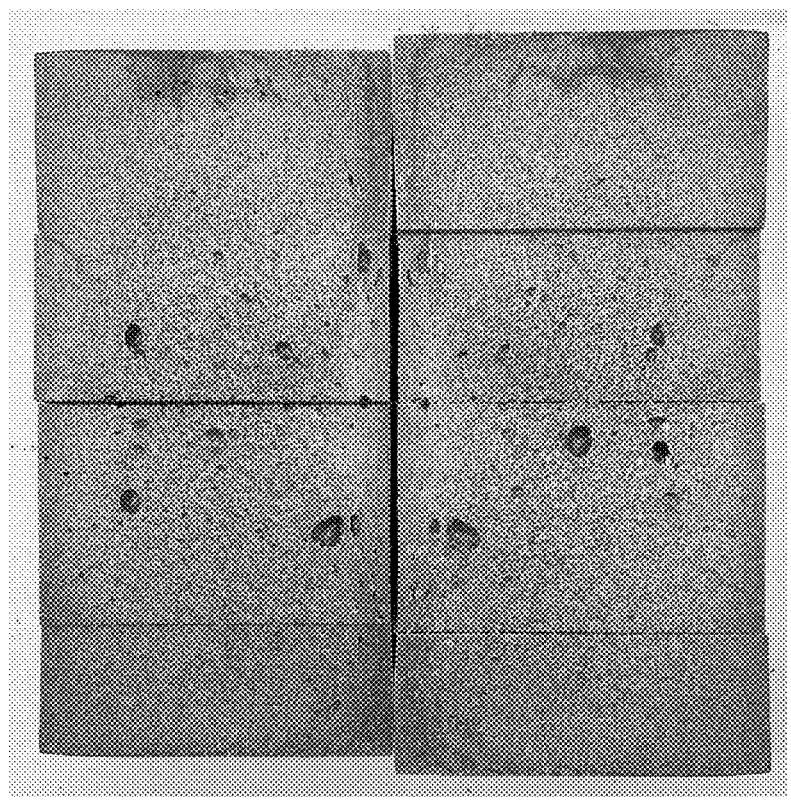
FIG. 72 is a photograph of a sectioned block, Block 60 of 60, made as described in Example 22.

Three of the 60 blocks were taken, Block 45, Block 27, and Block 60. Each block was cut into 16 sub-blocks, which were stacked and photographed to show the foam structure of the block in cross-section. A photograph of the sub-blocks from Block 45 is shown in FIG. 70, the sub-blocks from Block 27 in FIG. 71, and the sub-blocks from Block 60 in FIG. 72.

A line drawing of a photograph of a fort built from the MFIM foam blocks is shown in FIG. 73.

Cinder blocks with three channels were also made from high-impact polystyrene.

Other materials successfully used to make cinder blocks included polypropylene, polypropylene filled with 20% by weight glass fiber, and recycled polypropylene.

Other materials successfully used to make solid blocks were polypropylene filled with 20% by weight of glass fiber and polypropylene filled with 10% by weight of glass fiber.

Example 23

In the present example, an MFIM process was used to make blocks from post-industrial reground polypropylene.

Post industrial regrind (P.I.R.) in the form of flakes was obtained from Engineered Plastics LLC of Erie, Pa., USA. The P.I.R. had a melt index of between 8 and 12, and was of mixed colors. The P.I.R. flakes were made from scrap laundry detergent lids and other scrap polypropylene items.

The flakes were combined with 2 weight percent of green olefin color and were then pelletized (reground) using a twin-screw extruder.

Four plastic compositions were made having 0%, 25%, 50%, and 100% by weight of the pelletized P.I.R., 2% by weight of weight Hydrocerol® BIH 70 foaming agent, and the remainder being virgin polypropylene.

Each of the four compositions was used to mold a brick on an Engel Duo 340 Ton injection molding machine (available from Engel Machinery Inc. of York, Pa., USA) using a mold having a cuboid cavity of 5.715 cm by 9.842 cm by 20.32 cm. A total of 60 bricks was molded from the polypropylene made of 100% by weight P.I.R.

Process parameters for the MFIM process are shown in TABLE 44:

TABLE 44

| Settings | | | | | | | |
|---|---|---|---|---|---|---|---|
| Weight percent of P.I.R. | Shot Volume (cm³) | Decompression Volume (cm³) | Cooling Time (sec) | Injection speed (cm³/sec) | Hold Pressure (kPa) | Hold Time (sec) | Clamp Force (kN) |
| 0 | 565 | 32.8 | 300 | 246 | 0 | 1 | 996 |
| 25 | 549 | 32.8 | 300 | 246 | 0 | 1 | 996 |
| 50 | 541 | 32.8 | 300 | 246 | 0 | 1 | 996 |
| 100 | 533 | 32.8 | 300 | 246 | 0 | 1 | 996 |

Figure 74:
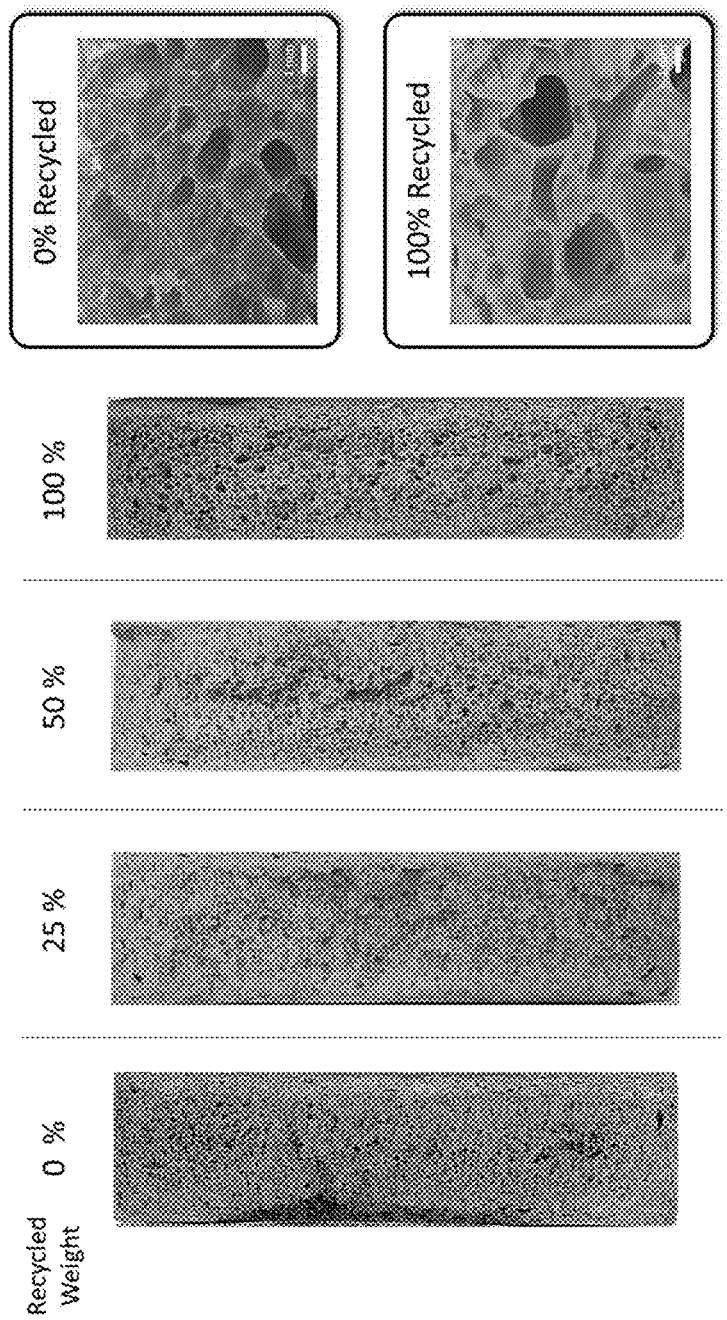
FIG. 74 shows photographic images of cross sections of parts made from 0%, 25%, 50%, and 100% recycled plastic, and on the right magnified images of the cross sections for parts made from 0% and 100% recycled material, as described in Example 23.

Four bricks, one made from of each composition, were cut to reveal a cross section and the foam structure of the brick. The four cross sections were photographed, and the photographs are shown in FIG. 74 along with magnified views of a cross section from a brick made from 100% virgin polypropylene and a cross section of a brick made from 100% P.I.R. The average internal cell size appeared to increase with increasing P.I.R. content.

Example 24

Two parts were foam molded using a blend of low-density polyethylene blended with 2.5% by weight Hydrocerol® BIH 70 foaming agent (available from Clariant AG of Muttenz, Switzerland). Molding was conducted using an Engel Victory 160 Ton injection molding machine (available from Engel Machinery Inc. of York, Pa., USA). The mold included a cylindrical cavity of 6.35 cm diameter and 5.717 cm height for a total volume of 180.33 cm³. An aluminum mold having a cold sprue and runner system feeding the described cylinder shape was employed for both parts. The melt delivery system for each part was the same, and the only process set-point differing between the two parts was the decompression time.

The process settings used to produce each part are detailed in TABLE 45. A first part (Part 119) was molded using an MFIM process with 1800 seconds of calculated decompression time and a decompression volume of 14.75 cc. A second part (part 120) was molded using an MFIM process with 0 seconds of calculated decompression time. The screw was not translated backwards to allow a decompression volume. Accordingly, the decompression volume was 0 cc.

TABLE 45

| Settings, Part 119 and Part 120 | | |
|---|---|---|
| | Part 119 | Part 120 |
| Barrel Temperatures (° C.) | 182.2 \| 182.2 \| 182.2 \| 182.2 \| 148.9 \| 137.8 \| 37.8 | |
| Mold Temperature (° C.) | 10 | |
| Injection Speed (cc/s) | 327.7 | |
| Back Pressure (kPa) | 6895 | |
| Decompression Time (sec) | 1800 | 0 |
| Decompression Volume (cc) | 14.75 | 0 |
| Decompression Rate (cc/s) | 163.9 | |
| Depressurization Rate (GPa/s) | 0.0654 | 0 |
| Cooling Time (sec) | 1952 | 152 |
| Shot Volume (cc) | 65.55 | |
| Final Part Weight (g) | 48.19 | 34.74 |

Part 119, formed using the molding process having a decompression volume of 14.75 cc and a decompression time of 1800 seconds, was completely filled out and the shape of the part matched the shape of the mold cavity.

Part 120, formed using the process with no decompression time, did not yield a part that filled the mold cavity. The part was sunken in around the molded flat portion of the cylinder shape, and the part did not match the shape of the cavity of the mold.

What is claimed is:

1. A method of forming a molten polymer foam, the method comprising:
    collecting a selected amount of a molten pneumatic mixture in a collection region under a pressure applied by a screw, the molten pneumatic mixture comprising a molten thermoplastic polymer mixed with a pneumatogen source, wherein the temperature of the molten pneumatic mixture exceeds the temperature at which the pneumatogen source produces a pneumatogen at atmospheric pressure, and the applied pressure is sufficient to substantially prevent formation of pneumatoceles; and
    retracting the screw from the collection region to define an expansion volume in the collection region proximal to the molten pneumatic mixture that results in a pressure drop at a rate of 0.01 GPa/s to 5 GPa/s, to form a molten polymer foam from the molten pneumatic mixture.

2. The method of claim 1 wherein the retracting is initiated at a backpressure of 500 kPa to 25 MPa.

3. The method of claim 1 wherein the method further comprises dispensing the molten polymer foam from the collection region.

4. The method of claim 3 wherein the dispensing comprises dispensing the molten polymer foam into a mold cavity that is a cavity defined by a mold.

5. The method of claim 4 wherein the dispensing comprises partially filling the mold cavity.

6. The method of claim 4 wherein the dispensing comprises substantially filling the mold cavity.

7. The method of claim 4 wherein the dispensing comprises completely filling the mold cavity.

8. The method of claim 4 wherein the mold cavity comprises a volume of more than 1000 $cm^3$.

9. The method of claim 4 wherein the mold cavity comprises a volume of more than 5000 $cm^3$.

10. The method of claim 4 wherein the mold cavity comprises a volume of more than 10,000 $cm^3$.

11. The method of claim 4 wherein the mold cavity comprises a volume of more than 50,000 $cm^3$.

12. The method of claim 4 wherein the mold cavity comprises a distance of 2 cm or more between two points on the surface of the mold defining the cavity.

13. The method of claim 4 wherein the mold cavity comprises a distance of 5 cm or more between two points on the surface of the mold defining the cavity.

14. A method of making a polymer foam article, the method comprising cooling the molten polymer foam of claim 4 in the mold cavity.

15. The method of claim 3 wherein the dispensing comprises dispensing an unimpeded flow of the molten polymer foam.

* * * * *